(12) United States Patent
Schroader et al.

(10) Patent No.: US 11,242,207 B2
(45) Date of Patent: Feb. 8, 2022

(54) MULTISTAGE CONVEYOR UNITS FOR SEPARATING PARCELS

(71) Applicant: FIVES INTRALOGISTICS CORP., Louisville, KY (US)

(72) Inventors: Steven Vann Schroader, Louisville, KY (US); Richard B. Hageman, III, Louisville, KY (US); Tyler R. Herman, Louisville, KY (US)

(73) Assignee: Fives Intralogistics Corp., Louisville, KY (US)

( * ) Notice: Subject to any disclaimer, the term of this patent is extended or adjusted under 35 U.S.C. 154(b) by 0 days.

(21) Appl. No.: 16/833,493

(22) Filed: Mar. 27, 2020

(65) Prior Publication Data

US 2020/0361714 A1    Nov. 19, 2020

Related U.S. Application Data

(60) Provisional application No. 62/824,557, filed on Mar. 27, 2019.

(51) Int. Cl.
  *B65G 39/18*       (2006.01)
  *B65G 13/02*       (2006.01)
  *B65G 47/68*       (2006.01)
  *B07C 3/06*        (2006.01)
  *B65G 47/82*       (2006.01)

(52) U.S. Cl.
  CPC ............... *B65G 39/18* (2013.01); *B07C 3/06* (2013.01); *B65G 13/02* (2013.01); *B65G 47/68* (2013.01); *B65G 47/82* (2013.01)

(58) Field of Classification Search
  CPC ........ B65G 13/02; B65G 39/18; B65G 47/68; B65G 47/82; B07C 3/06
  USPC ................... 198/370.01, 456, 457.01, 457.02
  See application file for complete search history.

(56) References Cited

U.S. PATENT DOCUMENTS

| | | | | |
|---|---|---|---|---|
| 4,044,897 A | * | 8/1977 | Maxted | B65G 47/681 198/349 |
| 4,256,216 A | | 3/1981 | Winters | |
| 4,264,002 A | * | 4/1981 | Van Der Schie | B65G 13/08 198/361 |
| 4,643,291 A | | 2/1987 | Counter | |

(Continued)

*Primary Examiner* — Douglas A Hess
(74) *Attorney, Agent, or Firm* — Carrithers Law Office, PLLC

(57) ABSTRACT

A multistage multi-lane singulator conveyor system for separating side by side packages in stages. A first high friction surface conveying moving articles forward is adjacent a second low friction conveying lane in lateral flow communication having both forward and lateral conveying forces urging parcels forward and away from the first conveying lane, wherein the second conveying lane can be level or transversely inclined and angled upward in lateral flow communication with a third high friction surface conveying surface. Controlling residence time and forward and lateral movement of articles by assembling high friction surface conveying lanes and low friction surface conveying lanes in an end to end and/or lateral arrangement in flow communication with one another and/or shifting articles moving forward and laterally by staggering the high friction conveying surfaces and low friction conveying surfaces and adjusting the width by adjusting the number of high friction conveying surfaces adjacent one another.

49 Claims, 53 Drawing Sheets

(56) References Cited

U.S. PATENT DOCUMENTS

| | | | |
|---|---|---|---|
| 5,165,520 A | 11/1992 | Herve | |
| 5,551,551 A | 9/1996 | Crawford | |
| 5,701,989 A * | 12/1997 | Boone | B65G 47/682 |
| | | | 198/443 |
| 5,794,790 A | 8/1998 | Bonnet | |
| 5,918,723 A * | 7/1999 | Schuitema | B65G 47/684 |
| | | | 198/347.4 |
| 5,950,800 A | 9/1999 | Terrell | |
| 6,076,683 A | 6/2000 | Okada | |
| 6,269,933 B1 * | 8/2001 | Schuitema | B65G 47/5145 |
| | | | 198/370.1 |
| 6,325,877 B1 | 12/2001 | Murphy | |
| 6,328,151 B1 | 12/2001 | Spangenberg | |
| 6,412,621 B1 * | 7/2002 | De Vree | B65G 37/02 |
| | | | 198/347.4 |
| 6,543,602 B1 | 4/2003 | Bonnet | |
| 6,609,607 B2 | 8/2003 | Woltjer | |
| 6,622,847 B2 | 9/2003 | Schuitema | |
| 6,910,568 B1 | 6/2005 | Ydoate | |
| 7,233,840 B2 | 6/2007 | Schiesser | |
| 7,497,316 B2 | 3/2009 | Hysell | |
| 7,552,815 B2 * | 6/2009 | Pahud | B65G 21/2036 |
| | | | 198/394 |
| 7,703,596 B1 | 4/2010 | Grollitsch | |
| 7,726,461 B2 | 6/2010 | Risley | |
| 7,861,847 B2 | 1/2011 | Fourney | |
| 8,261,917 B2 | 9/2012 | Enenkel | |
| 8,689,965 B2 * | 4/2014 | Sjogren | B65G 47/244 |
| | | | 198/415 |
| 9,038,810 B2 * | 5/2015 | Schroader | B65G 47/682 |
| | | | 198/413 |
| 9,533,836 B2 * | 1/2017 | Cristoforetti | B65G 47/682 |
| 10,150,625 B2 * | 12/2018 | Grant | B07C 1/00 |
| 10,315,859 B1 * | 6/2019 | Zhao | B65G 47/8815 |
| 10,583,999 B2 * | 3/2020 | Grant | B65G 47/68 |
| 10,773,898 B2 * | 9/2020 | Perrot | B65G 47/31 |
| 10,815,068 B2 * | 10/2020 | Daboub | B65G 47/24 |

* cited by examiner

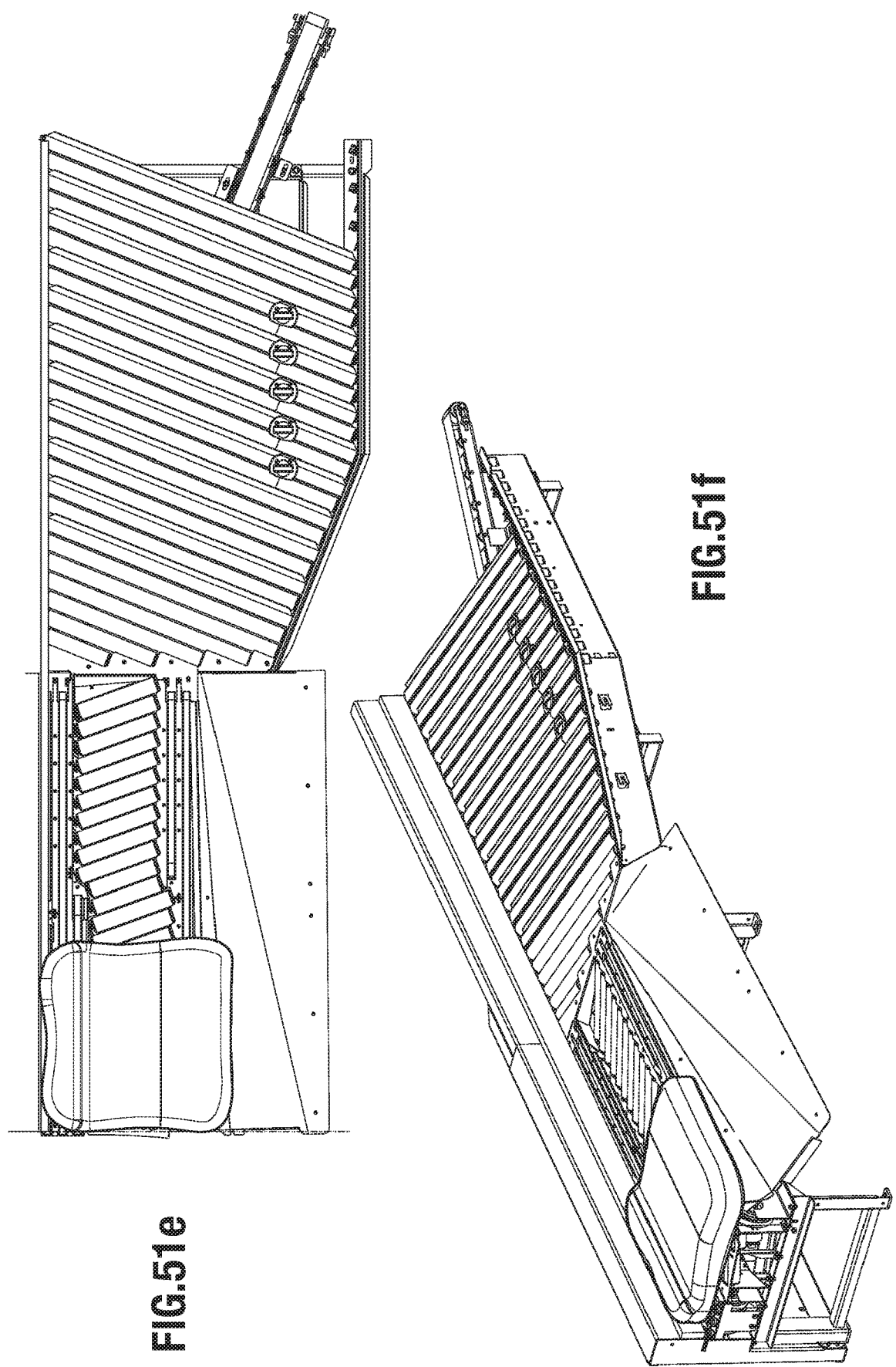

MULTISTAGE CONVEYOR UNITS FOR SEPARATING PARCELS

REFERENCES TO RELATED APPLICATIONS

This application claims priority from U.S. Provisional Application Ser. No. 62/824,557 filed on Mar. 27, 2019 which is incorporated by reference herein in its entirety.

TECHNICAL FIELD OF THE INVENTION

This invention relates generally to a multistage conveyor system having conveying surfaces arranged in adjacent parallel configuration for separating side by side packages in stages.

BACKGROUND OF THE INVENTION

The present invention relates to material handling and in particular to methods and apparatuses for conveying packages and a mechanism for controlling the location of packages on a conveyor.

Conventional conveyor systems convey large numbers of packages at high speed, especially in the parcel delivery industry wherein the packages are sorted according to the desired categories. The efficiency with which the packages are handled can be seriously diminished when a plurality of smaller packages, irregular sized or shaped items, or a mixture of large and small articles pass together on the conveyors as a single unit.

Problems occur with scanning and separating packages and parcels which travel through the conveying system as an aggregate unit rather than in a single file. Large packages hide small parcels and small side-by-side packages cause problems whenever they pass simultaneously through a bar code scanner causing confusion and sorting problems. Moreover, packages such as bags or other flexible containers having the weight distributed unevenly, or where the width and length of the container are extreme, or where the container is soft or only partially full such as a floppy partially filled bag of mail tend to present sorting problems in that they do not move in predictable lateral patterns.

The use of unscrambling conveyors sometimes referred to as singulators uses a plurality of driven rollers or belts whose axes extend obliquely relative to the direction of conveyance causing packages to be displaced laterally toward one side of the conveyor and become aligned behind one another.

Typical singulator conveyor systems for sorting parcels in typical applications comprise devices used that take randomly arranged items and convert the random flow to a single file stream of items. The items are conveyed forward with both forward and lateral forces and aligned along one side. A device can be placed after the aligned stream of items and items that did not make it all the way to the wall on the aligned side, are separated laterally away from the primary stream of parcels. Typical configurations direct the laterally removed items and recirculate them back to the skewed roller section for another pass and opportunity to be aligned against the wall, to be passed through with the primary line of flow. Items are conveyed forward with both forward and lateral forces and aligned along one side.

Present technology works well for rigid parcels, like a box, but items that do not behave as a rigid item like flexible parcels or large bags containing several small items are separated in accordance with their center of gravity and tend to be removed from the parallel stream even when the item is not abreast of another item.

Rearrangement of clusters of articles into a single file is difficult to accomplish with packages having one dimension that is significantly greater than its other dimensions. If several packages having unequal loading, partially filled bags or boxes, or long and slender articles are conveyed side-by-side, conventional article conveyors have difficulty separating side-by-side pairs into single file especially over a short distance and residence time. Packages having unequal weight, irregular dimensions, and off-set center of gravity can get repeatably shifted onto the output of the singulating conveyor. Occasionally instead of being positioned in single file, some of the packages may be conveyed abreast of one another, i.e., in side-by-side relationship traveling two abreast. The combined width of the two packages may present a problem at a downstream location in the conveyor system.

The need exists for a singulating conveying having separation capabilities effective in separating side-by-side articles including packages and parcels having unequal loading such as different sized packages (e.g., boxes, flats and softpacks), partially filled bags or boxes, or long and slender articles having an offset center of gravity into one or more rows of single file singulated articles over a short distance and residence time.

The present invention insures that two of more small items abreast of one another are separated while permitting large items to pass thorough the singulator even when the item is a large bag of small items.

Prior art conventional conveying systems work well for rigid parcels, like a box, but items that do not behave as a rigid item, like a large bag of small items tend to be removed from the parallel stream even when the item is not abreast of another item. The instant invention provides an apparatus and method capable of separating rigid parcels as well as large bags of small parcels.

The singulator conveyor system comprises a selected number of conveyors or conveyor conveying lanes arranged in an adjacent parallel configuration for separating side-by-side packages and parcels having unequal loading such as different sized packages (e.g., boxes, flats and softpacks), partially filled bags or boxes, or long and slender articles having an offset center of gravity into one or more rows of single file singulated articles over a short distance and residence time. The singulator conveying system insures that two or more small items abreast of one another are separated while permitting large items to pass thorough the singulator even when the item is a large bag of small items.

Furthermore, the present invention provides for multistage conveyors having multiple conveying lanes capable of separating packages by conveying the packages (forward) or (forward and laterally) over high and/or low friction conveying surfaces positioned at selected lateral angles.

SUMMARY OF THE INVENTION

A multistage conveyor system having conveying surfaces arranged in adjacent parallel configuration for separating side by side packages in stages. A first conveying lane having a high friction surface for conveying articles forward can be combined with a second conveying lane adjacent thereto having a lower friction conveying surface including both forward and lateral conveying forces urging parcels forward and away from the first conveying lane. The lateral receiving edge of the second conveying lane can be positioned below the outer lateral edge of the first conveying lane. The second conveying lane can be transversely inclined and angled laterally upward having an elevated outer side edge even with or below the lateral receiving edge of an adjacent third conveying lane. The conveying surface of the second conveying lane may form an inclined plane extending above an inner lateral receiving edge of the adjacent third conveying lane having a high friction surface. Residence time and lateral movement of the packages on a selected conveying lane of the multistage conveyor can be controlled by selection of the amount of high friction conveying surface of selected adjacent conveying lanes. Each of the high friction conveying lanes may utilize a plurality of narrow belts to vary the area of the high friction surface. The high friction lanes increase in width or number to increase high friction conveying surface area near the inner conveyor or wall on first lane side and decrease in width on the take-off lane side of the conveyor utilizing powered skewed low friction roller conveying surfaces therebetween. Often the increase in width on the inner lane side corresponds to the decrease in width on the outer lane on the take-off side of the conveyor. Assembling multiple lanes end to end in a single conveyor or at least two conveyors end to end having different arrangements of multi-lane conveyors in forward and lateral flow communication provides multistage conveyors for formation of high surface areas at selected locations in lateral flow communication with conveying lanes having a low friction conveying surface and controlling movement of parcels.

In one preferred embodiment, the high friction surface of the first conveying lane increases in width and the high surface area of the third conveying lane decreases in width on the take-off lane side. A width of the low friction second conveying lane disposed between the first conveying lane and the third conveying lane changes in width in accordance with the change in width of the first conveying lane and second conveying lane. The change in width of the high friction first conveying lane and the high friction third conveying lane changes correspondingly so that the width of the first conveying surface, second conveying surface, and third conveying surface are the same from the feed end of the conveyor to the discharge end of the conveyor.

The present invention relates to a conveying system for conveying, aligning, and organizing randomly supplied articles including side-by-side articles received from a feed conveyor into a single file relationship. The articles are conveyed onto a singulator device having separating capabilities which includes a single stage or a multistage and/or multi-lane conveyor assembly following the feed conveyor. The multi-lane singulator unit may include several stages which vary the width of the high friction conveying surfaces and the lower friction conveying surfaces adjacent one another at selected lateral angles providing laterally inclined planes to control lateral movement of the packages or parcels. The singulator is arranged in alignment with, downstream of the feed conveyor for receiving articles therefrom.

Articles received from a feed conveyor are conveyed through a conveyor assembly defining a singulator comprising three conveyors arranged in an adjacent parallel configuration which may have multiple conveyor lanes for conveying the articles in a single file rows in a spaced apart relationship. The three conveyors define first, second, and third conveying lanes disposed in parallel alongside one another and driven in a manner imparting mutually divergent conveying forces for separating and moving side by side parcels or articles. The multistage singulating conveyor system has conveying surfaces arranged in adjacent parallel configuration for separating side by side packages in stages. Forward and lateral movement of a package on the multistage singulating conveyor can be controlled by selection of the amount of high friction conveying surface provided by one or more adjacent conveying lanes. The device can be placed after the aligned stream of items, articles or packages so that items that did not make it all the way to the wall on the aligned side are separated laterally away from the primary stream of items.

In the single stage singulator conveyor unit, a first stage comprises a conveyor unit including a first high friction surface conveying lane for conveying articles forward along a inner vertical side wall. A second lower friction surface conveying lane adjacent thereto and in lateral flow communication therewith includes both forward and lateral conveying forces urging articles forward and away from the first conveying lane and vertical side wall. The second low friction conveying lane typically comprises a series of driven rollers whose rotary axes are skewed relative to a longitudinal direction of travel so that the packages are conveyed simultaneously longitudinally forward and laterally outwardly away from the first conveyor. The lateral receiving edge of the second conveying lane is positioned below the outer lateral edge of the first conveying lane and the second conveying lane is transversely inclined and angled laterally upward having an elevated outer side edge even with or below the lateral receiving edge of an adjacent third conveying lane. The conveying surface of the second conveying lane forms an inclined plane extending above an inner lateral receiving edge of the adjacent third conveying lane having a high friction surface. Packages resting on the first conveyor, or on the first conveyor and second conveyor are conveyed through the singulator. Packages which fall off of the first conveyor onto the second conveyor or which rest entirely on the second conveyer are moved forward and laterally toward the third conveyor until the center of gravity of the packages extend pass the longitudinal edge of the third conveyor whereby control is transferred to the third conveyor and the packages fall over an inclined plane or drop off zone to be recirculated or re-routed.

It is contemplated that the speed of the first, second or third conveyors and/or conveying lanes can be adjusted with respect to one another to align articles thereon. Moreover, the speed of the conveying lanes could be adjusted relative to one another to enhance the separation capabilities of the singulator conveyor assembly.

It is an object of the present invention to provide a singulator comprising a multi-lane conveyor assembly having at least three driven conveying lanes arranged in parallel relationship adjacent one another. The conveying lanes lie in a horizontal plane along their lateral axis. A laterally positioned side wall extends along side a first conveying lane which tends to convey items forward and along the laterally positioned side wall.

It is an object of the present invention to provide a driven first conveying lane including a belt or rollers having a high friction surface for conveying articles along a vertical side wall where incoming items are positioned there along at a selected speed.

It is an object of the present invention to provide that packages resting on the first conveyor lane having a high friction surface and objects resting on both the first conveyor lane and the second conveyor lane having a lower friction surface move forward.

It is an object of the present invention to provide a second conveyor having a lower friction surface conveyor lane including both forward and lateral conveying forces. The edge of the second conveying lane adjacent the first conveying lane is disposed at a slightly lower elevation along the lateral axis of the first conveying lane providing a drop off. The lateral forces of the second conveying lane pull the articles positioned on the second conveying lane away from the first conveying lane and primary flow side wall to separate two small items that might enter abreast of one another.

It is an object of the present invention to provide for the lower friction conveying surface of a second conveying lane to be angled vertically at a selected angle from the first conveying lane providing an inclined plane extending upward from below the outer lateral edge of the first conveying lane upward toward the third conveying lane so that the inclined conveying plane of the second conveying lane extends above the inner lateral receiving edge of the adjacent third conveying lane.

It is an object of the present invention to provide a driven third conveying lane having a high friction surface which is laterally positioned alongside of the second conveying lane on the opposite side from the first conveying lane primary flow side. In one preferred embodiment, the third conveying lane is elevated at the same level as the first conveying lane. The conveying surface of the third conveying lane is above the elevation of a carrying surface of the second conveying lane where they mate along their lateral edge.

It is an object of the present invention to provide that the plane of the third conveying lane extends above the edge of the second conveying lane surface.

It is an object of the present invention to provide a means to separate packages traveling abreast of one another so that packages or articles that do not come in contact with the first conveying lane surface and rest on the second conveying lane surface are carried forward and laterally at an upward angle toward the outer edge of the second conveying lane forming a plane extending just above the receiving edge of the third high friction conveying lane. A portion of each article or package that extends above the third conveyor lane will move upward and over the third conveyor lane until the center of gravity extends past the inner lateral receiving edge of the third conveyor and the package drops onto the high friction surface of the third conveying lane. Thus, when two articles enter the singulator abreast of one another, the outwardly positioned article is transferred forward and laterally until the center of gravity passes beyond the lateral edge of the second conveying lane, at which time a definite transfer of control will occur as the item drops down and rests atop of the third conveying lane.

It is an object of the present invention for the speed of the first conveying lane, the second conveying lane, and the third conveying lane is adjustable relative to one another.

It is an object of the present invention that the first conveying lane and the third conveying lane travel at the same rate of speed in order for large parcels resting on the first conveying lane and the third conveying lane to be conveyed thorough the singulator conveyor apparatus.

Another feature of the present invention deals with a problem involving packages having a convexly curved bottom. It will be appreciated that such a curved bottom, even though it may overlap both the first and second conveying lanes might tend to contact only the second conveying lane and thus will be unnecessarily sent to the return conveyor. However, the curved bottom is likely to make at least line contact with the first conveying lane and the second conveying lane surface is situated slightly lower than the surface of the first conveying lane, and is inclined downwardly slightly toward the first lane at a selected angle of up to 30 degrees and preferably from 1 to 10 degrees. As a result, curved package bottoms will tend to become oriented such that at least contact is made with an edge of the high friction surface of the first conveying lane. Due to the high coefficient of friction of the conveying surface of the first conveying lane, the first conveying lane will control the direction of travel of the package.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 7(*b*) is an upstream end view of the multistage conveyor;

FIG. 8(*b*) is an upstream end view of the multistage conveyor of FIG. 8(*a*);

FIG. 9(*b*) is an upstream end view of the multistage conveyor of FIG. 9(*a*);

FIG. 40 (c) is an upstream end view of the multistage conveyor of FIG. 40(a);

FIG. 43 (c) is a top view of the multilane conveyor of FIG. 43(b) showing a large flat box biased against a vertical side wall supported by two high friction inner conveying lanes and two high friction outer conveying lane supported above the skewed roller low friction conveying lane therebetween;

FIG. 46 (b) is a top view of FIG. 46 (a) showing a narrow first box adjacent the vertical side wall and a wide second box adjacent and spaced apart from the first box both supported by an upstream conveyor feeding the multistage multi-lane conveyor;

FIG. 46 (c) is a top view of FIG. 46 (b) showing a first box adjacent the vertical side wall and the second box adjacent the first box both supported by an upstream conveyor feeding the multistage multi-lane conveyor whereby the first box is conveyed by the first and third inner narrow belts and the second box is aligned with the second conveying lane having a low friction surface;

FIG. 47 (b) is an isometric view of FIG. 47(a);

FIG. 47 (c) is a top view of FIG. 47(b);

FIG. 47 (d) is an isometric view of FIG. 47(c);

FIG. 47 (e) is a top view of FIG. 47(d);

FIG. 47 (f) is an isometric view of FIG. 47 (e);

FIG. 47 (g) is an top view of FIG. 47(f);

FIG. 47 (h) is an isometric view of FIG. 47 (g);

FIG. 47 (i) is a top view of FIG. 47(h);

FIG. 47 (j) is an isometric view of FIG. 47 (i);

FIG. 47 (k) is a top view of FIG. 47(j);

FIG. 47 (l) is an isometric view of FIG. 47(k);

FIG. 47 (m) is a top view of FIG. 47 (l);

FIG. 47 (n) is an isometric view of FIG. 47(m);

FIG. 48 (c) is a top view of FIG. 48 (b);

FIG. 51(b) is an upstream isometric view of a multistage conveyor;

FIG. 51(c) is a top view of a the multistage conveyor of FIG. 51(b);

FIG. 51(d) is an isometric view of the multistage conveyor of FIG. 51(c);

FIG. 51(e) is a top view of a multistage conveyor of FIG. 51(d); and

FIG. 51(f) is a top view of a multistage conveyor of FIG. 51(e).

DETAILED DESCRIPTION OF THE PREFERRED EMBODIMENT

Figure 1:
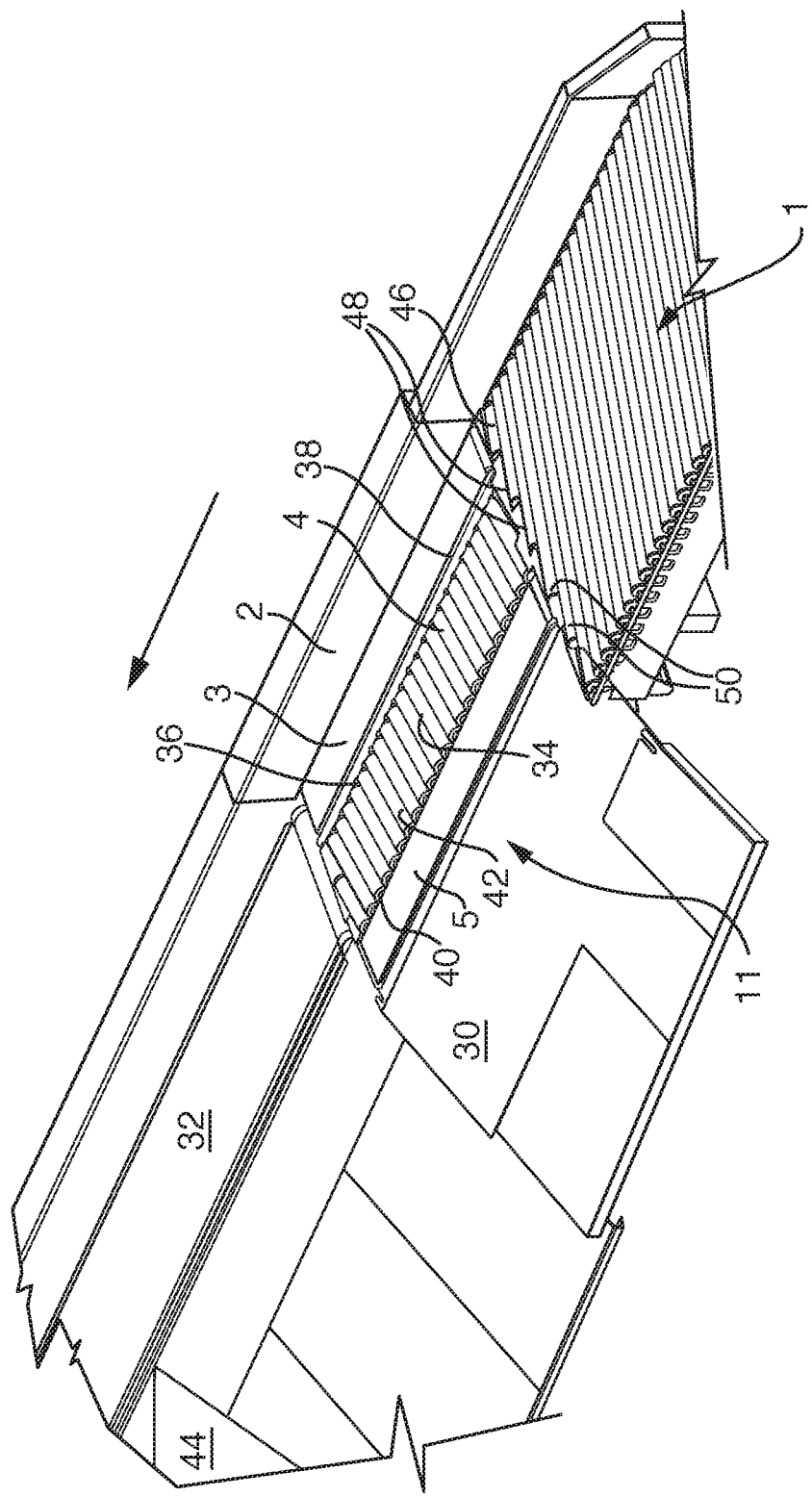
FIG. 1 is a top view showing a feed conveyor.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. As used herein, the term "about" can be reasonably appreciated by a person skilled in the art to denote somewhat above or somewhat below the stated numerical value, to within a range of +10%.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As shown in figures, the present invention relates to a conveying system for conveying and organizing and separating articles in side-by-side relationship.

As best illustrated in the figures, the articles such as a bag or small parcels or packages 6, 7, and 8, or large parcels 9 are conveyed from a feed conveyor 1 comprising a plurality of low friction powered skewed rollers onto a multistage singulator conveyor unit or assembly 11 having separating capabilities. The singulator 11 is arranged in alignment with, downstream of, and below the lower end of the feed conveyor 1 for receiving articles therefrom. The singulator includes a central conveying surface including a plurality of driven skewed rollers disposed between a selected number of high friction surface conveying lanes typically utilizing high friction belts. A downstream conveyor receives articles from the singulator in single file along the vertical side wall. It is contemplated that the vertical side wall could also utilize a high friction belt as well.

Single Stage Conventional Belt Width Singulator Unit

Figure 2:
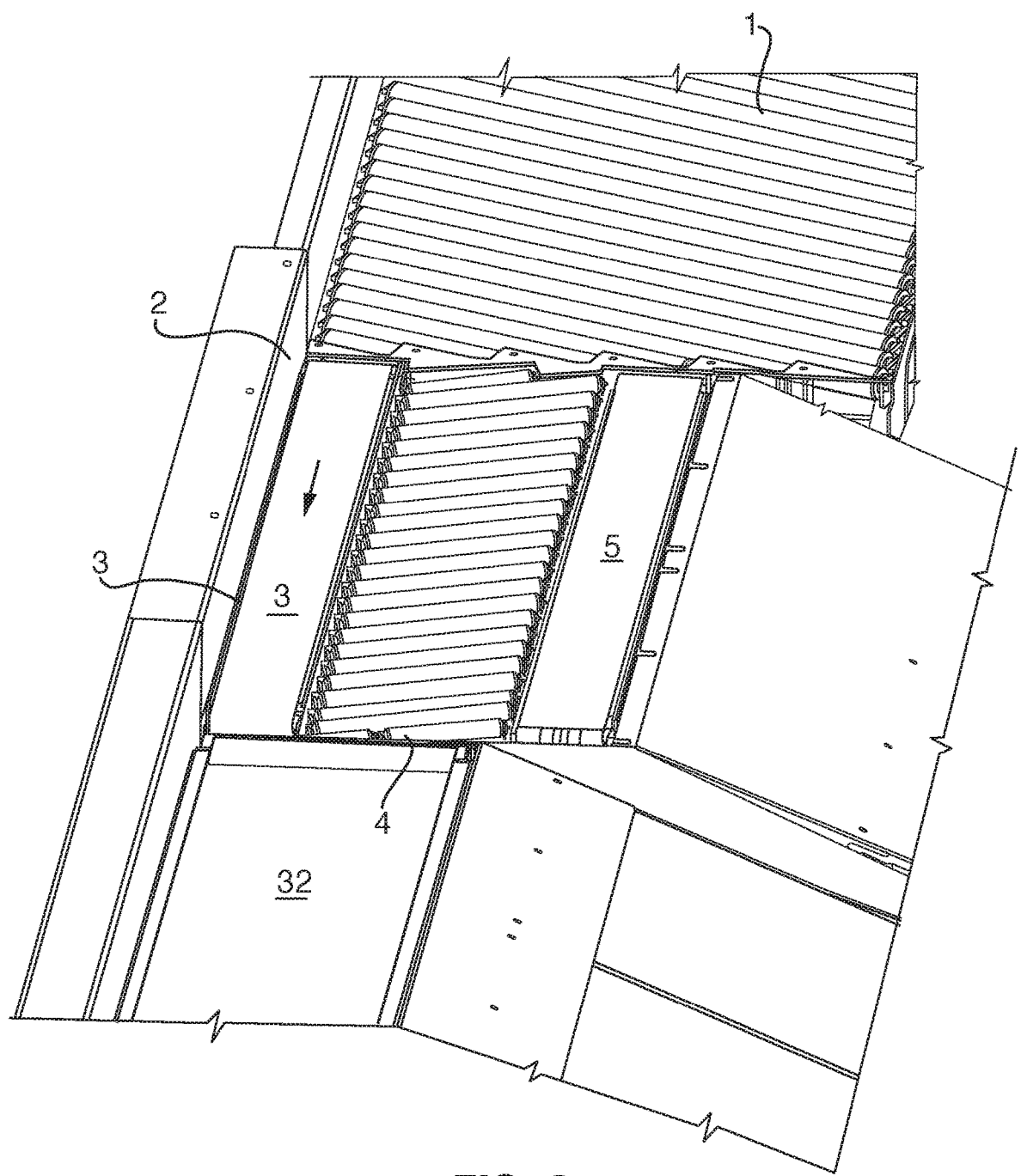
FIG. 2 is a top end view of FIG. 1.

As shown in FIG. 1 a feed conveyor comprising a plurality of powered skewed rollers conveying articles along a laterally positioned side wall onto a singulator having a first conveying lane surface having a high friction surface adjacent and parallel to the side wall with a lane width equal to that of the smallest item, a second conveying lane surface having a lower friction surface comprising skewed rollers parallel to and adjacent the first conveying lane, and a third conveying lane surface having a high friction surface adjacent to and parallel with the second conveying lane wherein a bag or small parcels are disposed upon the feed conveyor. FIG. 2 shows the conveying surface of the second conveying lane is angled vertically upward forming an inclined plane extending above the lateral receiving edge of third conveying lane and the inner lower receiving edge of the second conveying lane extends below the outer edge of the first conveying lane and the outer lateral edge of the second conveying lane extends even with or below the inner lateral receiving edge of the third conveying lane surface.

As shown in FIGS. 1-2, a single stage singulator assembly 11 includes first conveyor defining a high friction surface conveying lane 3 including rollers or preferably a belt having a high friction surface for conveying articles 6 along a vertical side wall 2 where incoming items are positioned there along. Packages resting against the vertical side-wall 2 and resting on the first conveyor 3 will proceed across the conveyor to the down stream conveyor 32. Typically, the first lane is sized to be no wider than the smallest item to be conveyed thereon. A second conveyor defining a lower friction surface conveying lane 4 is shown comprising a plurality of rollers 34 has an inner edge 36 positioned below and adjacent to an outer lateral edge 38 of the first conveyor 3 and is angled downwardly toward the first conveyor. The second conveyor 4 is typically at least as wide usually wider than the first conveyor 3. The second conveying lane 4 typically comprises a series of driven rollers 34 whose rotary axes are skewed relative to a longitudinal direction of travel so that the packages are conveyed simultaneously laterally forward and laterally outwardly away from the first conveyor. The inner lateral receiving edge 36 of the second conveyor is positioned a selected distance below the outer lateral edge 38 of the first conveyor 3 situated adjacent the lateral outer edge 38 of the first conveyor having a high friction surface. The second conveyor 4 has a lower friction surface for receiving packages which fall therefrom. The lateral forces of the second conveyor pull items positioned on the second conveyor away from the first conveyor and primary flow side wall to separate two small items 7, 8 that might enter abreast of one another. Packages which rest side by side or abreast one another are separated so that the package on the first conveyor moves forward and the adjacent package resting on the second conveyor is pulled away from the first conveyor. The second conveyor has a lower lateral receiving edge positioned below the outer lateral edge of the first conveyor and extends upward laterally therefrom at a selected angle forming an inclined plane extended above inner lateral receiving edge 40 and conveying surface of an adjacent third conveyor defining a high friction surface conveying lane 5. The outer lateral edge 42 of the second conveyor is positioned even with or below the inner lateral receiving edge 40 of the third conveying lane 5. The third conveying lane 5 moves articles laterally forward with no lateral motion; however, it is contemplated that the speed of the first, second or third conveying lanes can be adjusted with respect to one another to align articles thereon.

The singulator assembly 11 includes first conveyor 3 defining a first conveying lane including rollers or preferably a belt having a high friction surface for conveying articles 6 along a vertical side wall 2 where incoming items are positioned there along. Packages resting against the vertical side-wall 2 and resting on the first conveyor 3 will proceed across the conveyor to the down stream conveyor 32. The first lane is sized to be no wider than the smallest item to be conveyed thereon.

A second conveyor defining a second conveying lane 4 having a lower friction surface shown comprising a plurality of rollers 34 has an inner edge 36 positioned below and adjacent to an outer lateral edge 38 of the first conveyor or first conveying lane 3 and is angled downwardly toward the first conveying lane. The second conveying lane 4 is typically at least as wide usually wider than the first conveying lane 3. The second conveying lane 4 typically comprises a series of driven rollers 34 whose rotary axes are skewed relative to a longitudinal direction of travel so that the packages are conveyed simultaneously laterally forward and laterally outwardly away from the first conveying lane. The inner lateral receiving edge 36 of the second conveying lane is positioned a selected distance below the outer lateral edge 38 of the first conveying lane 3 situated adjacent the lateral outer edge 38 of the first conveying lane having a high friction surface. The second conveying lane 4 has a lower friction surface for receiving packages which fall therefrom. The lateral forces of the second conveying lane pull items positioned on the second conveying lane away from the first conveying lane and primary flow side wall to separate two small items 7, 8 that might enter abreast of one another. Packages which rest side by side or abreast one another are separated so that the package on the first conveying lane moves forward and the adjacent package resting on the second conveying lane is pulled away from the first conveying lane. The second conveying lane has a lower lateral receiving edge positioned below the outer lateral edge of the first conveying lane and extends upward laterally therefrom at a selected angle forming an inclined plane extended above inner lateral receiving edge 40 and conveying surface of an adjacent third conveying lane defining a third conveying lane 5 having a high friction conveying surface. The outer lateral edge 42 of the second conveying lane is positioned even with or below the inner lateral receiving edge 40 of the third conveying lane. The third conveying lane moves articles laterally forward with no lateral motion; however, it is contemplated that the speed of the first, second or third conveying lanes could be adjusted with respect to one another to align articles thereon. The inclined plane and angle of the rollers of the second conveying lane 4 guide and urge articles upwardly toward the third conveying lane where the lateral momentum of the article being transferred laterally will tend to position the center of gravity of the item, so that the article falls under control of the third conveying lane's forward conveying forces and is no longer influenced by the conveying forces of the second lane.

The driven first conveyor lane 3 includes a first high friction conveying surface comprising a belt 3 having a first high friction surface for conveying articles 7, 8, along a vertical side wall 2 where incoming items are positioned there along at a selected speed. The width of the conveying lanes is determined by the size or dimensions of the packages. The width of the first conveying lane is sized to be equal to of less than the smallest package width.

A second conveying lane 4 having a lower friction surface includes both a forward and lateral conveying forces. The second conveying lane 4 typically comprises a series of driven rollers 34 whose rotary axes are skewed relative to a lateral direction of travel so that the packages are conveyed simultaneously laterally forward and laterally outwardly away from the first conveying lane 3 and side wall 2. As a result the packages tend to form a single file traveling laterally along the side wall 2 on the first conveying lane surface 3, or the center of gravity or frictional forces cause the package to extend over the edge of the first conveying lane 3 and a portion to rest on the second conveying lane 4 which moves in a forward and lateral direction. The package would still move forward so long as a portion rests upon the high friction surface of the first conveying lane 3. The width of the second conveying lane 4 having the lower friction surface is typically greater than the width of the first conveying lane 5 having lower friction surfaces in order to allow lateral movement and separation of the packages thereon.

The width of the conveying lanes is determined by the size or dimensions of the packages. The width of the first conveying lane is sized to be equal to of less than the smallest package width.

The inner edge 36 of the second conveying lane adjacent the outer edge 38 of the first conveying lane is disposed at a slightly lower elevation along the lateral axis, then the first conveying lane providing a lower elevation 33 situated between the first and second conveying lanes so that packages resting on both the first conveying lane 3 and the second conveying lane 4 will be held securely and be pulled forward by the first conveying lane 3 having a high friction surface. The lower friction conveying surface of the second conveying lane 4 is angled vertically upward at a selected angle of up to 30 degrees and more preferably from 5-25 degrees from the outer edge of the first conveying lane providing an inclined plane extending upward toward the third conveying lane so that the outer lateral edge 45 of the second conveying lane is equal to or slightly lower than the inner lateral edge 40 of the adjacent third conveying lane whereby articles are removed laterally as they move forward progressing on a somewhat inclined plane.

The lower friction conveying surface of the second conveying lane is set at the same elevation as the first conveying lane where it mates with the first conveying lane. The second conveying lane includes forward and lateral forces away from the first conveying lane and upward toward the third conveying lane. The outer lateral edge 42 of the angled second conveying lane extends upward to a lateral transition zone 36 slightly below or even with the lateral receiving edge 40 of the third conveying lane.

Multistage Multi-Lane Singulator Unit

Figure 3:
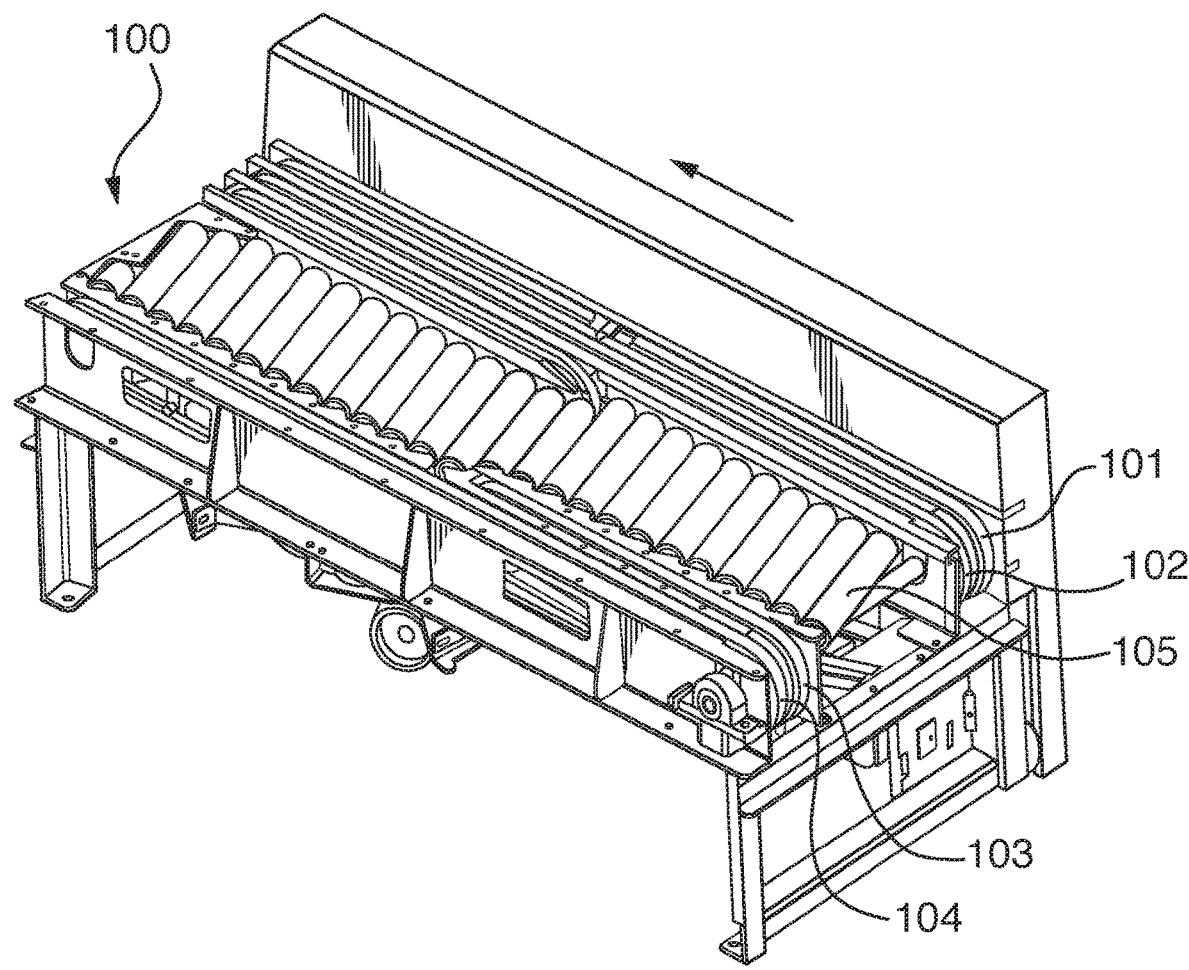
FIG. 3 shows a multistage multi-lane singulator.
Figure 4:
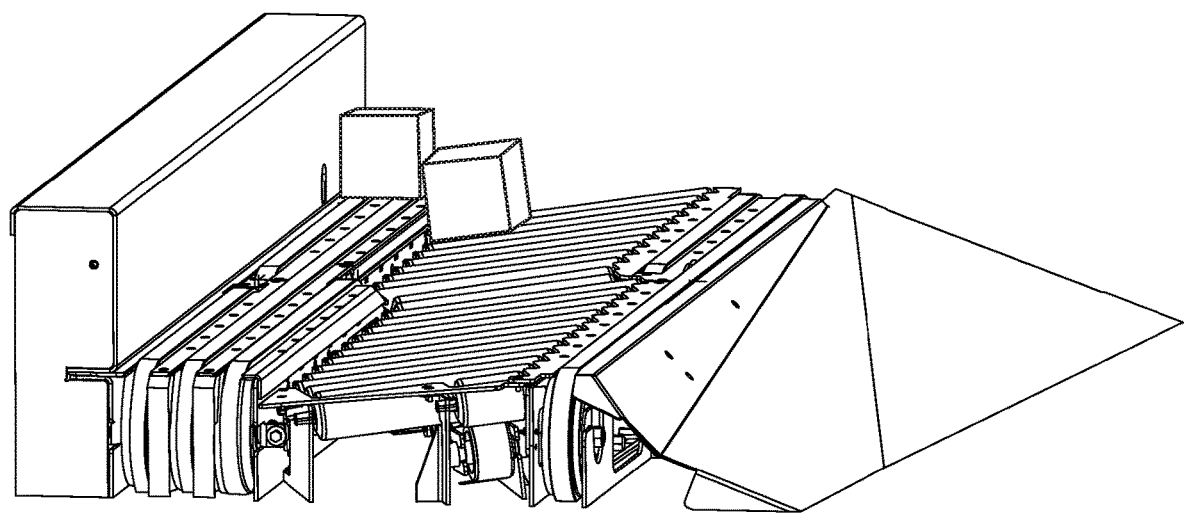
FIG. 4 shows a multistage multi-lane singulator conveyor unit of FIG. 3 supporting a plurality of side by side boxes on the first, second, and third conveyors, and a drop ramp.

As shown in FIGS. 3 and 4, a multistage multi-lane singulator conveyor unit 100 includes a vertical side wall extending along an inner lateral edge and at least three adjacent and laterally disposed conveyor surfaces in lateral flow communication at selected levels.

As shown in FIG. 3, a conveyor unit having adjacent lateral conveying surfaces in flow communication with one another including a first inner lane having a high friction conveying surface comprising one or more narrow high friction belts, a second middle lane having a lower friction conveying surface comprising skewed rollers or a lower friction belt, and a third outer lane having a high friction conveying surface comprising one or more narrow belts. The multistage multi-lane singulator conveyor unit 100 includes adjacent lateral conveying surfaces in flow communication with one another including at least one narrow inner high friction conveying surface comprising at least one high friction narrow belt and/or (two high friction narrow belts 101 and 102 as shown in FIG. 3) or optionally a plurality of narrow high friction belts. At least one intermediate or center lane 105 lower friction conveying surface comprises a plurality of skewed rollers or a selected size and width or a belt having a lower friction surface. A third outer high friction conveying surface comprises at least one narrow high friction belt or optionally, (two narrow high friction belts 103 and 104 as shown in FIG. 3) or a plurality of narrow high friction belts.

The width of the conveying lanes is typically determined by the size or dimensions of the packages. The width of the first conveying lane is typically sized to be equal to of less than the smallest package width to be separated by the singulator; however, the multi-lane singulator utilizes a plurality of narrow high friction belts whereby the sum total of the width of the belts in the first conveying lane is typically equal to the of less than the smallest package width to be separated by the singulator. Moreover, a plurality of spaced apart aligned narrow belts are grouped together forming patterns or fields of high friction surfaces to control the movement or resist movement of the packages in contact with the high friction surface of one or more narrow belts. Narrow in one preferred embodiment can be defined functionally as requiring at least two belts to equal the width of the smallest package to be separated. Physically the belts are up to 12 inches in width, more preferably 10 inches in width, more preferably eight inches in width, more preferably six inches in width, more preferably two to four inches in width, more preferably 1 to 3 inches in width, or ¼ inch to one inch in width. By utilizing groups of belts positioned in spaced apart aligned relationship, movement of packages across the high friction belts enable the formation of high friction areas on a conveyor with low friction areas to control movement of packages thereon.

In one preferred embodiment, the high friction surface of the first conveying lane increases in width and the high surface area of the third conveying lane decreases in width on the take-off lane side. A width of the low friction second conveying lane disposed between the first conveying lane and the third conveying lane changes in width in accordance with the change in width of the first conveying lane and second conveying lane. The change in width of the high friction first conveying lane and the high friction third conveying lane changes correspondingly so that the width of the first conveying surface, second conveying surface, and third conveying surface are the same from the feed end of the conveyor to the discharge end of the conveyor.

Linking one of more multi-lane conveyors in flow communication end to end forms a multistage multi-lane singulator assembly for separating packages.

A driven first or inner conveying lane has a high friction conveying surface for conveying articles along in a forward direction in a generally horizontal plane. The first conveying lane of the multi-lane singulator comprises a plurality of high friction surface spaced apart and parallel narrow belt as opposed to the single stage singulator utilizing a single high friction surface belt. Of course, high friction surface conveying lanes may be fabricated from combinations of belts of various widths to achieve the optimum high friction surface area for various applications. Moreover, a single conveying lane of the multi-lane singulator may comprise a single belt extending the length of the conveyor unit or a plurality of short belts aligned end to end terminating at selected positions along the conveyor. In FIG. 3, the two inner belts extend the length of the conveyor while the third outer belt terminates at selected position about half the length of the conveyor unit.

A driven second or middle conveyor defining a lower friction surface middle conveying lane is positioned adjacent to an outer lateral edge of the first conveying lane. The second conveying lane has a lower lateral receiving edge positioned below the outer lateral edge of the first conveying lane and extends upward laterally therefrom at a selected upward angle forming an inclined conveying surface. The second conveying lane has a lower friction conveying surface formed by a series of driven rollers whose rotary axes are skewed relative to a lateral direction of travel for conveying packages simultaneously forward and laterally outwardly away from the first conveying lane. The second conveying lane extends upward laterally from the first conveying lane at a selected angle whereby the lower friction surface forms an inclined plane extending above an inner lateral receiving edge and conveying surface of an adjacent third conveyor defining a high friction surface conveying lane. An inner edge of the second conveying lane extends along and in flow communication with the outer edge of the first conveying lane and the outer edge of the second conveying lane extends along and in flow communication with the inner edge of the third conveying lane.

The driven third or outer conveyor defining a third conveying lane has a plurality of high friction surface conveying lanes for conveying articles along in a forward direction in a generally horizontal plane forms a third conveying lane disposed adjacent an outer lateral edge of the second conveyor. The second conveyor has an outer lateral edge extending upward toward an inner lateral receiving edge of the third conveyor. The outer lateral edge of the second conveyor is positioned below or even with the lateral inner receiving edge of the third conveyor for conveying articles upward and over the inner lateral receiving edge of the third conveyor. The inclined plane and angle of the rollers of the second conveyor 4 guide and urge articles upwardly toward the third conveyor where they drop over the inner lateral receiving edge 40 of the third conveyor and into engagement with the third conveyor's 5 high friction conveying surface.

A driven third or outer conveying lane has a high friction conveying surface for conveying articles along in a forward direction in a generally horizontal plane forms a third conveying lane disposed adjacent an outer lateral edge of the second conveyor. The third conveying lane of the multi-lane singulator comprises one or more high friction surface spaced apart and parallel narrow belts as opposed to the single stage singulator utilizing a single high friction surface belt. Of course, high friction surface conveying lanes may be fabricated from combinations of belts of various widths to achieve the optimum high friction surface area for various applications. Moreover, a single conveying lane of the multi-lane singulator may comprise a single belt extending the length of the conveyor unit or a plurality of short belts aligned end to end terminating at selected positions along the conveyor. In FIG. 3, the third outer belt extends a selected distance and terminates at selected position about half the length of the conveyor unit.

Separation Mechanism and Operation

The transfer of packages from the lower friction surface 104 of the second conveying lane 4 to the high friction conveying lane 5 is best illustrated in a representative section view of FIGS. 5-9.

Figure 5:
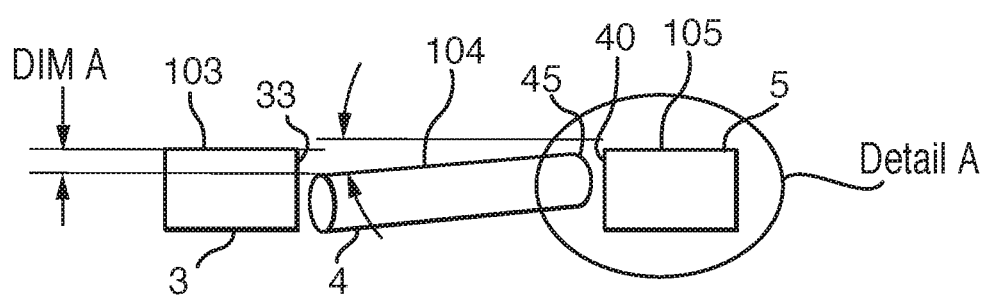
FIG. 5 shows the first conveyor is horizontal with the third conveyor and the lateral receiving edge second conveyor is positioned below the outer edge of the first conveyor and angled upward so that the outer edge of the second conveyor is lower than the receiving edge of the third conveyor but the plane formed by the transverse angle extends above the third conveyor.
Figure 6:
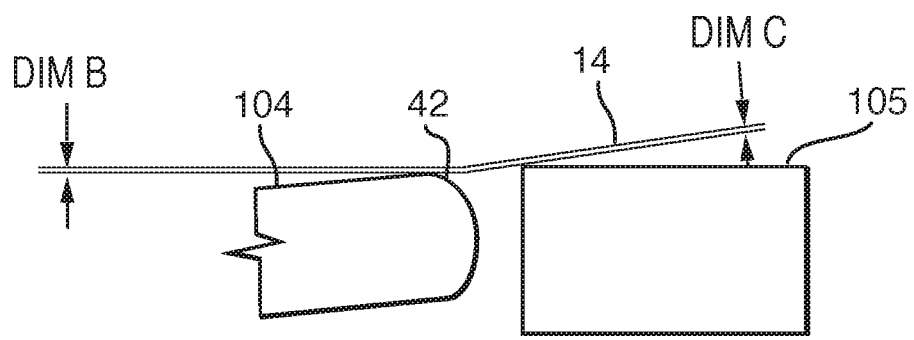
FIG. 6 is a enlargement of a portion of FIG. 2 showing that the outer lateral edge of the lower friction conveying surface of the second conveying lane is set at an elevation below the elevation of the third conveying lane conveying surface and that the plane of the second lane extends above the surface of the third conveying lane.
Figure 7A:
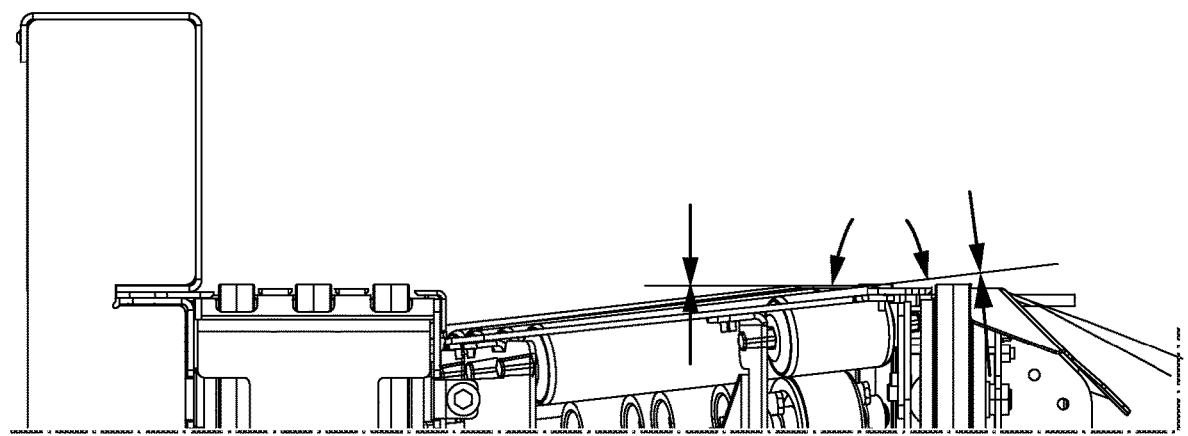
FIG. 7(*a*) is a downstream end view of the multistage conveyor.
Figure 7B:
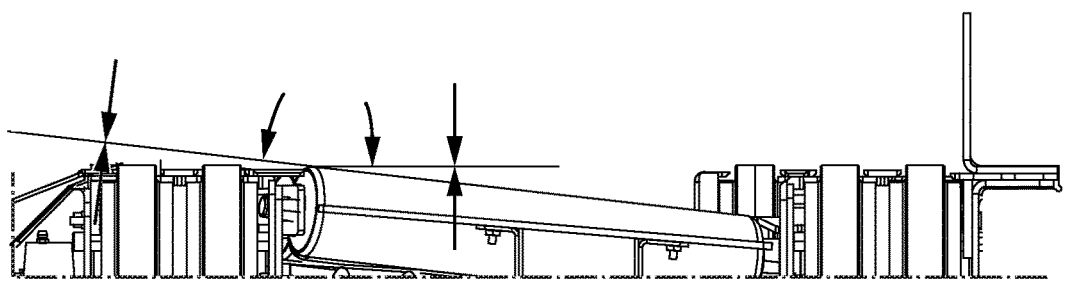
Figure 8A:
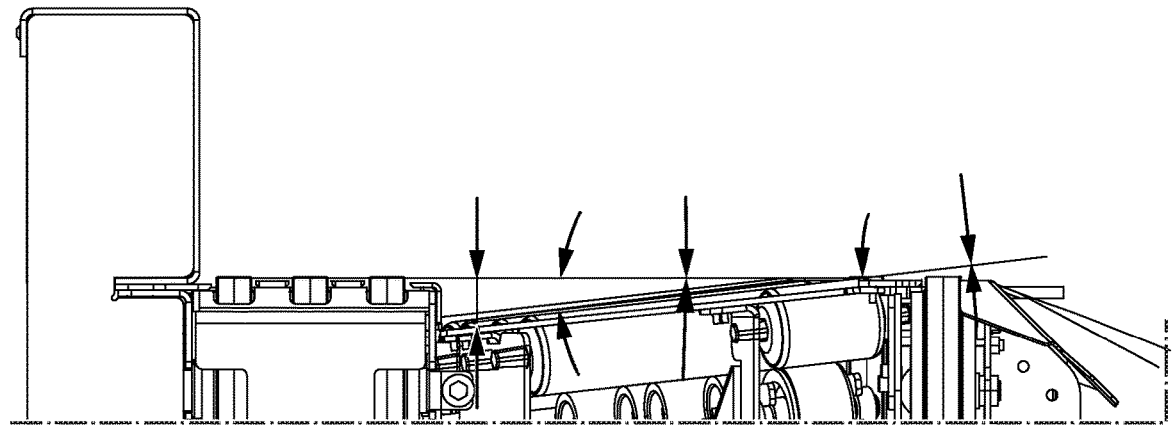
FIG. 8(*a*) is a downstream end view of the multistage conveyor.
Figure 8B:
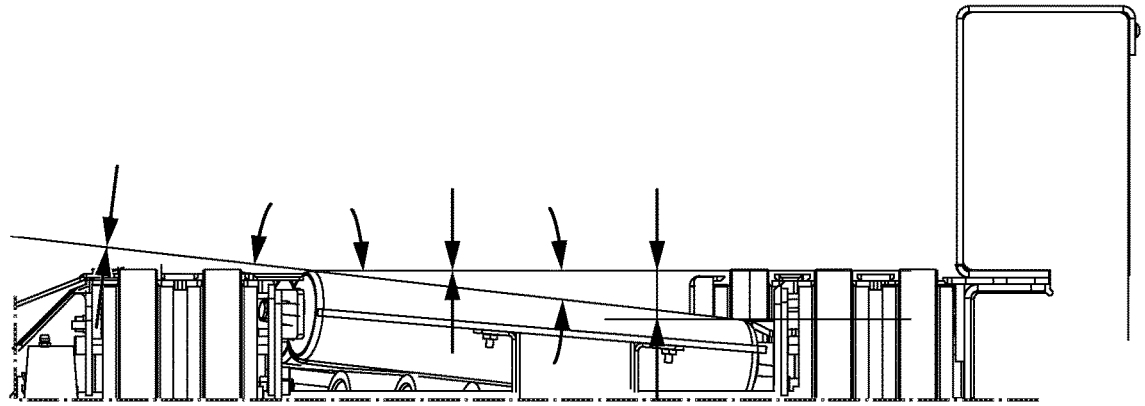
Figure 9A:
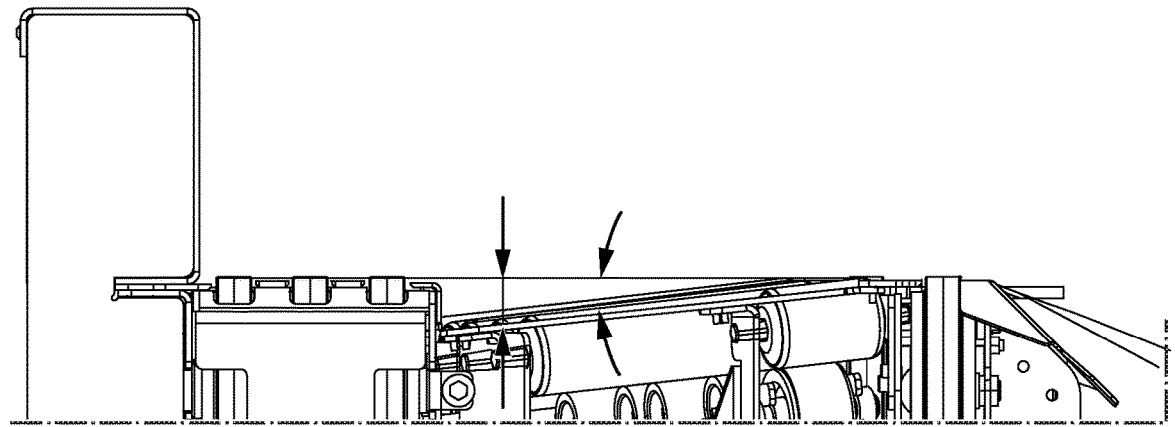
FIG. 9(*a*) is a downstream end view of the multistage conveyor showing the positioning of the high friction surface of the first and third conveying lanes with respect to the lower friction surface of the middle or second conveying lane.
Figure 9B:
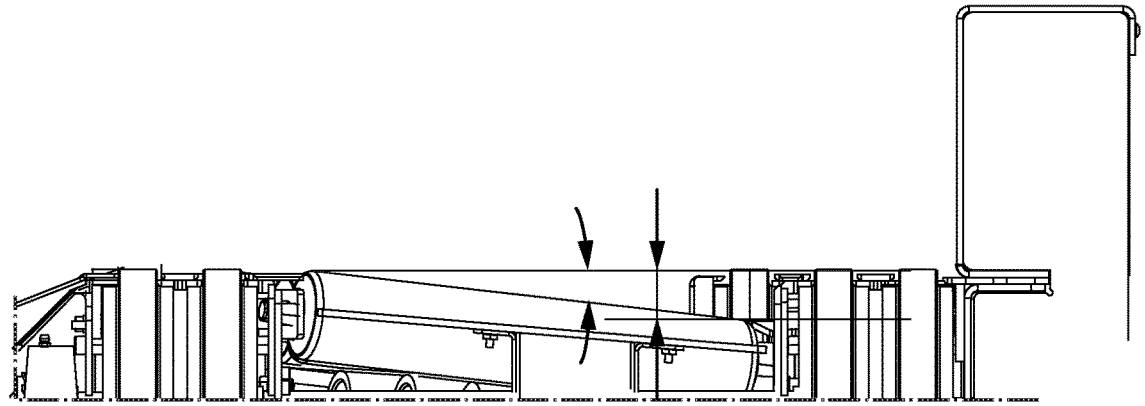

FIG. 5 shows the first conveyor is horizontal with the third conveyor and the lateral receiving edge second conveyor is positioned below the outer edge of the first conveyor and angled upward so that the outer edge of the second conveyor is lower than the receiving edge of the third conveyor but the plane formed by the transverse angle extends above the third conveyor. In FIG. 6, the outer lateral edge of the lower friction conveying surface of the second conveying lane is set at an elevation below the elevation of the third conveying lane conveying surface and that the plane of the second lane extends above the surface of the third conveying lane. A downstream end view of the multistage conveyor is shown in FIG. 7*a* showing the positioning of the high friction surface of the first and third conveying lanes with respect to the lower friction surface of the middle or second conveying lane showing the gap between the skewed rollers of the second lane that the second conveying lane is angled laterally forming an inclined plane that includes the conveying surface of the second plane of the second conveying lane extending above (DIM C) the conveying surface of the third high friction conveying lane. An upstream end view of the multistage conveyor showing the positioning of the high friction surface of the first and third conveying lanes with respect to the lower friction surface of the middle or second conveying lane showing the gap between the skewed rollers of the second lane that the second conveying lane is angled laterally forming an inclined plane that includes the conveying surface of the second plane of the second conveying lane extending above (DIM C) the conveying surface of the third high friction conveying lane as shown in FIG. 7*b*. FIG. 8(*a*) is a downstream end view of the multistage conveyor showing the positioning of the high friction surface of the first and third conveying lanes with respect to the lower friction surface of the middle or second conveying lane showing the gap between the skewed rollers of the second lane disposed at a lateral angle forming a conveying surface having a plane extending above the adjacent lateral edge of the high friction belt and the gap therebetween and FIG. 8(*b*) shows upstream end view of the multistage conveyor showing the positioning of the high friction surface of the first and third conveying lanes with respect to the lower friction surface of the middle or second conveying lane showing the gap between the skewed rollers of the second lane disposed at a lateral angle forming a conveying surface having a plane extending above the adjacent lateral edge of the high friction belt and the gap therebetween. As illustrated in FIG. 9(a), the multistage conveyor show the positioning of the high friction surface of the first and third conveying lanes with respect to the lower friction surface of the middle or second conveying lane depicting the lateral angle formed by the second lane extending upward from below the surface of the first lane having an outer lateral edge terminating below the adjacent lateral receiving edge of the conveying surface of the third lane and the plane of the conveying surface of the second plane extending above the outer high friction narrow belt plane in a downstream end view. FIG. 9(b) shows the upstream end view of the multistage conveyor positioning of the high friction surface of the first and third conveying lanes with respect to the lower friction surface of the middle or second conveying lane showing the lateral angle formed by the second lane extending upward from below the surface of the first lane having an outer lateral edge terminating below the adjacent lateral receiving edge of the conveying surface of the third lane and the plane of the conveying surface of the second plane extending above the outer high friction narrow belt plane.

The second conveying lane is angled laterally forming an inclined plane that includes the conveying surface of the second plane of the second conveying lane 4 extending above (DIM C) the conveying surface 105 of the third high friction conveying lane of the third conveying lane 5. The outer lateral edge of the conveying surface the second conveying lane 5 lane is below (DIM B) the elevation of the outer lateral receiving edge of the third conveyor lane 3; however, the spacing between the second and third conveying lanes allows for inclined plane of the low friction conveying surface of the second conveying lane to extend over the inner lateral receiving edge of the third conveying lane in order for packages transferred from the second conveying lane to pass over and onto the third conveying lane. FIGS. 7-9 show the spatial relationship between the first conveying lane and the third conveying lane of the multi-lane conveyor shown in FIGS. 3 and 4.

Figure 10:
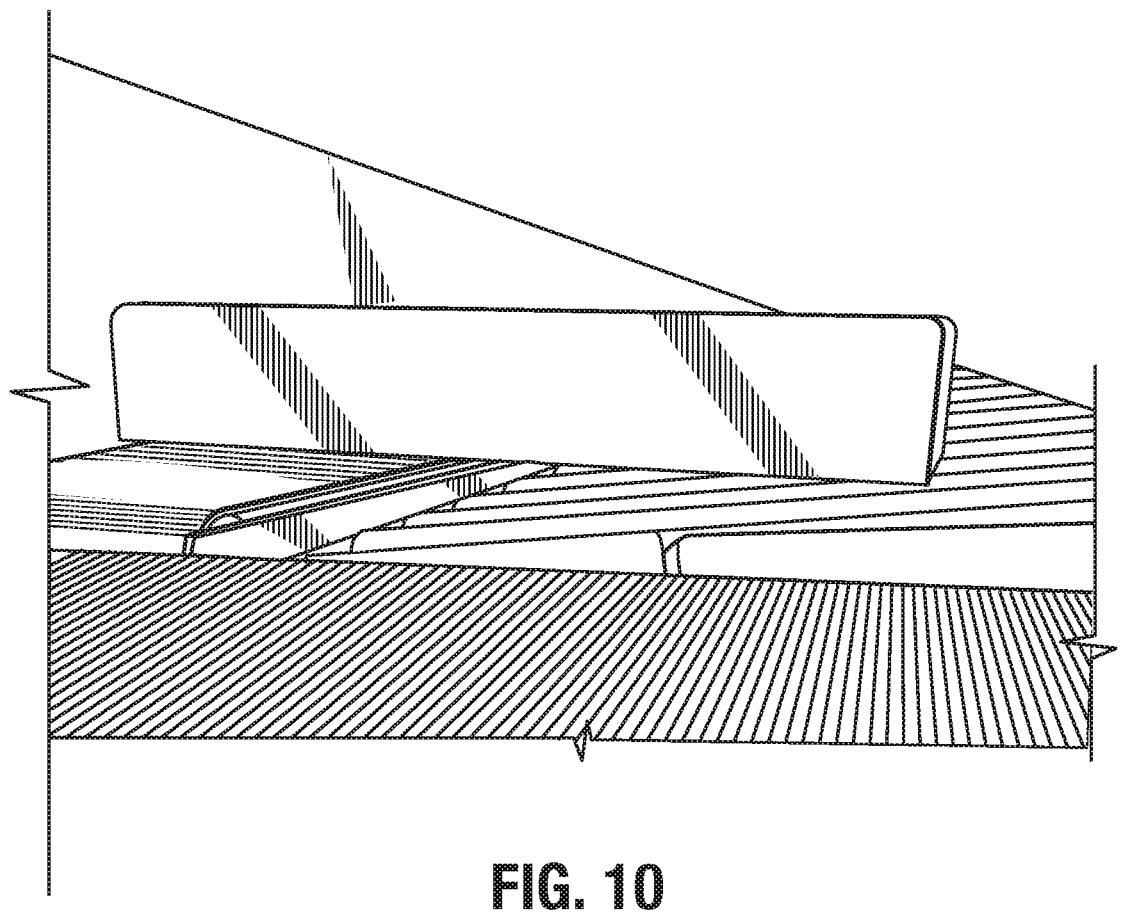
FIG. 10 shows a large parcel supported by a first high friction conveying surface and intermediate low friction conveying surface.

Large packages which hang over the side of the first conveying lane having a portion resting on the second conveying lane are carried forward as shown in FIG. 10 wherein a large parcel is shown abutting the vertical side wall supported by a first high friction conveying surface comprising a belt with a portion of the parcel extending across the intermediate low friction conveying surface comprising a plurality of rollers.

Figure 11:
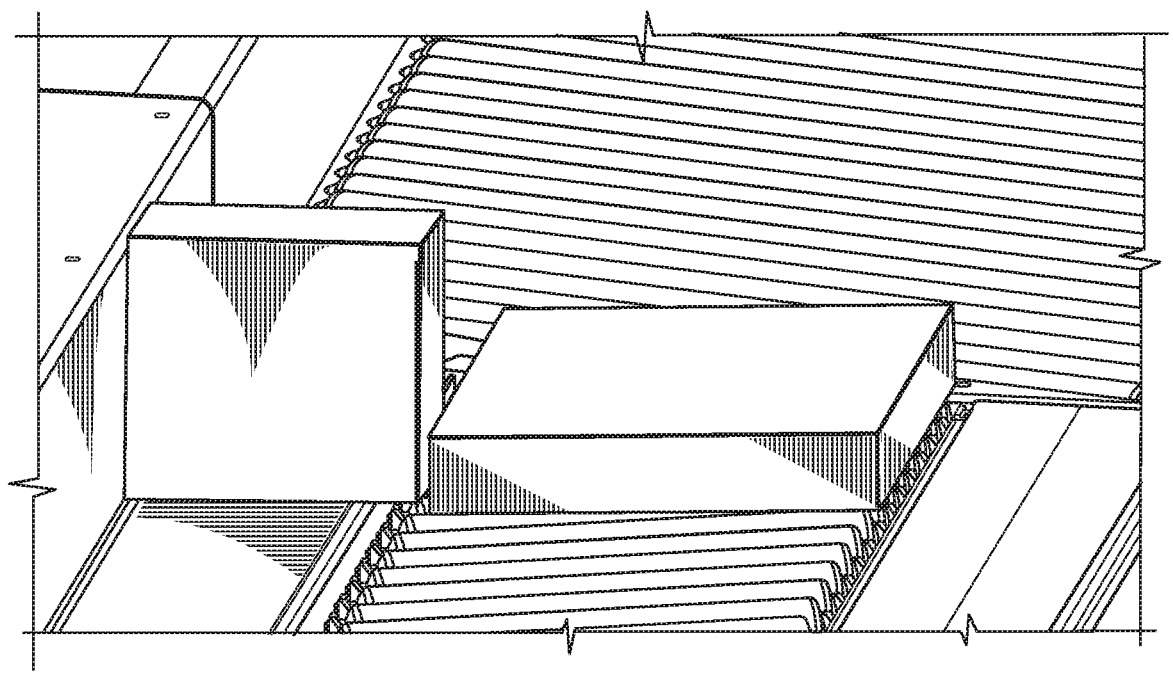
FIG. 11 is an enlarged view of a portion of FIG. 10.
Figure 12:
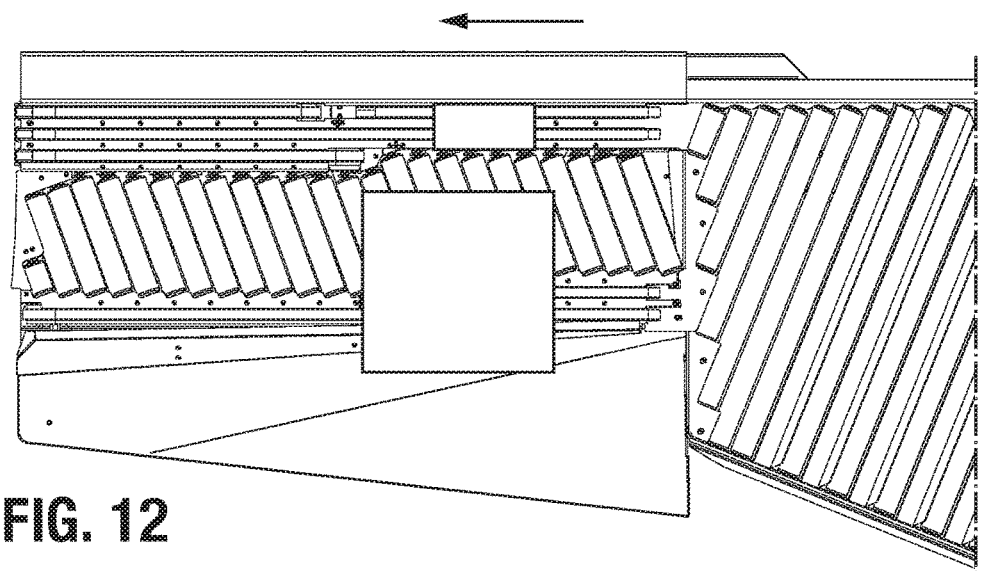
FIG. 12 shows a multistage conveyor.
Figure 13:
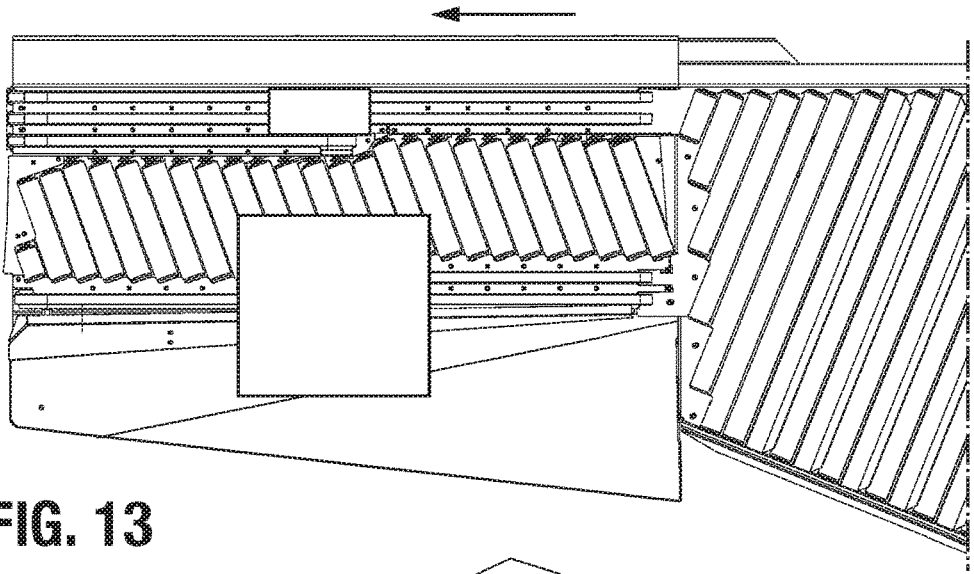
FIG. 13 shows a multistage conveyor of FIG. 12 wherein the small package abuts the vertical side wall.
Figure 14:
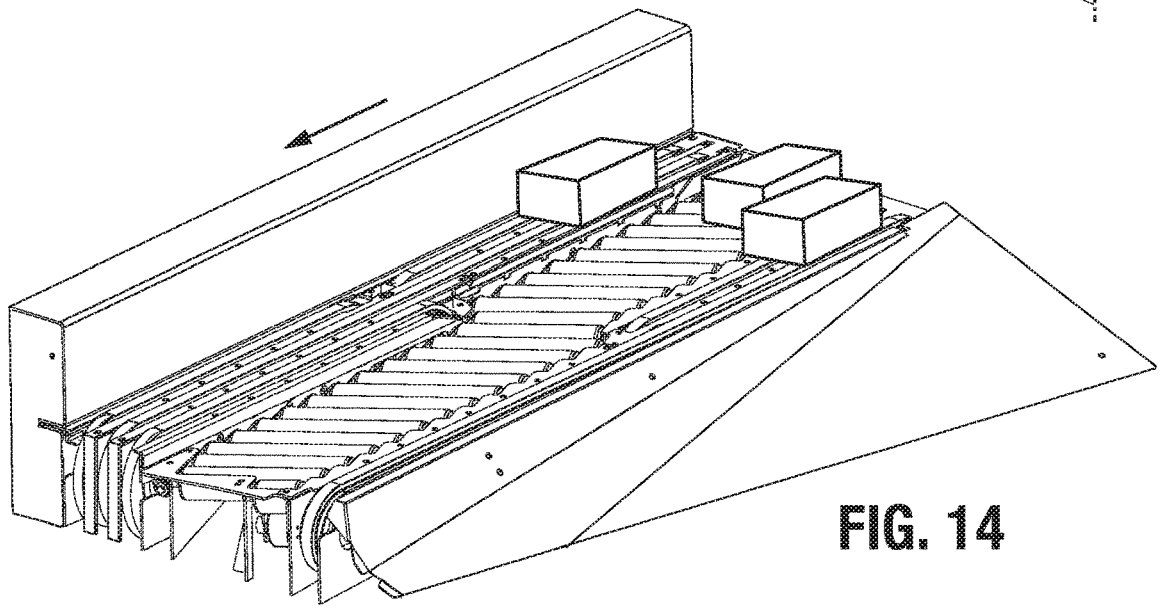
FIG. 14 is an isometric view showing a multistage conveyor.

When packages positioned abreast of one another on the feed conveying lane are fed onto the singulator, the forward forces of the first conveying lane pulls the package forward and the lateral forces of the second conveying lane forces the adjacent package away from the primary flow side wall to separate two items that might enter abreast of one another as depicted in FIG. 11 in a single stage conveyor showing a package supported by the high friction surface of the first conveying lane and lower friction surface of the second conveying lane wherein the high friction surface prevents the package from moving laterally away from the vertical side wall and FIGS. 12-14 in a multistage multi-lane conveyor.

FIG. 12 shows a multistage conveyor having a small package aligned with and conveyed straight through on the first conveying lane comprising a plurality of high friction narrow belts and a outward shift of a large package having a portion positioned on the second conveying lane comprising low friction skewed rollers positioned at a lateral angle of up to 30 degrees and a portion of the box extending above a third high friction conveying lane comprising at least one narrow belt. The small package abuts the vertical side wall conveyed on a first high friction conveying lane comprising two narrow belts, and the large package has shifted from the second conveying lane low friction skewed rollers and is supported by a third conveying lane comprising a narrow high friction belt with a portion of the package suspended above the lower friction conveying surface of the rollers as illustrated in FIG. 13. A first parcel is conveyed forward and straight through along the vertical wall on a plurality of inner narrow high friction belts, a second parcel adjacent thereto conveyed forward and laterally upward on the second conveying lane of lower friction skewed rollers angled upward toward a pair of narrow high friction belts, and a third parcel conveyed forward by the third adjacent the second parcel whereby the third parcel is conveyed forward by the third conveying lanes comprising a pair of outer high friction narrow belts in FIG. 14.

Slightly larger items, rigid and nonrigid entering and coming in contact with the first high friction conveying lane and the second lower friction conveying lane will not tend to be transferred laterally away form the primary flow side along the wall due to substantially higher friction of the first high friction conveying lane.

Figure 15:
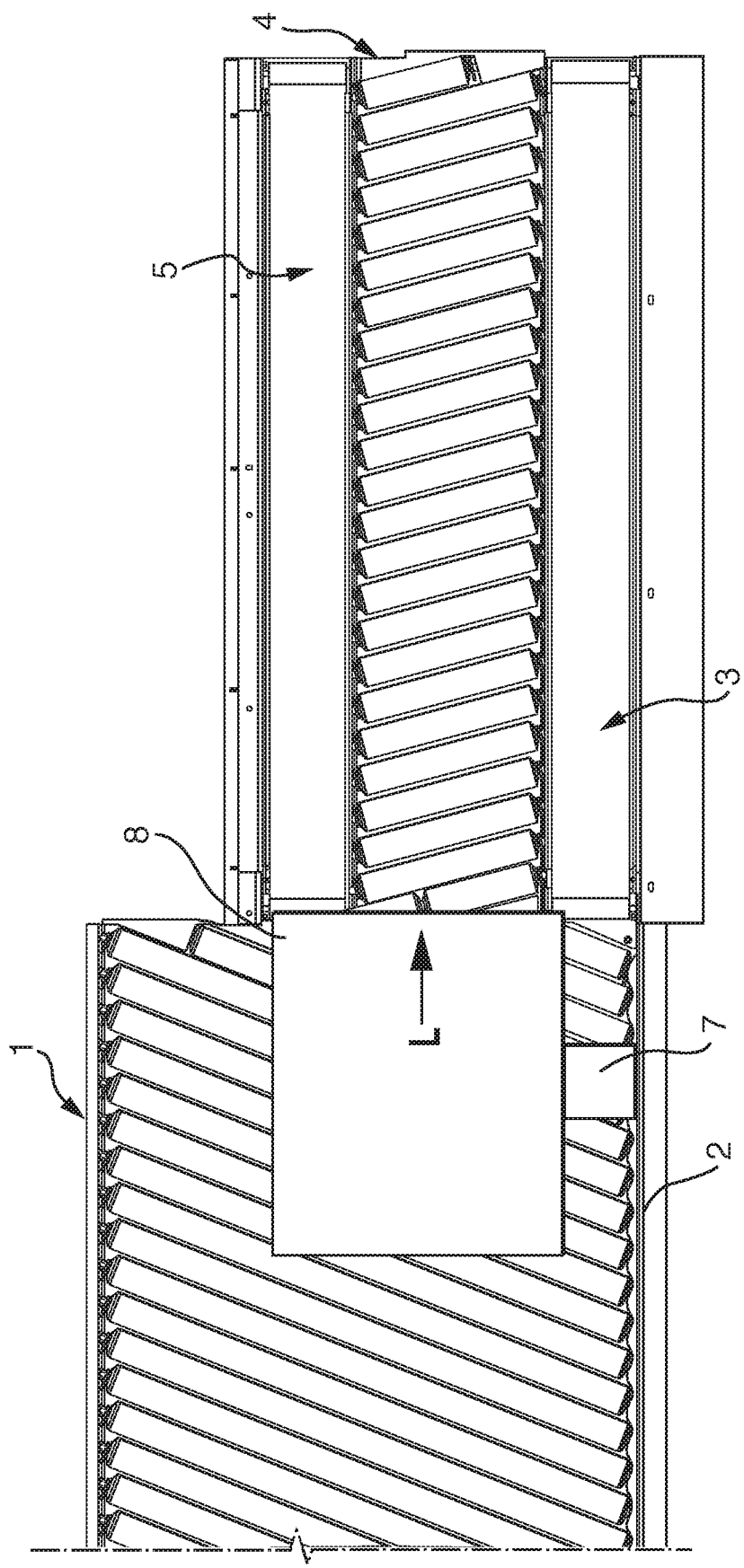
FIG. 15 is a top view showing a small parcel narrower than the width of the inner high friction conveying surface.
Figure 16:
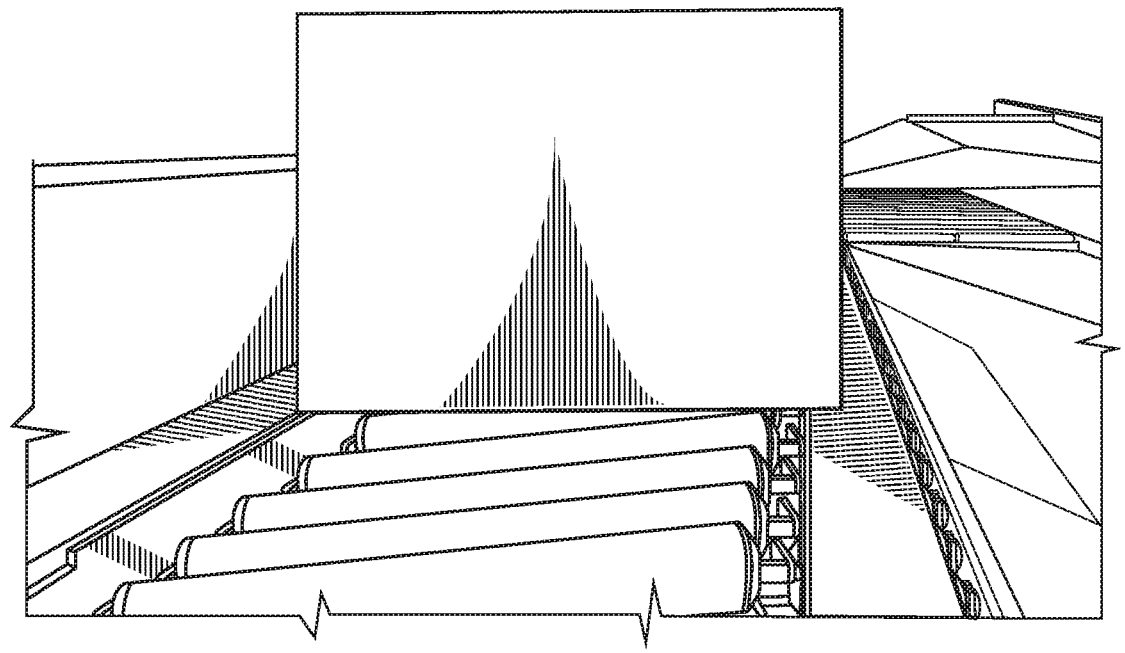
FIG. 16 is an end view showing a single stage conveyor.

The driven third conveying lane has a high friction surface which is laterally positioned alongside of the second conveyor lane on the opposite side from the first conveying lane primary flow side. If the third conveyor having a receiving side edge conveying surface is higher than the outer edge of the conveying surface of the second conveyor, the second conveyor conveying surface will not exert significant lateral force on a large article passing through on the first and third conveying lanes. The third conveying lane is elevated at the same level as the first conveying lane so the conveying surface of the third conveying lane is above the conveying surface that includes the second conveying lane so large packages resting on the first and third conveying lane past thorough the singulator as depicted in FIGS. 15-16.

The rate of conveyor speed in the forward direction of the first, second, and third conveyor can be controlled independently; however, it is desirable for the first and third conveying lane to travel at the same rate of speed in order for large parcels resting on the first and third conveying lane high friction conveying surfaces to be conveyed thorough the conveyor unit.

Figure 17:
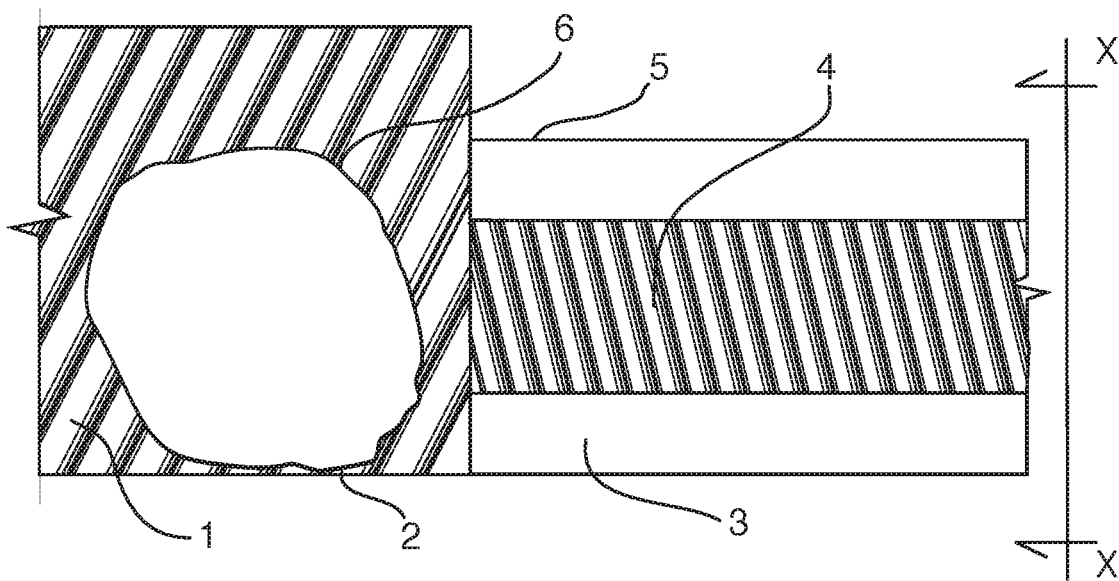
FIG. 17 is a top view showing a partially fill bag of small parcels shown prior to entering the conveyor wherein the bag will be positioned and supported by the first, second, and third conveying lanes with the high friction surfaces of the first lane controlling and limiting lateral movement so the bag passes through the conveyor.
Figure 18:
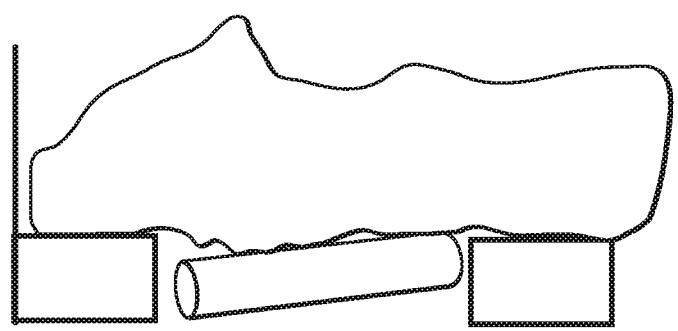
FIG. 18 is an end view showing a partially fill bag of small parcels positioned on the first, second, and third conveying lanes with the high friction surfaces of the first and third lanes controlling and limiting lateral movement so the bag passes through the conveyor.

Large bags containing small items which due to their lack of rigidity come in contact with all three conveying lanes; however, the combination of friction forces presented by the first high friction conveying lane and the third high friction conveying lane will tend to resist the lateral forces applied by the second low friction conveying lane allowing the bag to transfer straight through, without being laterally shifted away from the primary flow along the wall as shown in FIGS. 17-18. In FIG. 17, a partially fill bag of small parcels is shown prior to entering the conveyor wherein the bag will be positioned and supported by the first, second, and third conveying lanes with the high friction surfaces of the first lane controlling and limiting lateral movement so the bag passes through the conveyor. A partially fill bag of small parcels positioned on the first, second, and third conveying lanes with the high friction surfaces of the first and third lanes controls and limit lateral movement so the bag passes through the conveyor shown in FIG. 18.

The selected lateral angle of the second conveying lane and the spacing between the second and third conveying lanes determine the requisite angle of the lateral plane formed by the angled conveying surface of the second conveying lane necessary for conveyance of articles transferring from the second conveying lane over the lateral side receiving edge of the third conveying lane as shown in FIGS. 7-9.

The third conveying lane utilizes a higher friction conveying surface than the second conveying lane having a lower friction conveying surface, so an article in transition moving forward and upward on the low friction skewed conveyor rollers has enough momentum to carry it across the second lane so that the edge of the article extends over the third lane and so that when the center of gravity is over the third conveying lane the article falls onto the high friction conveying surface. A portion of each article or package that extends above the third conveyor lane will move upward and over the third conveyor lane. The lateral momentum of the item being transferred laterally will tend to position the center of gravity of the item, so that the item falls under control of the third high friction lane's forward conveying forces, no longer influenced by the conveying forces of the second lane, and third conveying lane and the package drops onto the high friction surface of the third conveying lane.

The first conveyor 3 and third conveyor 5 high friction conveying lanes can each be formed by endless conveyor belts comprised of rollers covered or coated with a high friction surface such as a rubber or an elastomer compound; a roller comprising a plastic or rubber compound or solid or mesh belts comprising rubber, elastomers, or polymers. The lower friction conveying lane of the second conveyor 4 is typically composed of metal such as aluminum, carbon steel, metal alloy, or stainless steel or a plastic material, a graphite material, or a tetrafluoroethylene, "TEFLON" material. The second conveyor lane might be formed by using a plastic modular belting, containing driven rollers with presenting a conveying force with a lateral component.

The first conveyor and third conveyor high friction conveying lanes can each be formed by a plurality of rollers with an axis that is substantially horizontal and perpendicular to the primary flow direction, and includes a high friction surface. The first conveying lane and third conveying lane need not be both of same type, but preferably comprise an endless belt or high friction surfaced rollers.

The second conveyor 4 lane can be formed by plurality of lower friction surface rollers oriented to generate conveying forces that are forward with primary flow direction of the first high friction conveyor and also having a lateral component away from the first conveying lane and primary wall, and include an upward component in the lateral direction away from the first conveying lane primary flow lane. The second lower friction conveying lane may be formed by using a plastic modular belting, containing driven rollers with presenting a conveying force with a lateral component.

The entire machine might not be arranged with both high friction surfaces horizontal, but could be arranged at an angle so that the second lane falls in a horizontal plane, or at a point where all three are at an angle, but the relative positions is maintained as described above.

It is contemplated that a vertical belt may extend along an inner side of the first inner primary conveyor in place of the vertical side wall for abutment and alignment of packages in flow communication therewith.

EXAMPLES

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples.

Example 1

Adding additional stages to the singulator conveyor provides a continuous path for the progression of article separation and removal of articles such as packages positioned abreast of one another by incorporating more separation steps using a plurality of narrow high friction surface conveying lanes such as narrow belts.

Figure 19:
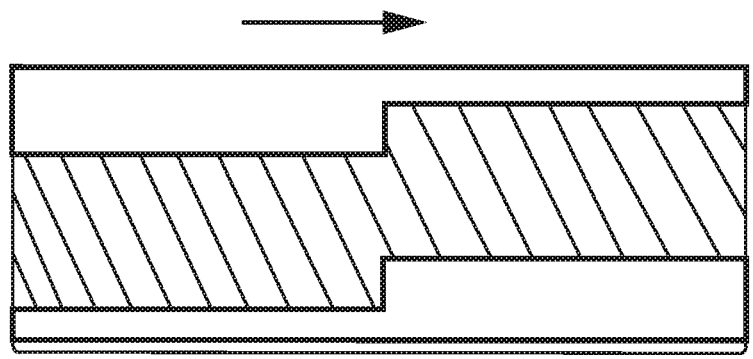
FIG. 19 depicts a top view of a two stage multistage multi-lane conveyor unit.

FIG. 19 depicts a two stage multistage multi-lane conveyor unit including an inner vertical wall, a first high friction inner conveying lane surface such as a belt adjacent the vertical wall, a second lower friction intermediate conveying lane surface comprising a plurality of skewed rollers urging articles outwardly from the first high friction conveying lane and vertical law in lateral flow communication therewith, and a third high friction outer conveying lane surface comprising a high friction conveying surface such as a belt in lateral flow communication with the second lower friction intermediate conveying lane. The first stage includes a first inner conveying lane having a first high friction surface section with a 3 inch wide outer high friction belt having a second stage extending onward as a 9 inch wide high friction belt terminating at the end of the second stage at the center of the conveyor. The first stage includes a 15 inch wide intermediate section comprising a plurality of skewed low friction surface rollers adjacent the first conveying lane extending into a second stage whereby the rollers shift over toward the outer edge 6 inches and the third conveying lane having a high friction conveying surface 9 inches in width deceasing at the second stage to a high friction conveying surface comprising a belt 3 inches in width.

As shown, a two stage multistage multi-lane conveyor unit wherein a first conveying lane having a high friction surface comprises a narrow three inch wide high friction inner belt adjacent a vertical wall extends the entire length of the conveyor and includes six additional adjacent aligned three inch wide inner narrow belts extending from a selected position near the center of the conveyor extending to the end of the conveyor in a second stage. A second conveying lane having a lower friction surface is in lateral flow communication with the first conveying lane and the second middle conveying lane comprises a plurality of skewed rollers extending the entire length of the conveyor adjacent the first conveying lane shifting outwardly in the second stage and having a lateral angle of up to 30 degrees providing forward and lateral movement thereover. A third conveying lane having a high friction surface and in lateral flow communication with the second conveying lane, wherein the third conveying lane comprises nine inch wide outer high friction belts extending to a selected position near the center of the conveyor defining the first stage whereby the six belts adjacent the second terminate, the second lane shifts outwardly, and the three outer narrow belts extent through the second stage the entire length of the conveyor.

The second lower friction conveying lane extends adjacent to the first conveying lane and in lateral communication therewith for moving articles there between. The second conveying lane comprises a plurality of skewed rollers having a width of 15 inches from the first conveying lane providing both forward and lateral conveying forces urging articles forward and away from the first conveying lane. The second conveying lane shifts inwardly at the second stage forming a second lower friction surface section remaining adjacent to and in flow communication with the high friction surface section of the first conveying lane.

A third outer high friction surface conveying lane extends 9 inches from the lateral edge of the second conveying lane to the outer edge of the conveyor. The third conveying surface narrows to 3 inches at the start of the second stage terminating at the end of the conveyor. The width of the second stage first conveying surface belt is widened six inches to the end of the conveyor.

The lateral receiving edge of the second conveying lane is positioned below the outer lateral edge of the first conveying lane and the second conveying lane is transversely inclined and angled laterally upward having an elevated outer side edge even with or below the lateral receiving edge of an adjacent third conveying lane, and the conveying surface of the second conveying lane forms an inclined plane extending above an inner lateral receiving edge of the adjacent third conveying lane having a high friction surface. Lateral movement of a package on the multistage singulating conveyor can be controlled by selection of the amount of high friction conveying surface provided by one or more adjacent conveying lanes.

Example 2

Figure 20:
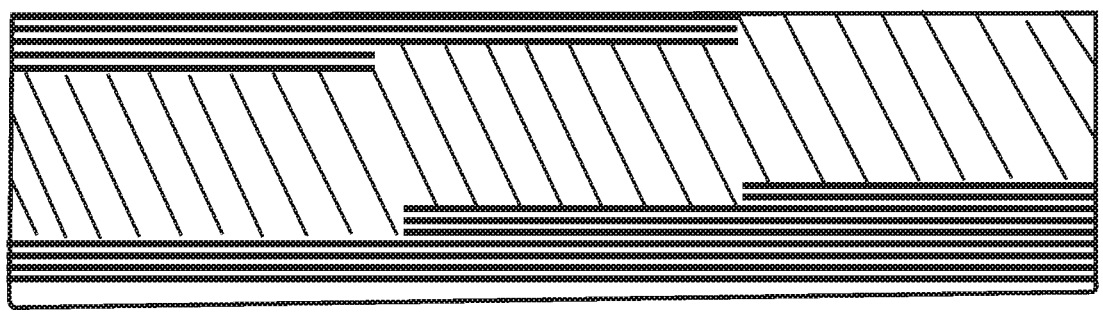
FIG. 20 shows a three stage multistage conveyor having high friction conveying surfaces formed from multiple narrow belts.

A three stage multistage and multi-lane conveyor is shown in FIG. 20 wherein the high friction conveying surfaces are depicted as narrow high friction belts In FIG. 20 a three stage multistage conveyor has high friction conveying surfaces formed from multiple narrow belts varying in number and length in lateral flow communication with a lower friction surface to provide shift areas having high friction conveying surfaces and lower friction conveying surfaces to control lateral movement of packages thereon.

A first stage with a first high friction surface inner conveying lane formed by five narrow high friction belts on the inner side adjacent a vertical side wall. A second intermediate section in lateral flow communication with the first high friction surface inner conveying lane comprises a low friction surface conveying lane formed with skewed rollers in lateral flow communication with a third high friction surface outer conveying lane formed by five narrow high friction belts.

The second stage is in lateral flow communication with the first stage; however the two inner high friction conveying lanes adjacent the center section terminate at the end of the second stage.

The second stage includes a first inner conveying surface including two additional high friction narrow belts totaling seven belts. The center section comprising a low friction surface intermediate conveying lane formed with skewed rollers shifts outwardly. The low friction surface area extends further to the outer side of the second stage and increases the high friction surface area of the inner conveying lanes. The two outer high friction conveying lanes of the second stage terminate adjacent the third stage and the low friction surface conveying lane of the center section shift outwardly extending to the outer edge of the conveyor in the third stage.

The first inner high friction surface conveying lane of the second stage includes two additional high friction surface narrow belts totaling nine belts extending along the inner edge of the third stage of the conveyor terminating at the end of the conveyor. The center section comprises a low friction surface conveying lane formed with skewed rollers which extends from the first inner conveying lane providing a low friction surface area extending to the outer side edge of the third stage.

The number of narrow belts comprising the high friction area can be any selected number.

The lateral receiving edge of the second intermediate conveying lane is positioned below the outer lateral edge of the first conveying lane and the second conveying lane is transversely inclined and angled laterally upward having an elevated outer side edge even with or below the lateral receiving edge of an adjacent third conveying lane, and the conveying surface of the second conveying lane forms an inclined plane extending above an inner lateral receiving edge of the adjacent third conveying lane having a high friction surface. Lateral movement of a package on the multistage singulating conveyor can be controlled by selection of the amount of high friction conveying surface provided by one or more adjacent conveying lanes.

Example 3

FIGS. 21-26 show a lower friction conveying lane comprising skewed rollers disposed between high friction conveying lanes comprising a plurality of narrow belts providing a sequel showing a package the width of the first conveying lane moving forward and showing a package positioned on the adjacent lower friction surface middle conveying lane moving laterally and forward until it is removed by the conveyor. In adding more stages, a continuous path is provided for removal of packages that are abreast by adding more steps.

Figure 21:
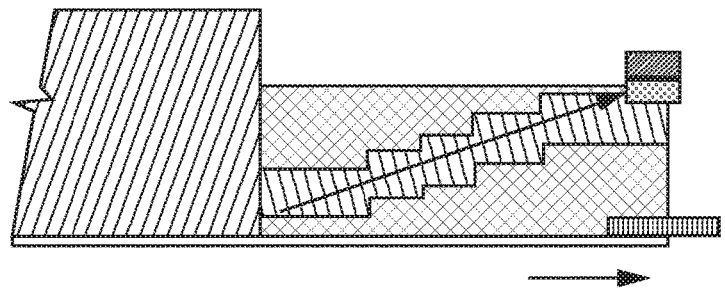
FIG. 21 shows a five stage multistage conveyor having high friction conveying surfaces formed from multiple narrow belts.
Figure 22:
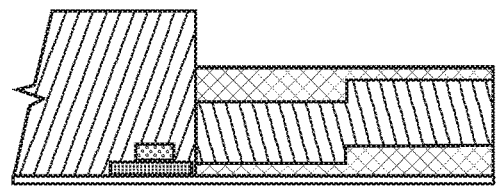
FIG. 22 shows a two stage multistage conveyor unit including parcels resting on feed conveyor.
Figure 25:
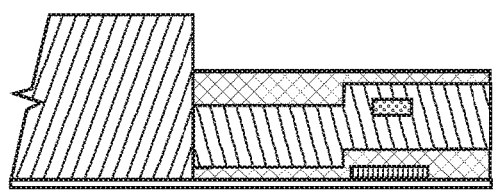
FIG. 25 shows the two stage multistage conveyor unit of FIG. 22 including parcels resting on first and second conveying lanes of the second stage.
Figure 23:
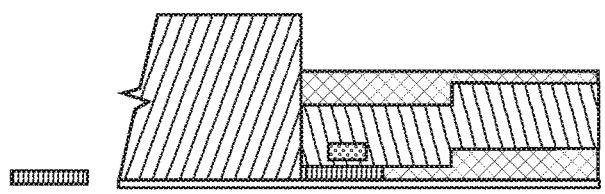
FIG. 23 shows the two stage multistage conveyor unit of FIG. 22 including parcels resting on first and second conveying lanes of the first stage.
Figure 26:
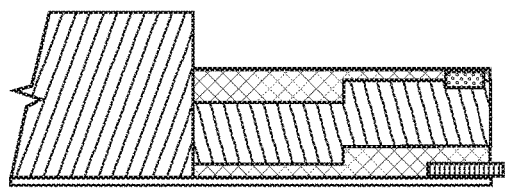
FIG. 26 shows the two stage multistage conveyor unit of FIG. 22 including a parcel passing through on the first conveying lane and a parcel resting on the third conveying lane of the third stage.
Figure 24:
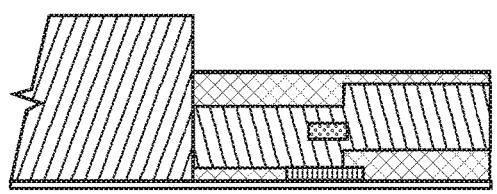
FIG. 24 shows the two stage multistage conveyor unit of FIG. 22 including parcels resting on first and second conveying lanes moving onto the second stage.

In FIG. 21, a five stage multistage conveyor having high friction conveying surfaces formed from multiple narrow belts varying in number and length is in flow communication with low friction conveying surfaces to provide shifting areas having high friction conveying surfaces and lower friction conveying surfaces to control lateral movement of packages thereon. A two stage multistage conveyor unit includes parcels resting on feed conveyor aligned and in flow communication therewith wherein the first conveying lane as depicted in FIG. 22. The two stage multistage conveyor unit of FIG. 22 includes parcels resting on first and second conveying lanes of the first stage. The two stage multistage conveyor unit of FIG. 23 includes parcels resting on first and second conveying lanes moving onto the second stage. FIG. 25 shows the two stage multistage conveyor unit including parcels resting on first and second conveying lanes of the second stage, and the two stage multistage conveyor unit is shown in FIG. 26 including a parcel passing through on the first conveying lane and a parcel resting on the third conveying lane of the third stage.

Example 4

FIGS. 27-30 show a solution to a 3-way side by side separation issue.

Figure 27:
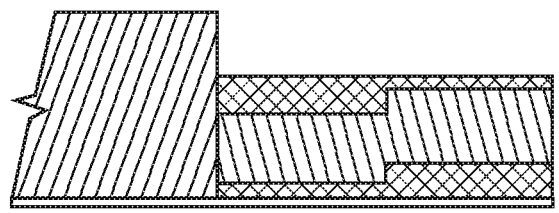
FIG. 27 shows a two stage multistage conveyor unit.
Figure 28:
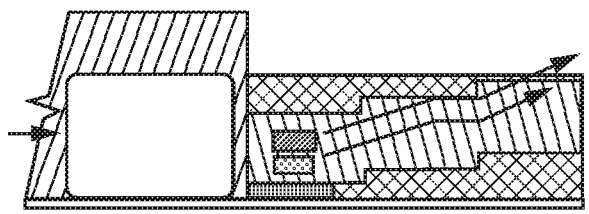
FIG. 28 shows three stage multistage conveyor unit.

FIG. 27 shows a two stage multistage conveyor unit, A three stage multistage conveyor unit as shown in FIG. 28 includes a parcel resting on first conveying lane and two side by side parcels resting on the second conveying lanes of the first stage. If three side by side parcels enter the three stage multistage multi-lane conveyor where the third high friction conveying lane is too narrow to support a parcel, momentum carries it over the narrow lane so the adjacent parcel can no longer impede lateral movement and stopping the remaining parcels from reaching a position for dropping off onto the recirculation conveyor.

Figure 29:
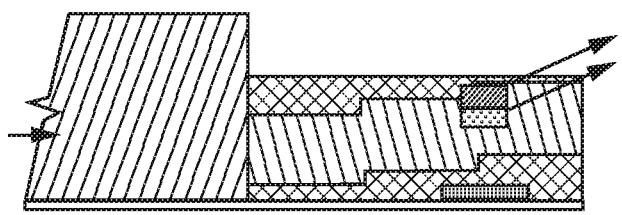
FIG. 29 shows the three stage multistage conveyor unit having a third stage.
Figure 30:
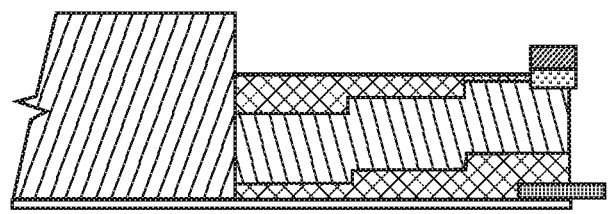
FIG. 30 shows the three stage multistage conveyor unit of FIG. 29 with the inner parcel resting on the first conveying lane.

Moreover as shown in FIGS. 29-30, elevation of the center lane at a selected angle upward to the third high friction conveying lane can be utilized with a conveyor having additional stages.

FIG. 29 shows three stage multistage conveyor unit of FIG. 27 having a third stage including a parcel resting on first conveying lane of the third stage and two side by side parcels with a middle parcel resting on the second low friction conveying lane surface comprised of skewed rollers and an adjacent outer parcel being conveyed outwardly upward and outward toward a high friction conveying surface comprising a belt;

FIG. 30 shows three stage multistage conveyor unit of FIG. 29 with the inner parcel resting on the first conveying lane comprising a high friction belt and against a vertical side wall at the end of the third stage of the conveyor; and the outer parcel being pushed laterally off of the outer high friction belt resting on the third conveying lane of the third stage whereby the middle parcel has moved laterally upward and outward across the second low friction conveying lane surface comprised of skewed rollers and over the lateral inner edge of the third high friction belt so the that the middle parcel rests on the outer high friction conveying surface;

Example 5

The two stage multistage conveyor shown in FIGS. 31-34 show separation of two items abreast.

Figure 31:
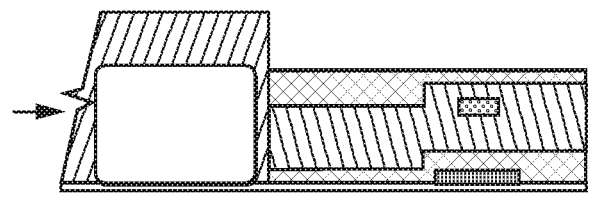
FIG. 31 shows a two stage multistage conveyor with a parcel resting on the first conveying lane of the second stage and a parcel resting on the second conveying lane of the second stage.
Figure 32:
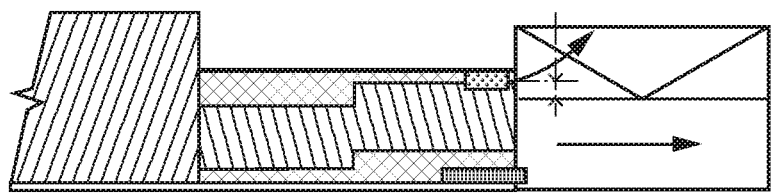
FIG. 32 shows the two stage multistage conveyor of FIG. 31 with a parcel resting on the first conveying lane of the second stage passing through to the receiving conveyor and a parcel resting on the third conveying lane of the second stage proceeding to the drop off ramp.

As shown in FIGS. 31-32, one package is conveyed forward on the first high friction conveying lane and the second package is conveyed forward and laterally from a second lower friction conveyor lane and transferred to a third high friction conveying lane where it is removed to the recirculation conveyor. The package in the first conveying lane is conveyed forward to the receiving conveyor.

Figure 33:
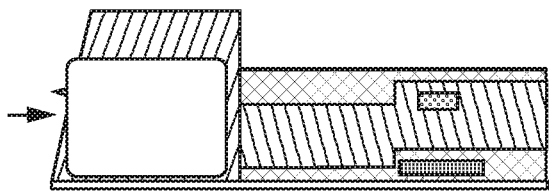
FIG. 33 shows a two stage multistage conveyor with a parcel resting on the first conveying lane of the second stage and a parcel resting on the second conveying lane of the second stage.
Figure 34:
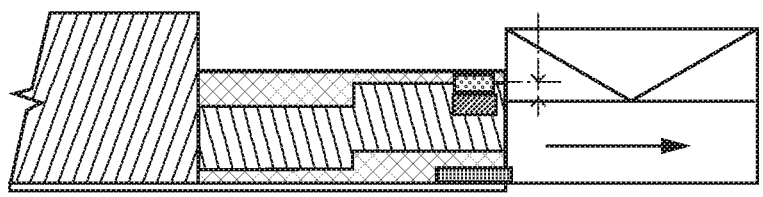
FIG. 34 shows the two stage multistage conveyor of FIG. 33 with a parcel resting on the first high friction conveying lane of the second stage passing through to the receiving conveyor.
Figure 35A:
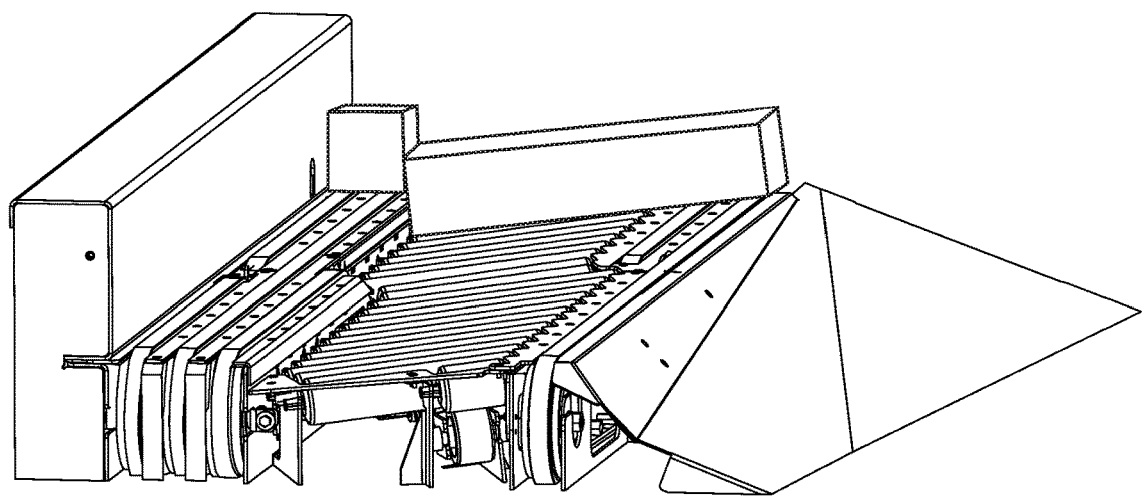
FIG. 35 (a) is an isometric view of a multistage conveyor.
FIG. 35(b) is an isometric view of the multistage conveyor of FIG. 35 (a)
FIG. 35(c) is an isometric view of the multistage conveyor of FIG. 35(b)
FIG. 35(d) is an isometric end view of the multistage conveyor of FIG. 35(c)
FIG. 35(e) is an isometric end view of the multistage conveyor of FIG. 35(d)
FIG. 35(f) is an isometric downstream view of the multistage conveyor of FIG. 35 (e)
Figure 35B:
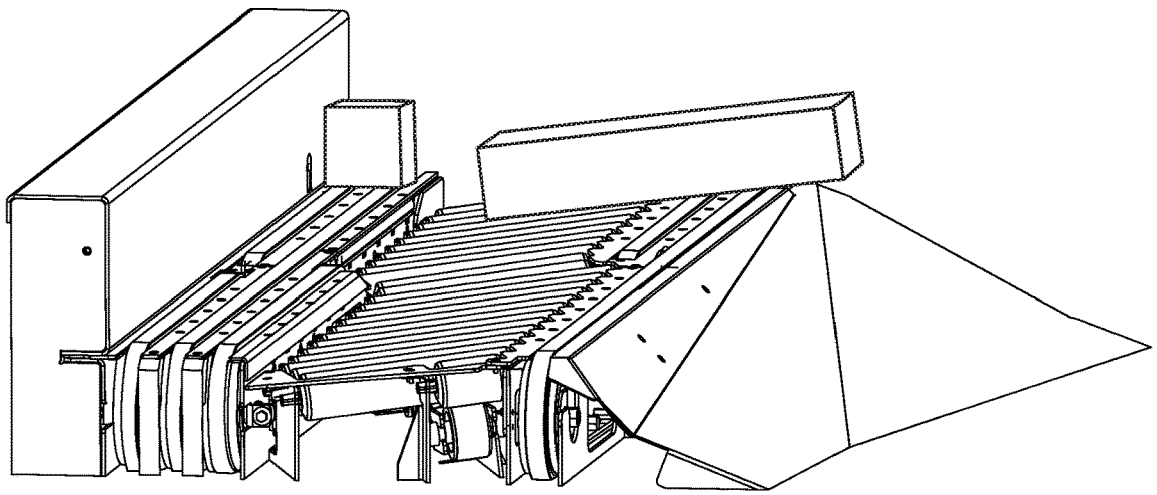
Figure 35C:
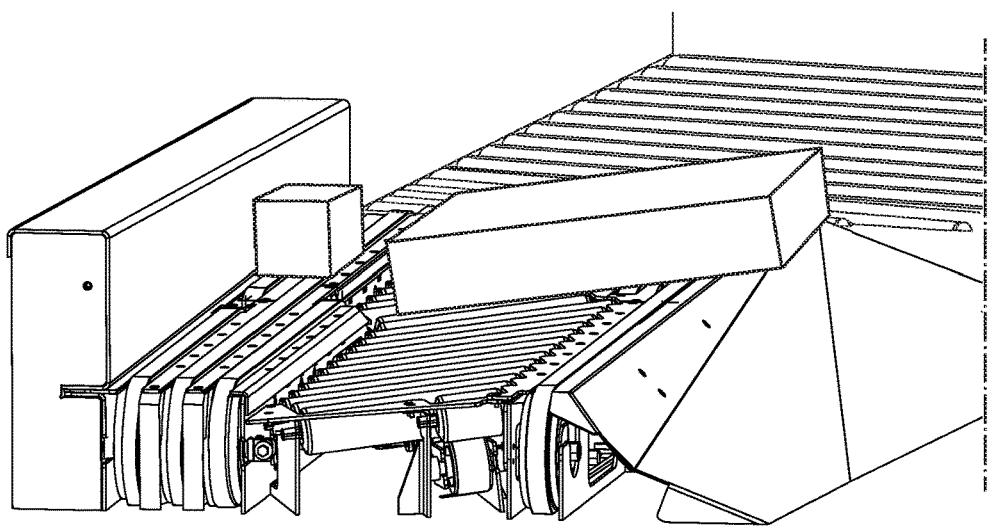
Figure 35D:
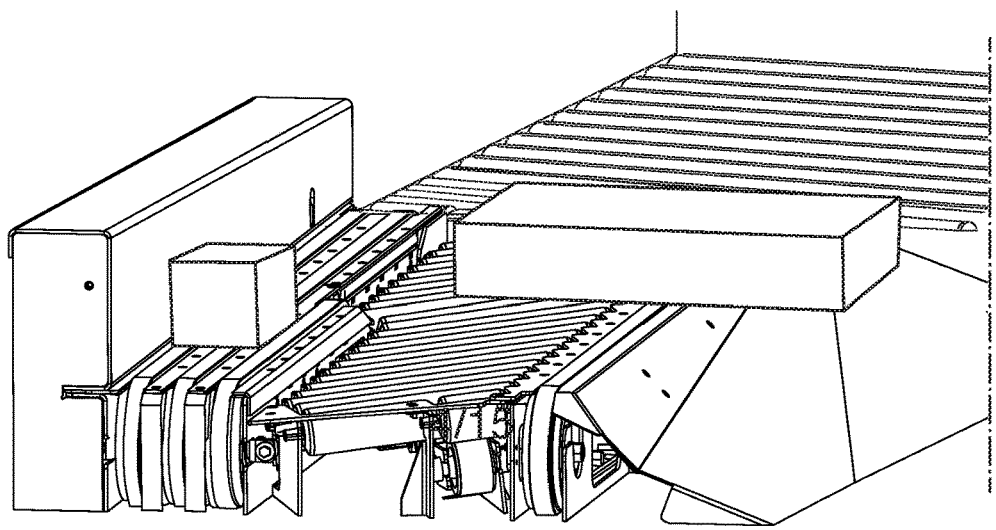
Figure 35E:
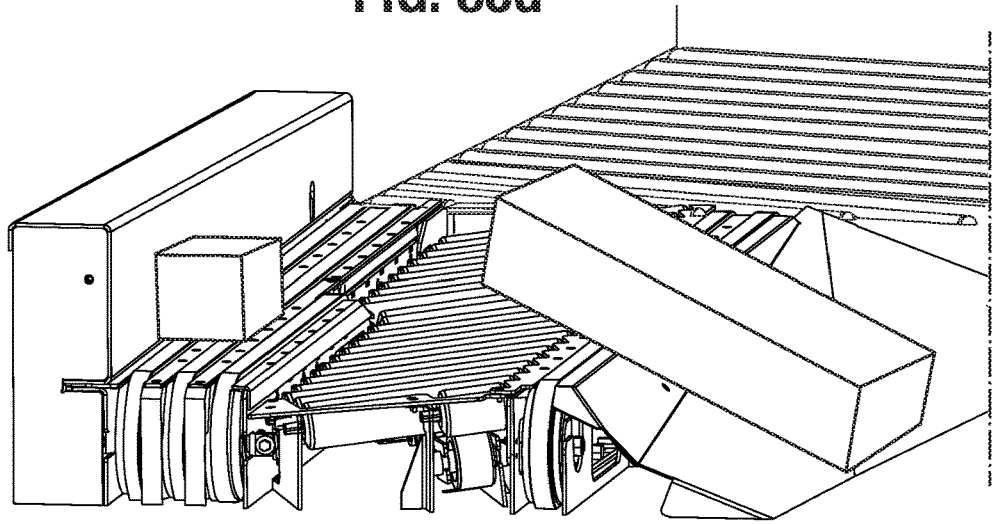
Figure 35F:
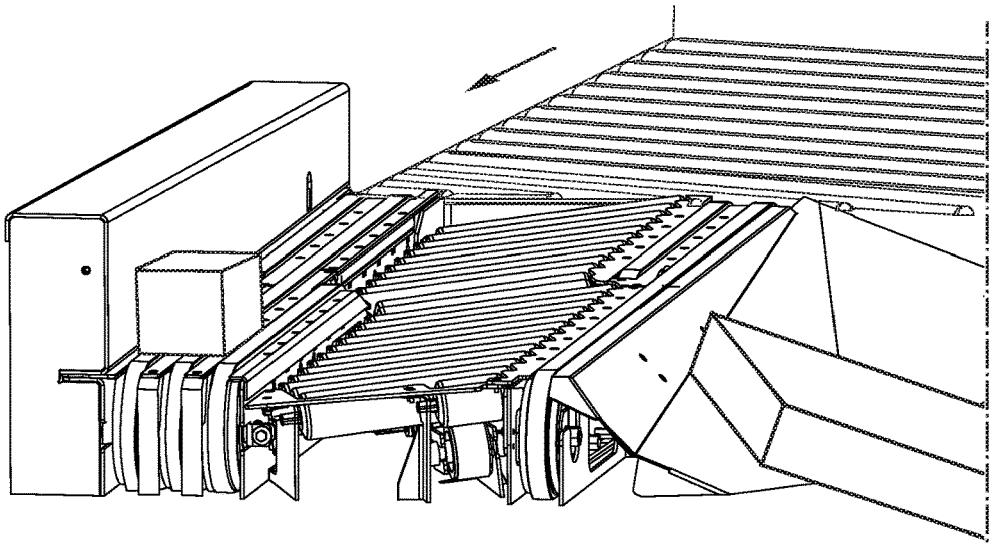
Figure 36A:
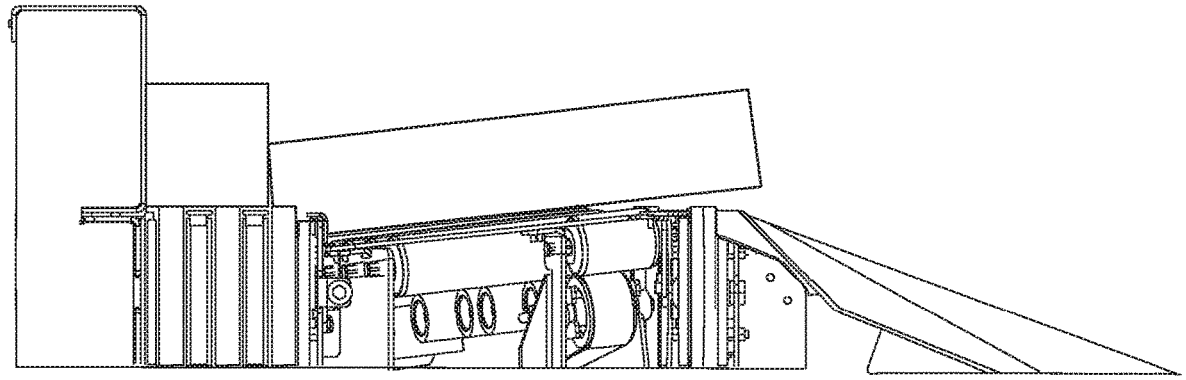
FIG. 36 (a) is a downstream sectional view of the multistage conveyor of FIG. 35.
FIG. 36(b) is a downstream end view of the multistage conveyor of FIG. 36 (a)
FIG. 36(c) is a downstream end view of the multistage conveyor of FIG. 36 (b)
FIG. 36(d) is a downstream end view of the multistage conveyor of FIG. 36 (c)
FIG. 36(e) is a downstream end view of the multistage conveyor of FIG. 36 (d)
Figure 36B:
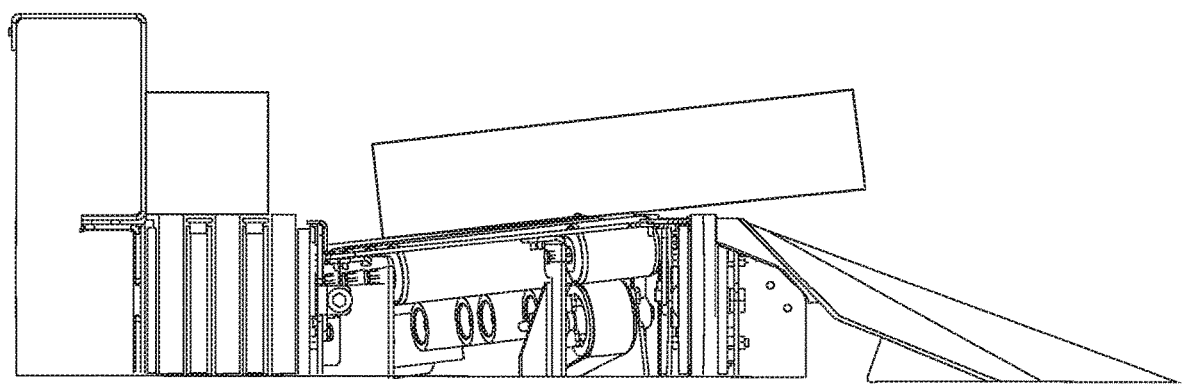
Figure 36C:
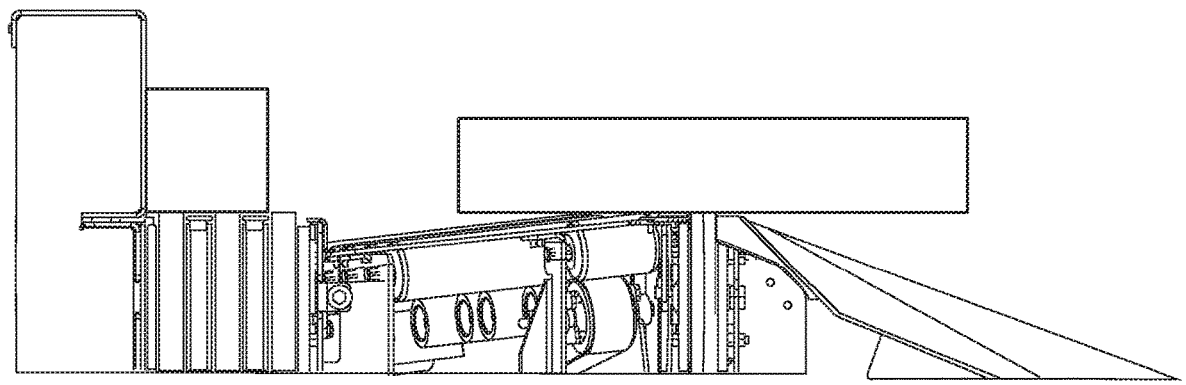
Figure 36D:
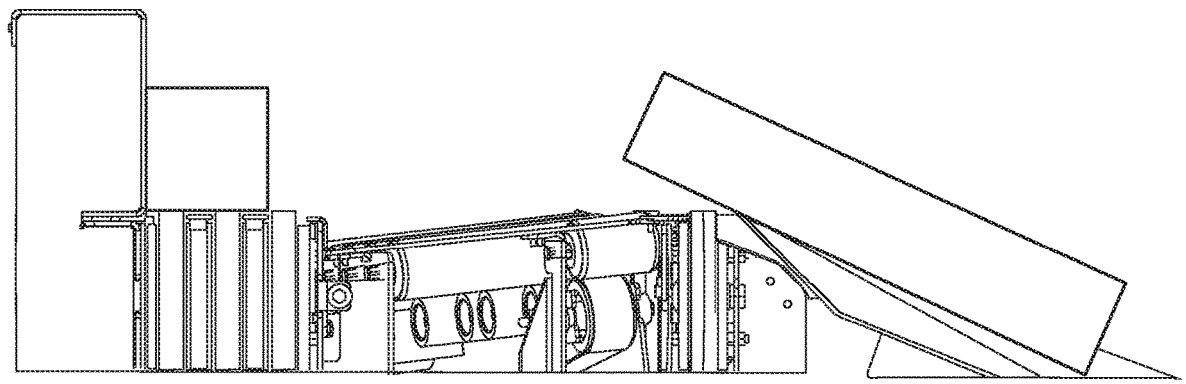
Figure 36E:
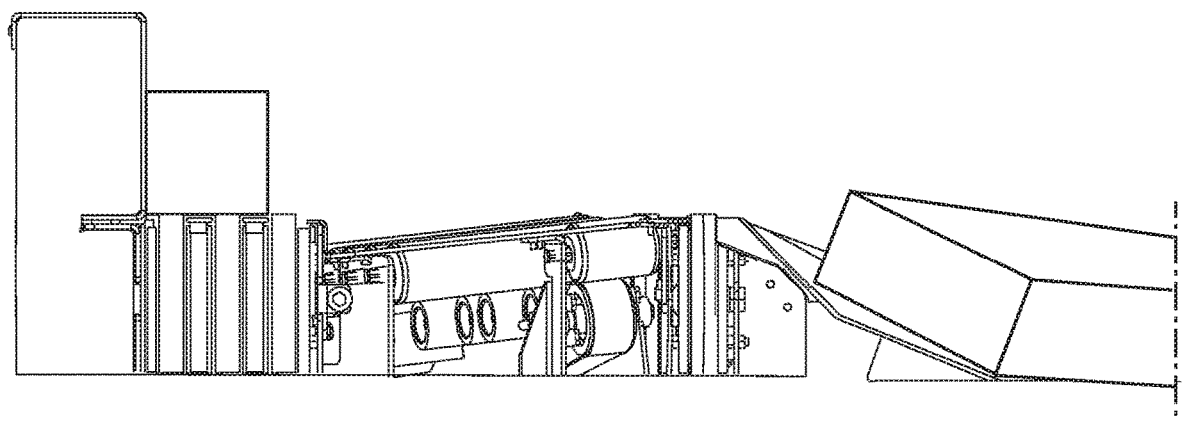
Figure 37A:
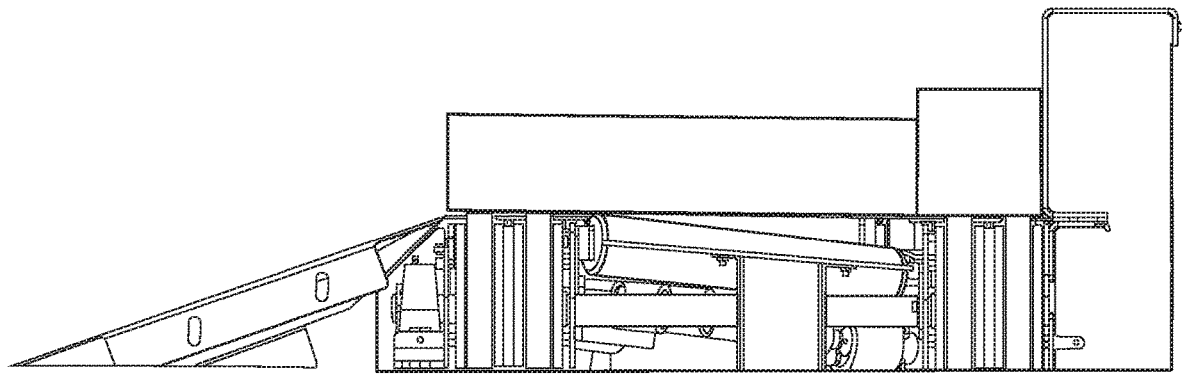
FIG. 37 (a) is an upstream end view of the multistage conveyor of FIG. 35.
FIG. 37(b) is an upstream end view of the multistage conveyor of FIG. 37 (a)
FIG. 37(c) is an isometric upstream view of the multistage conveyor of FIG. 37 (b)
FIG. 37(d) is an isometric upstream view of the multistage conveyor of FIG. 37 (c)
FIG. 37(e) is a downstream end view of the multistage conveyor of FIG. 37(d)
FIG. 37(f) is a view from the downstream end of the multistage conveyor of FIG. 37(e)
Figure 37B:
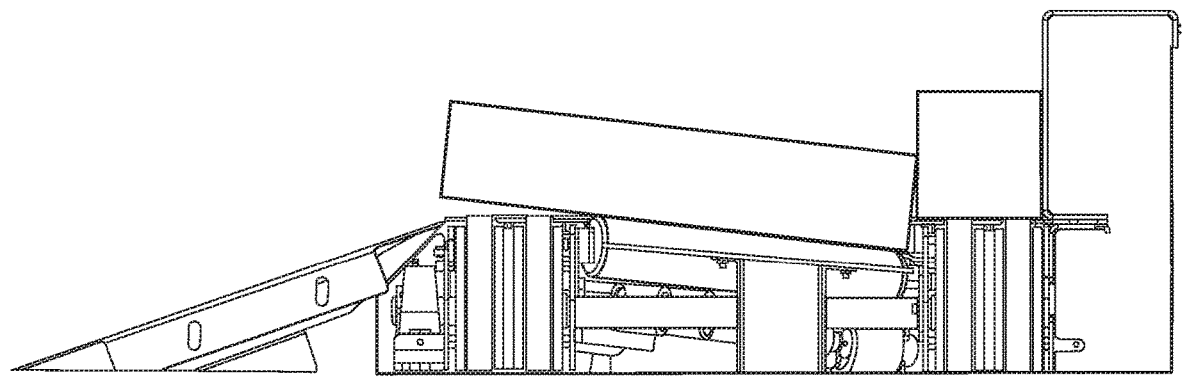
Figure 37C:
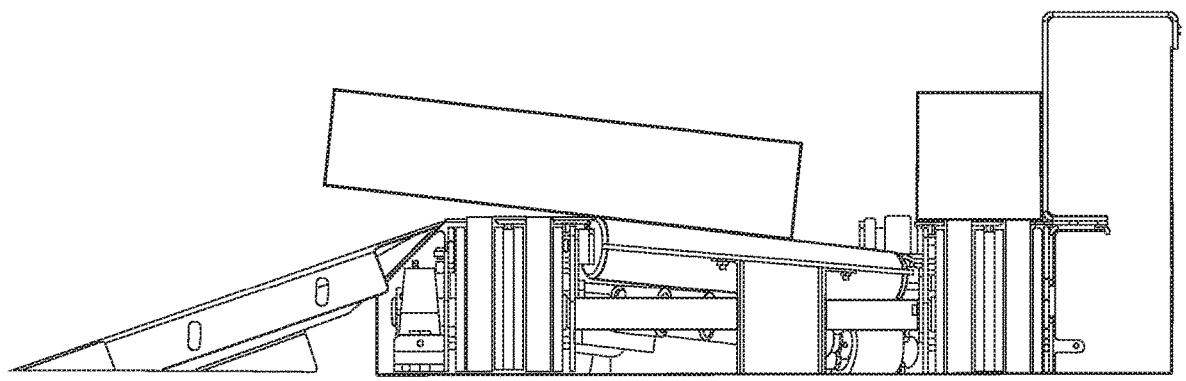
Figure 37D:
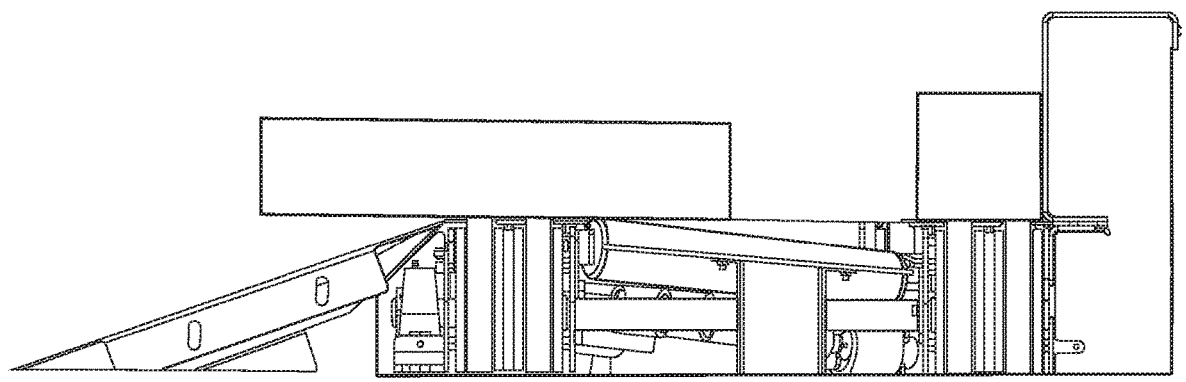
Figure 37E:
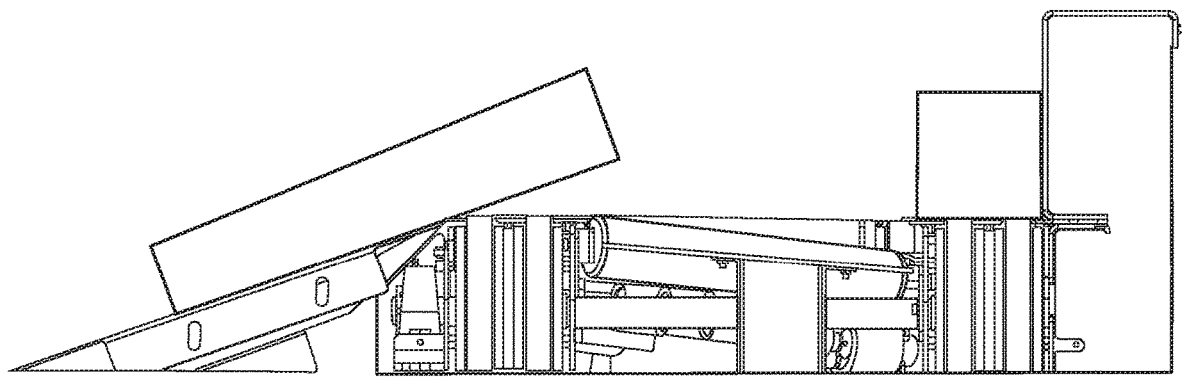
Figure 37F:
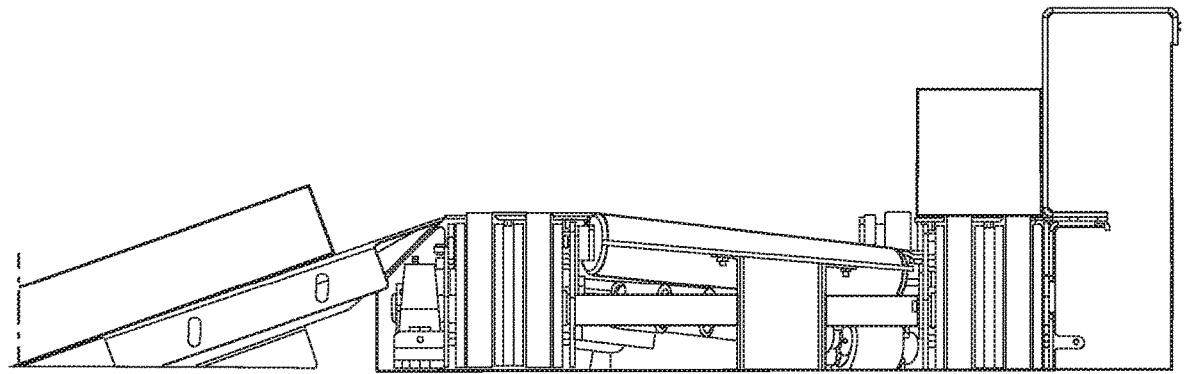
Figure 38A:
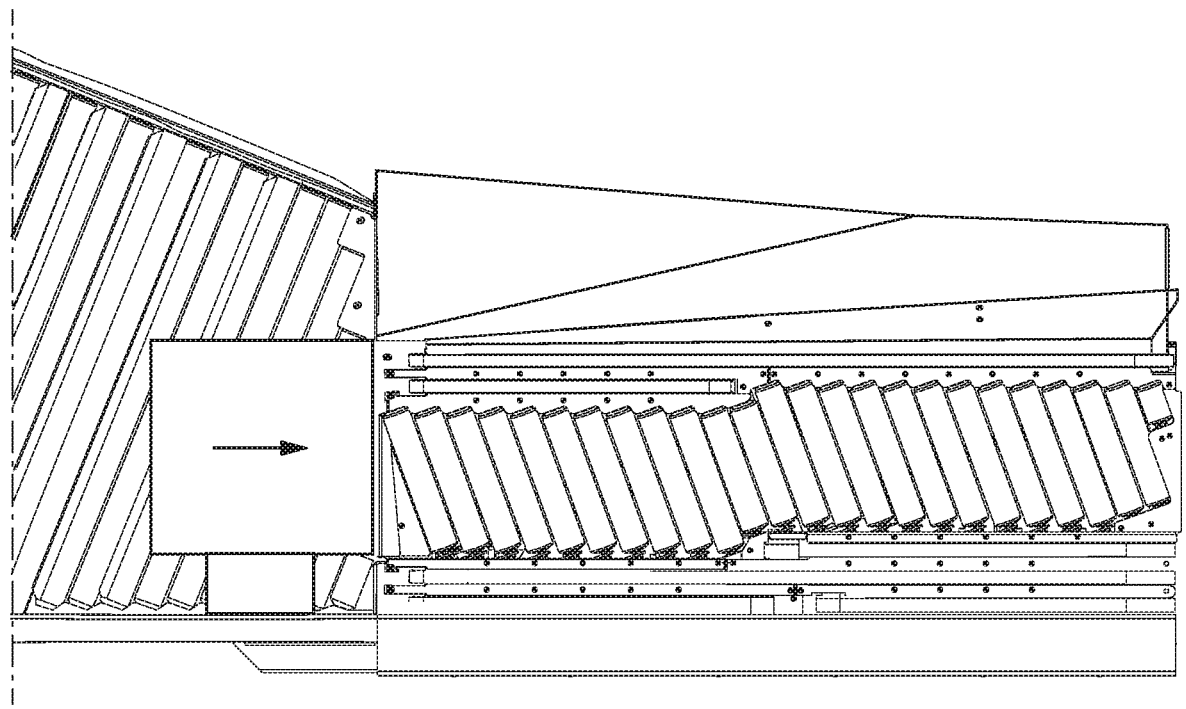
FIG. 38 (a) is top view of the multistage conveyor of FIGS. 35 (a-f) and FIGS. 36 (a-d) and FIGS. 37(a-f)
FIG. 38(b) is top view of the multistage conveyor of FIG. 38(a)
FIG. 38(c) is a top view of the multistage conveyor of FIG. 38(b)
FIG. 38(d) is a top view of the multistage conveyor of FIG. 38(c)
FIG. 38(e) is a top view of the multistage conveyor of FIG. 38 (d)
FIG. 38(f) is an isometric view of the multistage conveyor of FIG. 38 (e)
Figure 38B:
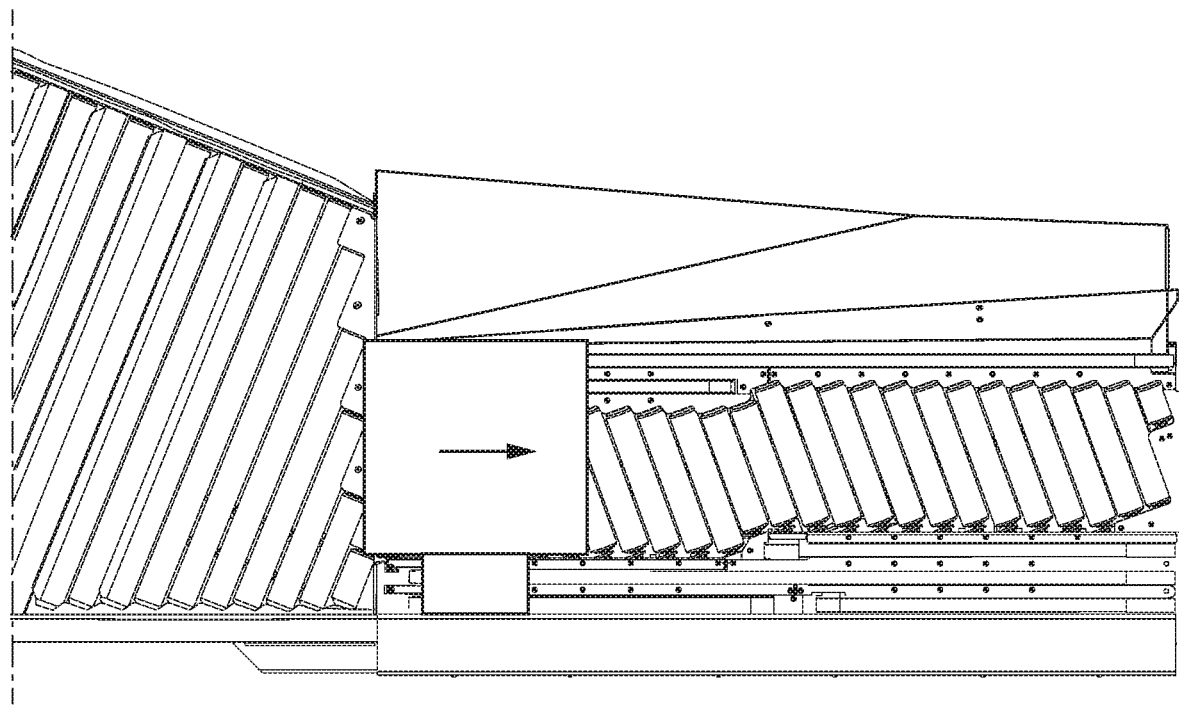
Figure 38C:
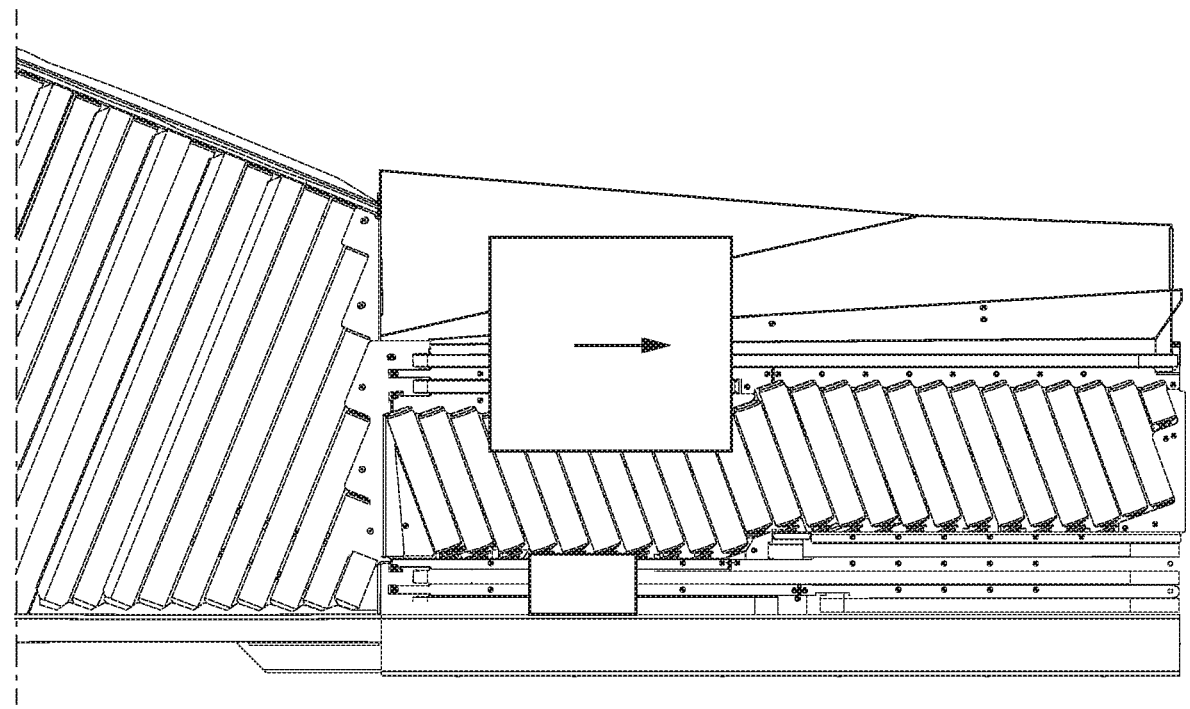
Figure 38D:
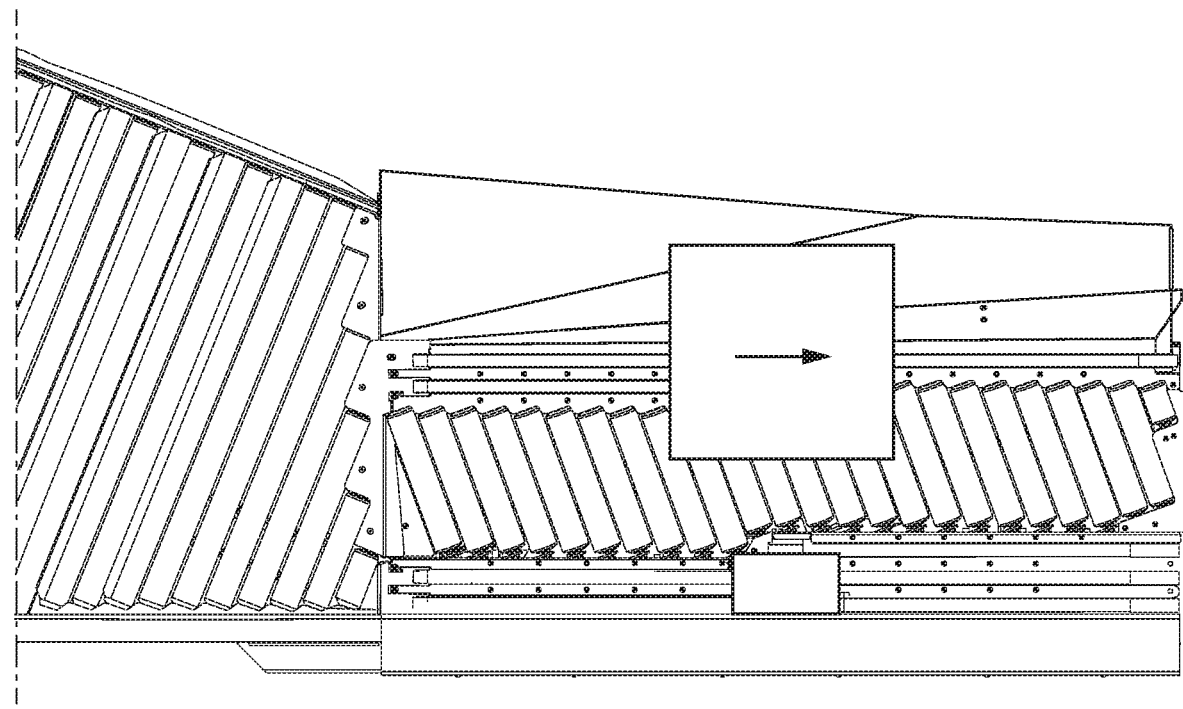
Figure 38E:
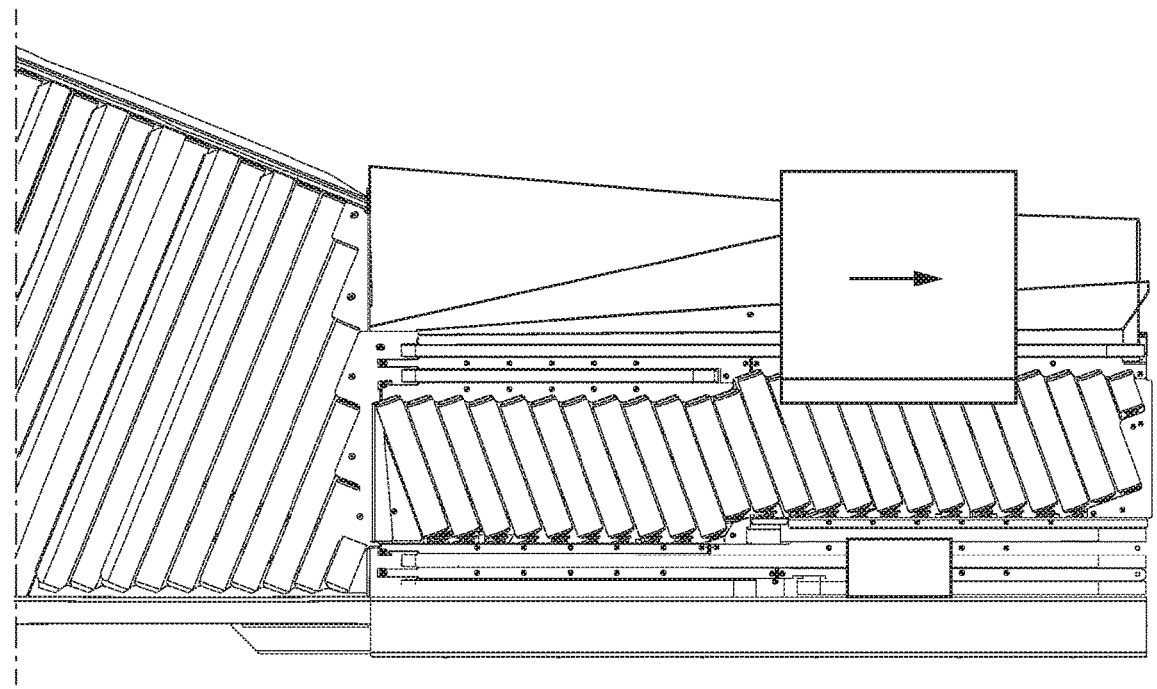
Figure 38F:
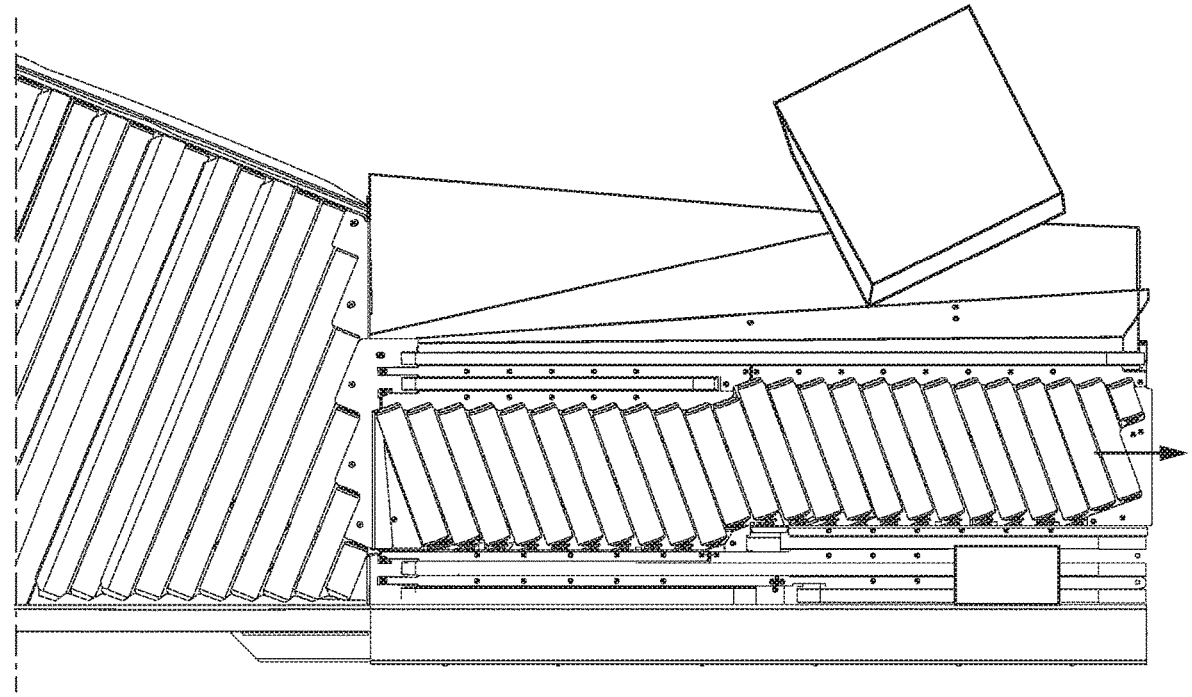
Figure 39A:
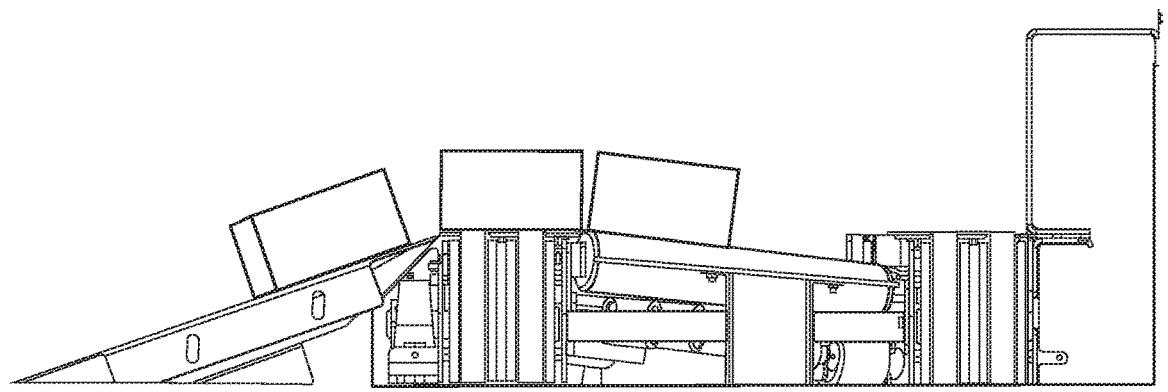
FIG. 39 (a) shows an upstream end view of a multistage conveyor.
FIG. 39(b) is an isometric upstream view of the multistage conveyor of FIG. 39(a)
FIG. 39(c) is an isometric downstream view of the multistage conveyor of FIG. 39(a)
FIG. 39(d) is a downstream end view of the multistage conveyor of FIG. 39(a)
Figure 39B:
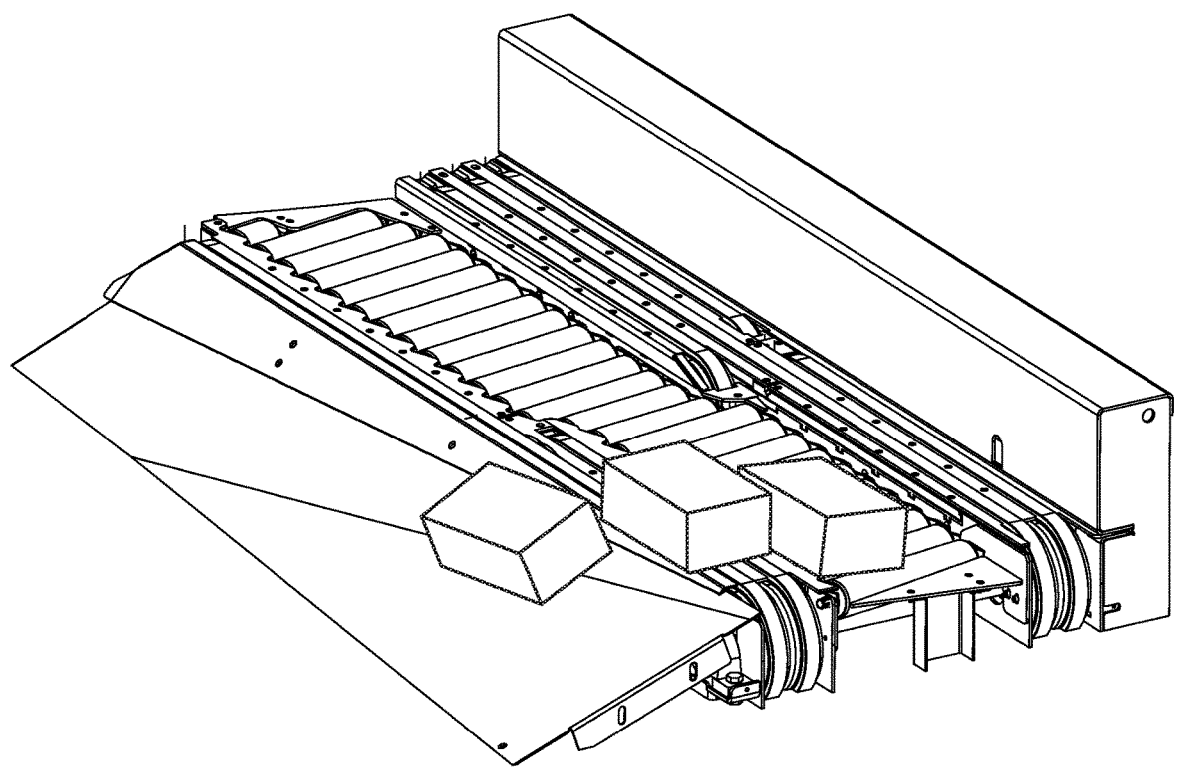
Figure 39C:
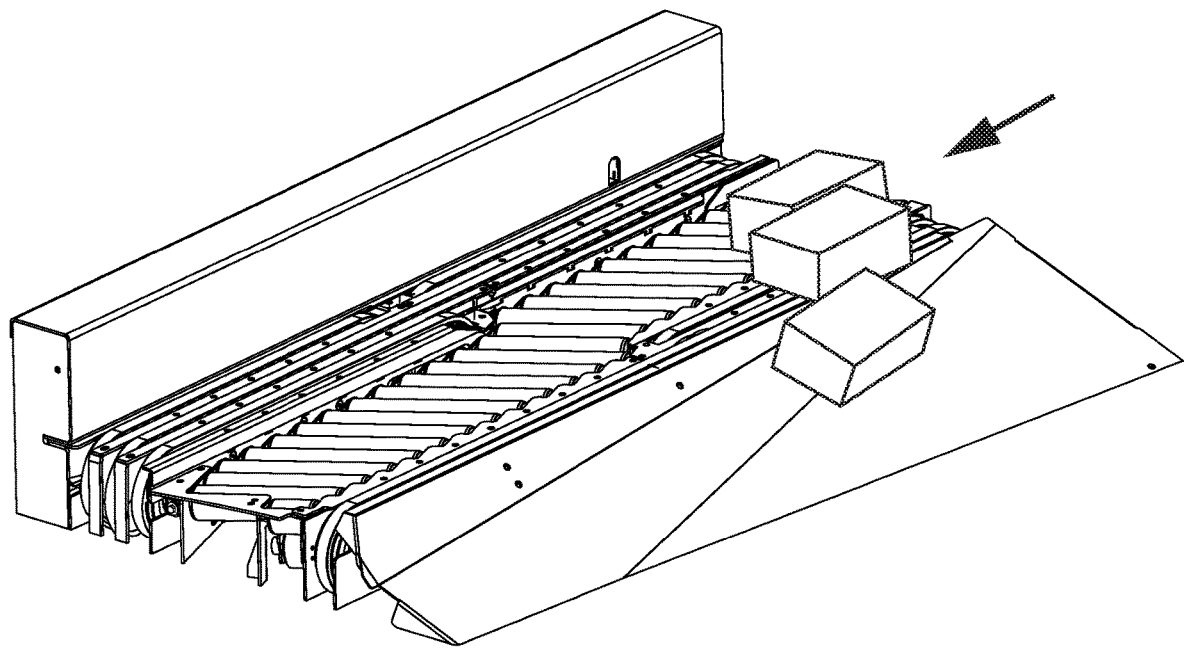
Figure 39D:
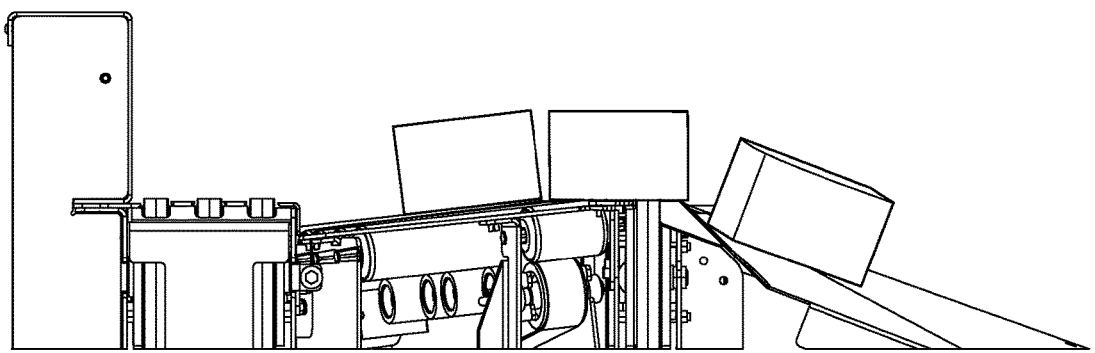

FIG. 33 shows a two stage multistage conveyor with a parcel resting on the first conveying lane of the second stage and a parcel resting on the second conveying lane of the second stage. One package is conveyed forward on the first high friction conveying lane and the second package is conveyed forward and laterally from a second lower friction conveyor lane but does not move a sufficient distance to transfer to a third high friction conveying lane therefor it is recirculated. The package in the first conveying lane is conveyed forward to the receiving conveyor. As shown in FIG. 34, the two stage multistage conveyor shows a parcel resting on the first high friction conveying lane of the second stage passing through to the receiving conveyor and a parcel resting on the third high friction conveying lane of the second stage proceeding to the drop off ramp and an additional parcel resting on the second conveying lane which will drop off if the center of gravity extends over the drop off ramp.

As shown in FIG. 35 (*a*), an isometric view of a multistage conveyor includes a first small box on a first inner conveying lane having a high friction surface comprising three spaced apart aligned narrow belts adjacent a vertical wall in flow communication with a second middle conveying lane comprising a plurality of skewed rollers positioned having a lateral angle of from 1-30 degrees and providing forward and lateral movement to a second large box supported thereon having a portion of the distal end of the box extending over an adjacent receiving edge of a third outer conveying lane having a high friction surface comprising a pair of narrow high friction belts. FIG. 35(*b*) shows forward and lateral movement of the second large box on the second conveying lane. FIG. 35(*c*) shows forward and lateral movement of the second large box on the second conveying lane. An isometric end view of the multistage conveyor is shown in FIG. 35 (*d*) wherein the lateral momentum of the box on the second conveying lane comprising powered skewed rollers carries the second large box upward wherein the center of gravity causes the box to fall onto the edge of the third conveying lane which pulls the box forward until the center of gravity shifts so that the box falls off of the third conveyor onto the take off ramp. In FIG. 35(*e*), the center of gravity of the second large box extends over the edge of a ramp adjacent the third conveying lane and a portion of the second large box falls onto the ramp. As shown in the downstream view, the multistage conveyor shows the second large box falls onto the ramp for recirculation or removal.

FIG. 36 (*a*) is a downstream view of the multistage conveyor of FIGS. 35 (*a-f*) showing a first small box on a first inner conveying lane having a high friction surface comprising two spaced apart aligned narrow high friction belts adjacent a vertical wall in flow communication with a second low friction middle conveying lane comprising a plurality of powered skewed rollers positioned having a lateral angle of from 1-30 degrees and providing forward and lateral movement to a second large box supported thereon having a portion of the distal end of the box extending over an adjacent receiving edge of a third outer high friction conveying lane having a high friction surface comprising a single narrow belt. A downstream end view is shown in FIG. 36 (*b*) wherein the lateral momentum of the box on the second conveying lane carried the second large box over the edge of the third conveying lane wherein the box is supported by the third conveying lane. In FIG. 36(*c*) the lateral momentum of the box on the second conveying lane carried the second large box over the edge of the second conveying lane and onto a third high friction conveying lane wherein the center of gravity of the second large box extends over the third high friction belt conveying lane and momentum carries the box over to fall onto a discharge ramp. As a shown in FIG. 36(*d*) the center of gravity of the second large box extends over the edge of a ramp adjacent the third conveying lane and a portion of the second large box falls onto the ramp. The second large box falls onto the ramp for recirculation or removal in FIG. 36 (*e*).

FIG. 37 (*a*) is an upstream end view of the multistage conveyor of FIGS. 35 (*a-f*) and FIGS. 36 (*a-d*) is an upstream view showing a first small box on a first inner conveying lane having a high friction surface comprising three spaced apart aligned narrow belts adjacent a vertical wall in flow communication with a second middle conveying lane comprising a plurality of skewed rollers positioned having a lateral angle of from 1-30 degrees and providing forward and lateral movement to a second large box supported thereon having a portion of the distal end of the box extending over an adjacent receiving edge of a third outer conveying lane having a high friction surface comprising a single narrow belt. The forward and lateral movement of the second large box on the second conveying lane is shown in FIGS. 37 (*b*) and 37 (*c*) where forward and lateral movement of the second large box on the second conveying lane. The lateral momentum of the box on the second conveying lane is shown in FIG. 37 (*d*) carrying the second large box over the edge of the second lane whereby the high friction narrow belt of the third conveying lane pulls the box forward until the center of gravity extends over the third lane and the box is discharged. In FIG. 37(e) a lateral momentum of the box on the second conveying lane carries the second large box over the edge of the second lane wherein the center of gravity of the second large box causes it to fall over onto the third high friction conveying lane which pulls the box forward wherein the momentum causes the box to fall over the edge of the third conveying lane onto the drop off ramp. The outer box does not come to rest on the single high friction belt but was moved laterally by the force of the second conveying lane and pulled forward by the third narrow high friction conveying lane to fall off of the third conveying lane onto the ramp for recirculation or removal in FIG. 37(f).

FIG. 38 (a) shows the multistage conveyor of FIGS. 35 (a-f) and FIGS. 36 (a-d) and FIGS. 37(a-f) having a first small box on a first inner conveying lane having a high friction surface comprising three spaced apart aligned narrow belts adjacent a vertical wall in flow communication with a second middle conveying lane comprising a plurality of skewed rollers positioned having a lateral angle of from 1-30 degrees and providing forward and lateral movement to a second large box supported thereon having a portion of the distal end of the box extending over an adjacent receiving edge of a third outer conveying lane having a high friction surface comprising a single narrow belt. The top view of the multistage conveyor of FIG. 38(b) shows forward movement of the first box on the first lane and second large box on the second conveying lane. The top view of the multistage conveyor in FIG. 38 shows forward and lateral movement of the second large box on the second conveying lane. FIG. 38(d) depicts the lateral momentum of the box on the second conveying lane which carries the second large box over the edge of the third conveying lane due to angular momentum from the transition from the inclined plane formed by the transverse angle of the second low friction powered skewed roller conveyor after the center of gravity of the box passes over the side edge of the second conveying lane and the narrow high friction third conveying lane. FIG. 38(e) illustrates the center of gravity of the second large box extending over the edge of a ramp adjacent the third conveying lane and a portion of the second large box falls onto the ramp the second large box falling onto the ramp for recirculation or removal is shown in FIG. 38 (0.

FIGS. 39 (a-d) show an upstream end view of a multistage conveyor showing a first inner conveying lane having a high friction surface comprising three spaced apart aligned narrow belts adjacent a vertical wall in flow communication with a second middle conveying lane comprising a plurality of skewed rollers positioned having a lateral upward angle of from 1-30 degrees having a first box thereon moving in a forward and lateral movement toward a third outer conveying lane having a high friction surface comprising a pair of narrow belts and a second box adjacent the first box wherein the second box is balanced and supported by the third conveying lane and a third box wherein the center of gravity has pulled the third box over the third belts and onto a ramp.

Figure 40A:
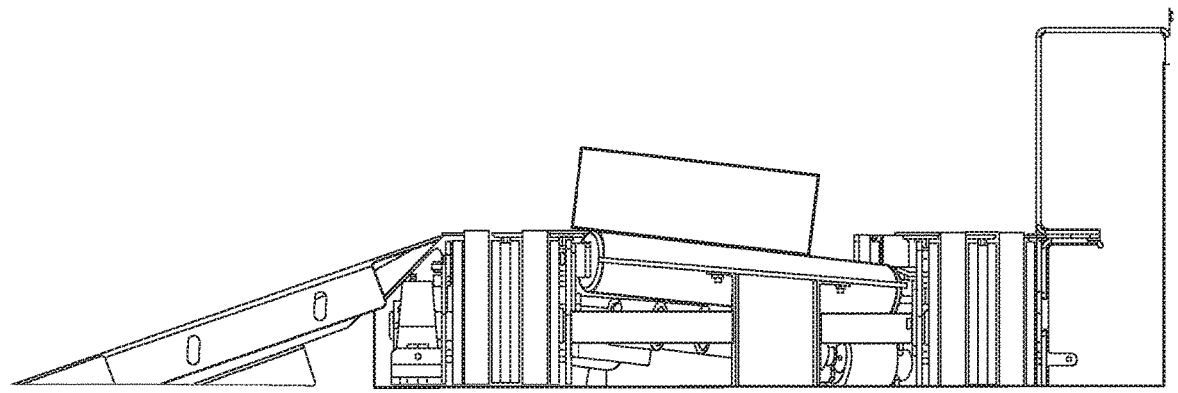
FIG. 40 (a) shows an upstream end view of a multistage conveyor.
FIG. 40(b) is an upstream end view of the multistage conveyor of FIG. 40(a)
Figure 40B:
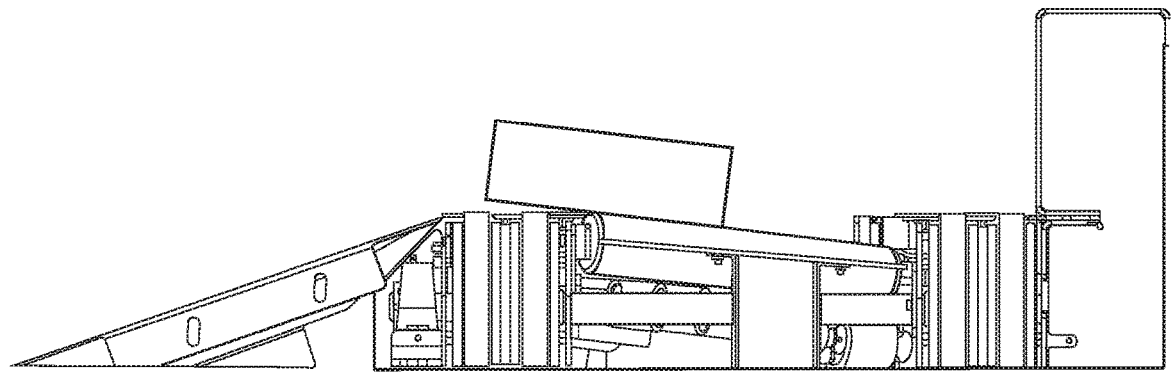
Figure 40C:
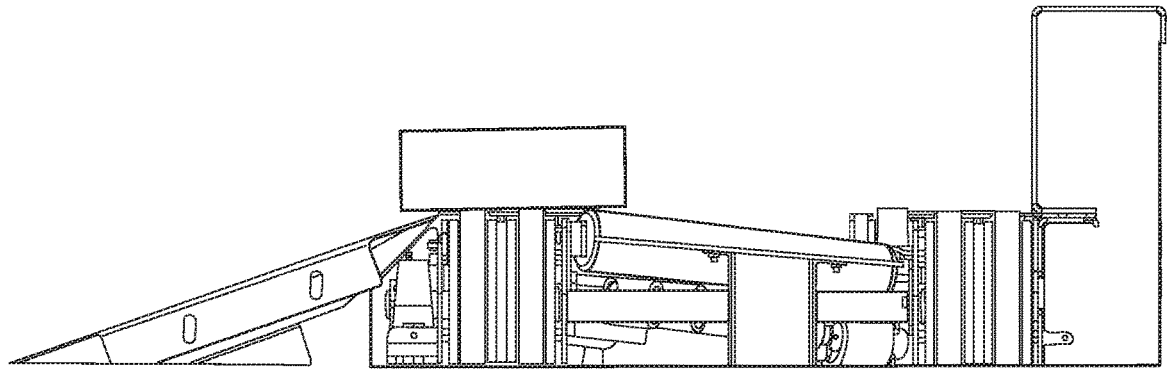

An upstream end view of a multistage conveyor is depicted in FIGS. 40 (a-c) wherein a first inner conveying lane having a high friction surface comprising three spaced apart aligned narrow belts adjacent a vertical wall in flow communication with a second middle conveying lane comprising a plurality of skewed rollers positioned having a lateral upward angle of from 1-30 degrees having a box thereon moving in a forward and lateral movement toward a third outer conveying lane having a high friction surface comprising a pair of narrow belts. The lateral momentum of the box on the second conveying lane carries a portion over the edge of the third conveying lane even though the center of gravity is still on the second conveying lane. The box is balanced and supported by the third conveying lane.

Figure 41:
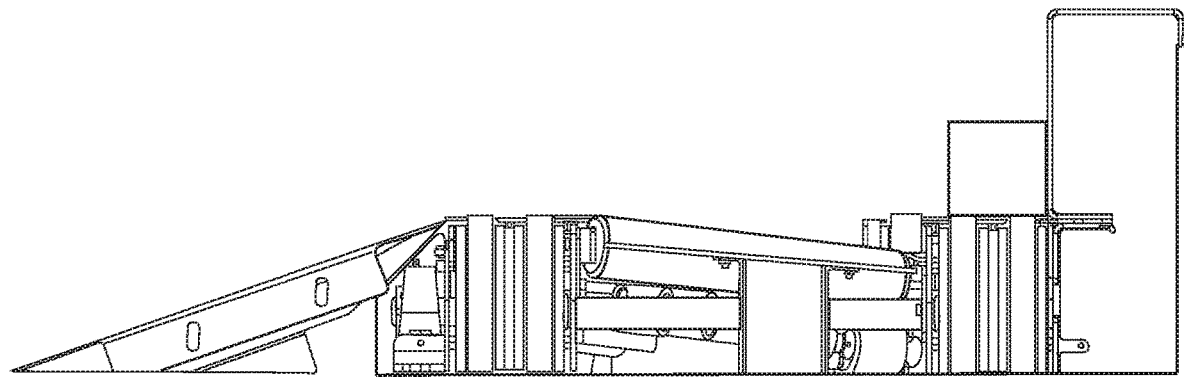
FIG. 41 is an upstream end view of aa multistage conveyor.

A multistage conveyor showing a first inner conveying lane having a high friction surface comprising two spaced apart aligned narrow belts adjacent a vertical wall in flow communication with a second middle conveying lane comprising a plurality of skewed rollers positioned having a lateral upward angle of from 1-30 degrees wherein the box is supported by the two narrow belts of the first conveying lane adjacent the vertical sidewall is shown in FIG. 41.

Figure 42:
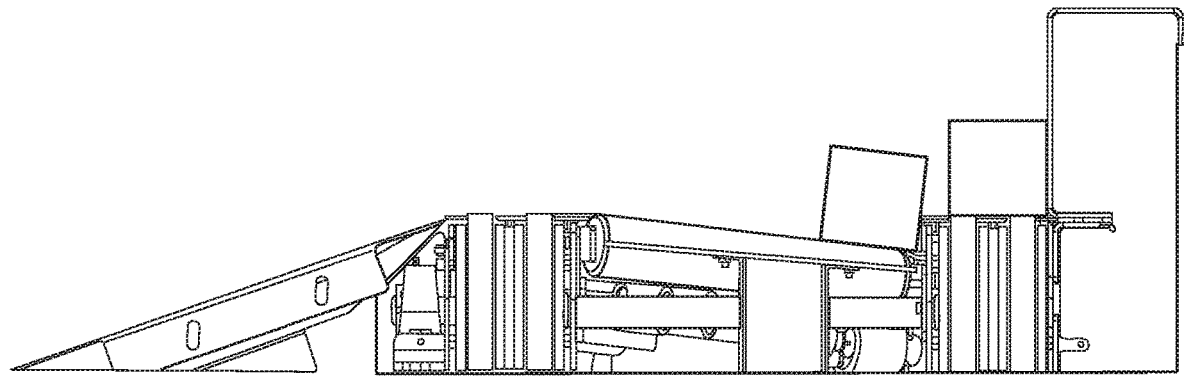
FIG. 42 is an upstream end view of a multistage conveyor.
Figure 43A:
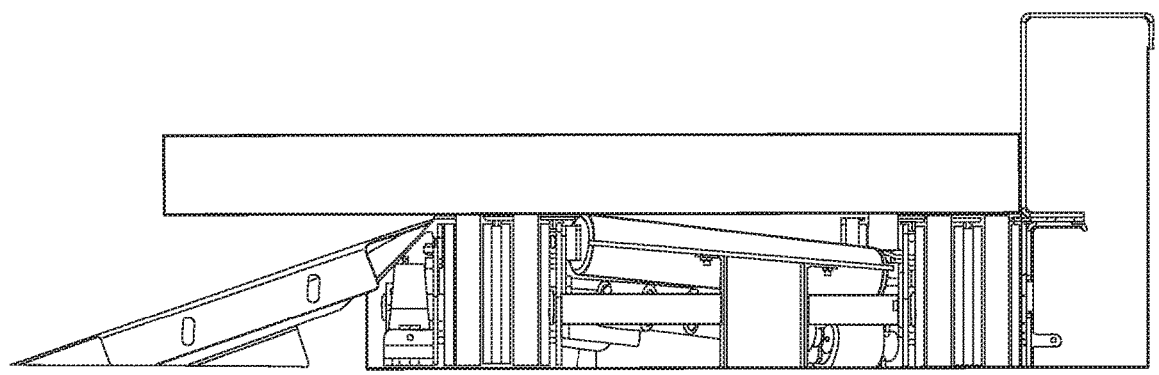
FIG. 43(a) is an upstream end view of a multistage conveyor.
Figure 43B:
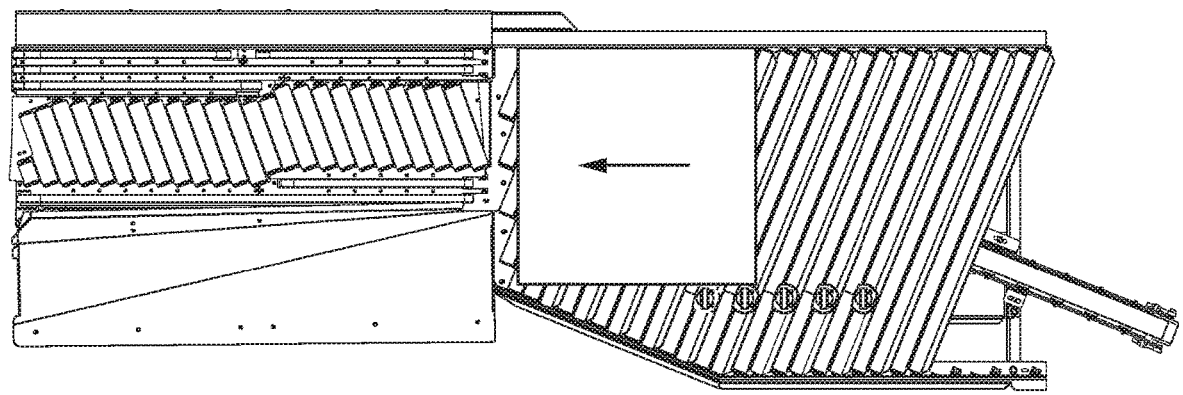
FIG. 43 (b) is a top view showing a large flat box aligned with a vertical wall supported by a powered skewed roller low friction conveying lane prior to entering a multistage conveyor.
FIG. 43(d) is a top view of the multilane conveyor of FIG. 43(a)
FIG. 43(e) is an isometric view of the multilane conveyor of FIG. 43(d)
FIG. 43(f) is a top view of the multilane conveyor of FIG. 43(a)
FIG. 43(g) is a sectional view of FIG. 43 (d) of the multilane conveyor of FIG. 43(a)
Figure 43C:
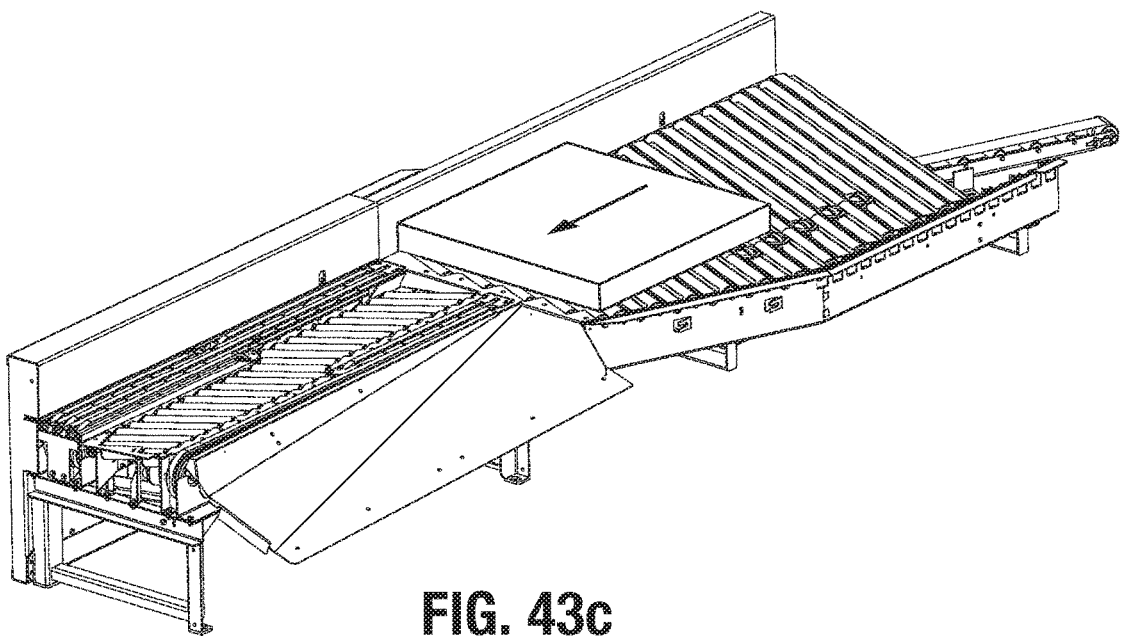
Figure 43D:
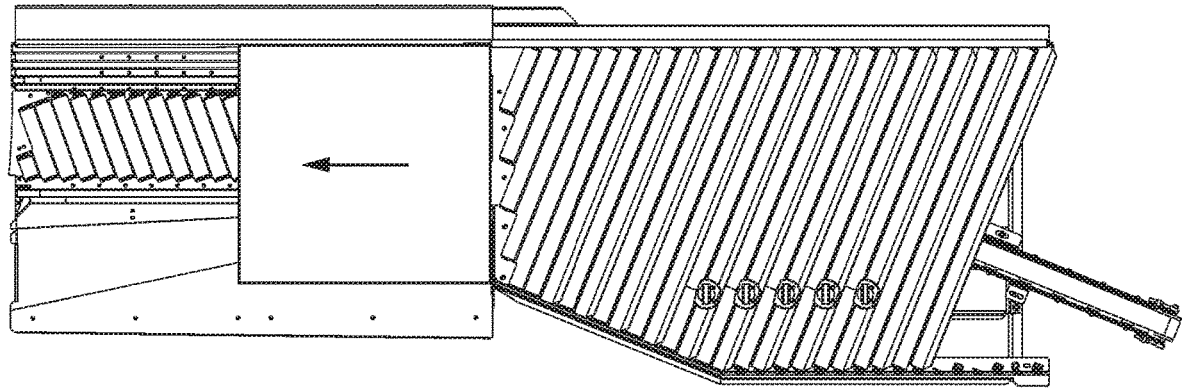
Figure 43E:
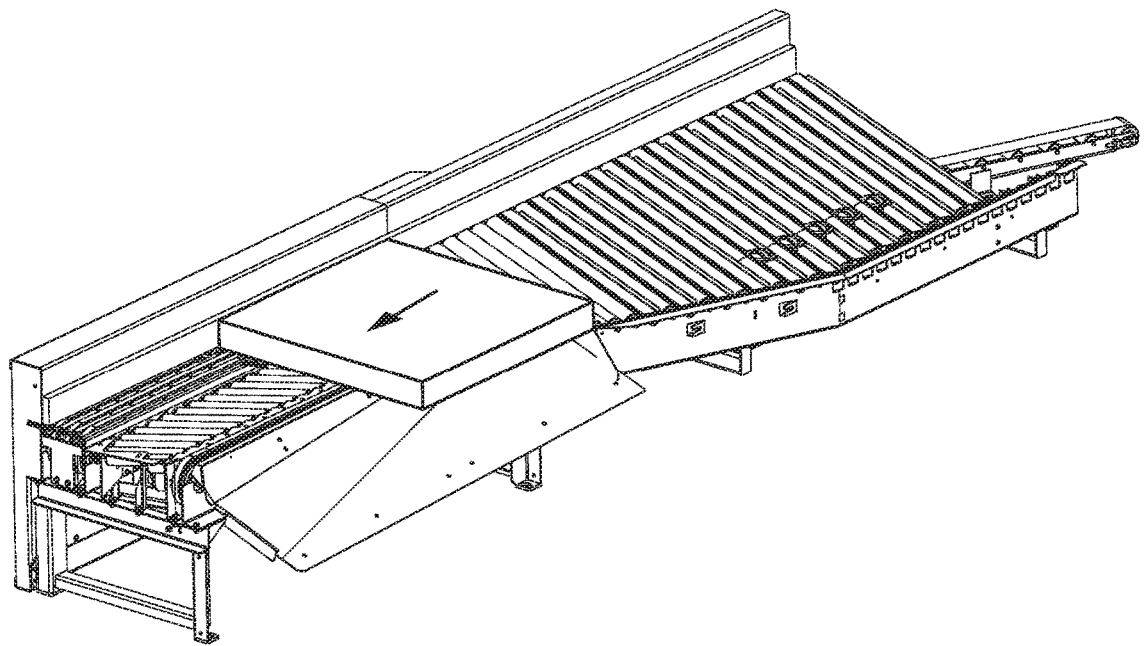
Figure 43F:
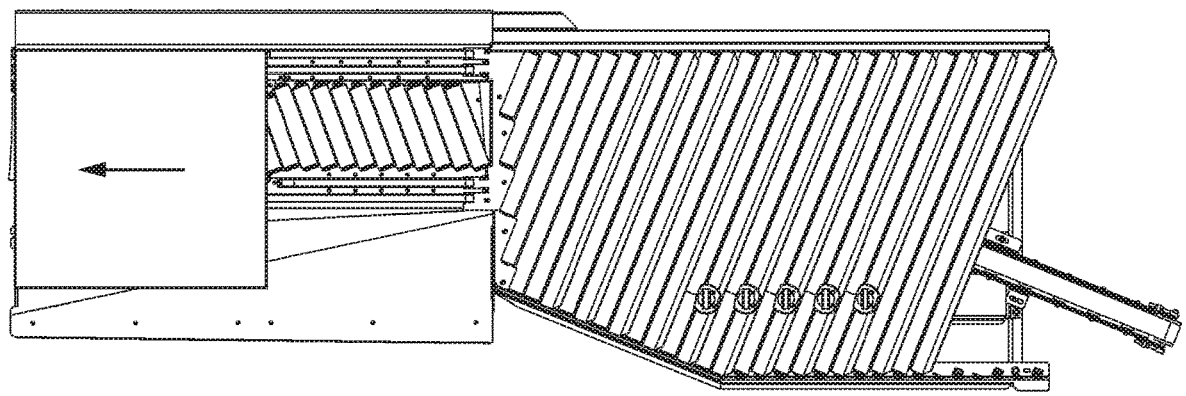
Figure 43G:
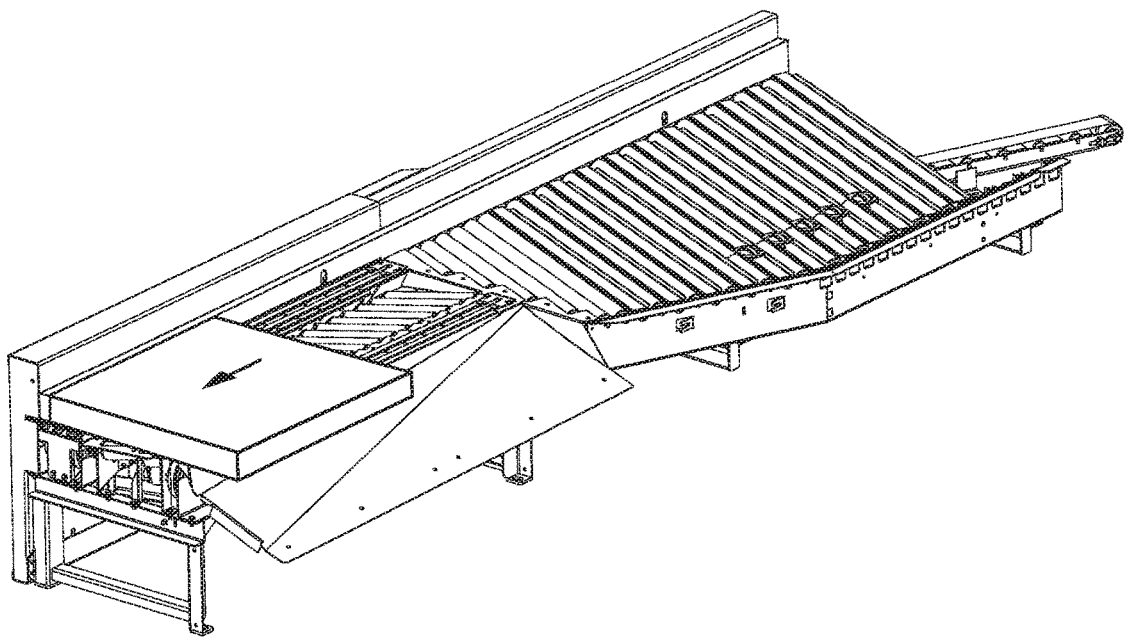

A first inner conveying lane having a high friction surface comprising two spaced apart aligned narrow belts adjacent a vertical wall in flow communication with a second middle conveying lane comprising a plurality of skewed rollers positioned having a lateral upward angle of from 1-30 degrees is shown in FIG. 42 wherein a first box is supported by the two narrow belts of the first conveying lane adjacent the vertical sidewall and a second box adjacent laterally thereto is positioned on the second conveying lane.

FIG. 43 (a-g) illustrate a multistage conveyor showing a first inner conveying lanes comprising two high friction surface conveying surfaces comprising two spaced apart aligned narrow belts adjacent a vertical wall in flow communication with a second middle conveying lane comprising a plurality of skewed rollers positioned having a lateral upward angle of from 1-30 degrees and a third conveying lane having a high friction surface comprising two space apart narrow belts wherein the first conveying lane and the third conveying lanes are at higher a level than the outer edge of the second conveying lane and a box is supported by the two narrow belts of the first conveying lane adjacent the vertical sidewall and the two narrow belts of the third conveying lane above the second conveying lane so the box passes thereover. A large flat box is shown in FIG. 43(b) aligned with a vertical wall supported by a powered skewed roller low friction conveying lane prior to entering a multistage conveyor. FIG. 43 (c) is a top view showing a large flat box biased against a vertical side wall supported by two high friction inner conveying lanes and two high friction outer conveying lane supported above the skewed roller low friction conveying lane therebetween. A large flat box is shown in 43(d) biased against a vertical side wall supported by two high friction inner conveying lanes and two high friction outer conveying lane supported above the skewed roller low friction conveying lane therebetween. The large flat box supported by a powered skewed roller low friction conveying lane prior to entering a multistage conveyor is shown in FIG. 43 (e). In FIG. 43(f), a large flat box biased against a vertical side wall supported by three high friction inner conveying lanes and one high friction outer conveying lane supported above the skewed roller low friction conveying lane therebetween. FIG. 43(g) is a sectional view of FIG. 43(d) showing a large flat box biased against a vertical side wall supported by three high friction inner conveying lanes and one high friction outer conveying lane supported above the skewed roller low friction conveying lane therebetween wherein the first conveying lanes increase in width and the outer conveying lanes decrease in width as the articles is conveyed forward.

Figure 44:
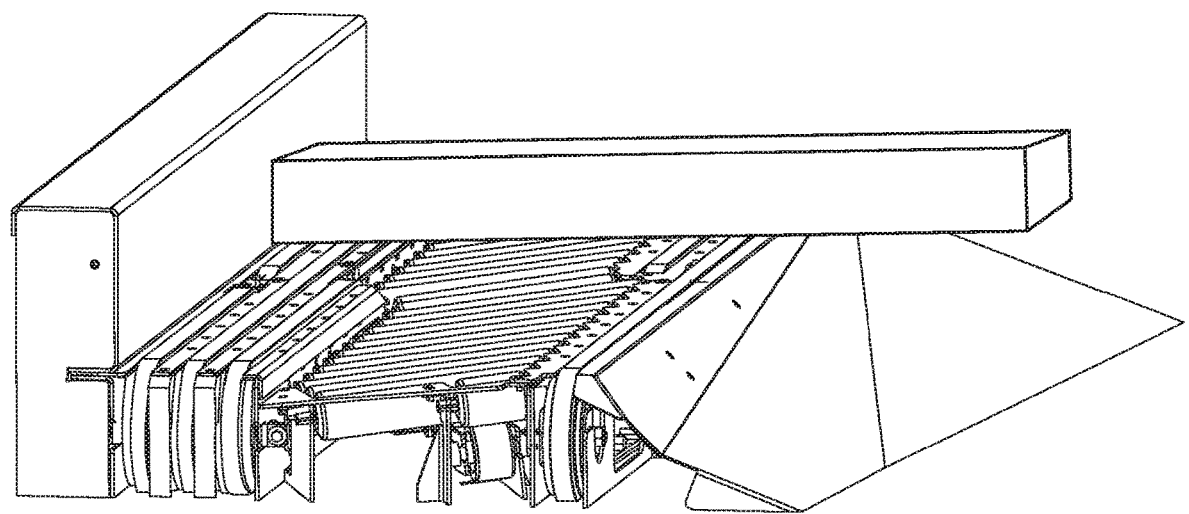
FIG. 44 is an isometric view of a multistage conveyor.

The multistage conveyor of FIG. 44 has a first inner conveying lane having a high friction surface comprising two spaced apart aligned narrow belts adjacent a vertical wall in flow communication with a second middle conveying lane comprising a plurality of skewed rollers positioned having a lateral upward angle of from 1-30 degrees and a third conveying lane having a high friction surface comprising two space apart narrow belts wherein the first conveying lane and the third conveying lanes are at higher a level than the outer edge of the second conveying lane and an elongated box is supported by the two narrow belts of the first conveying lane adjacent the vertical sidewall and the two narrow belts of the third conveying lane above the second conveying lane so the box passes thereover.

Figure 45:
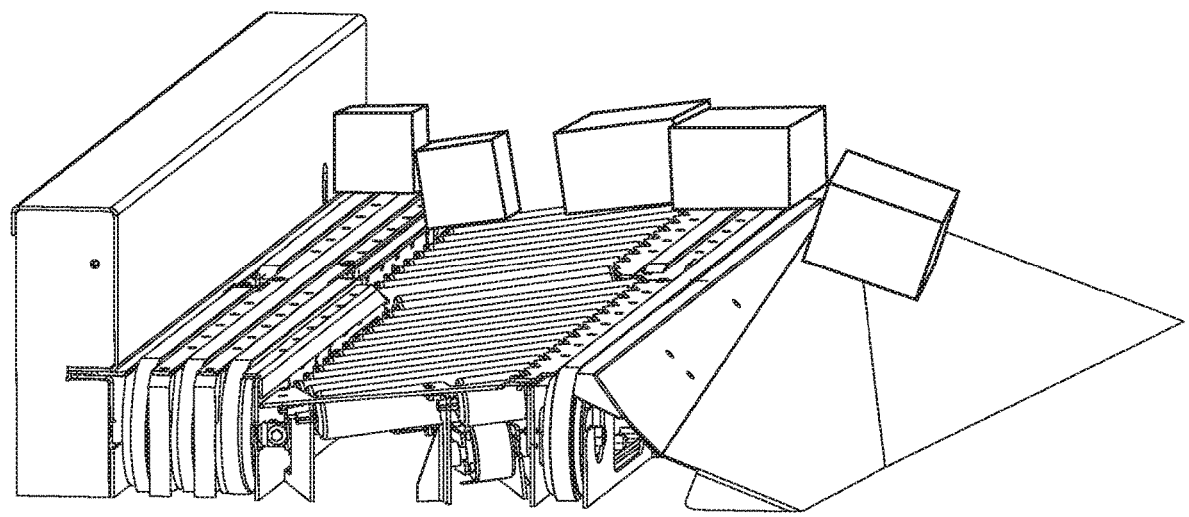
FIG. 45 shows an isometric view of a multistage conveyor.
Figure 46A:
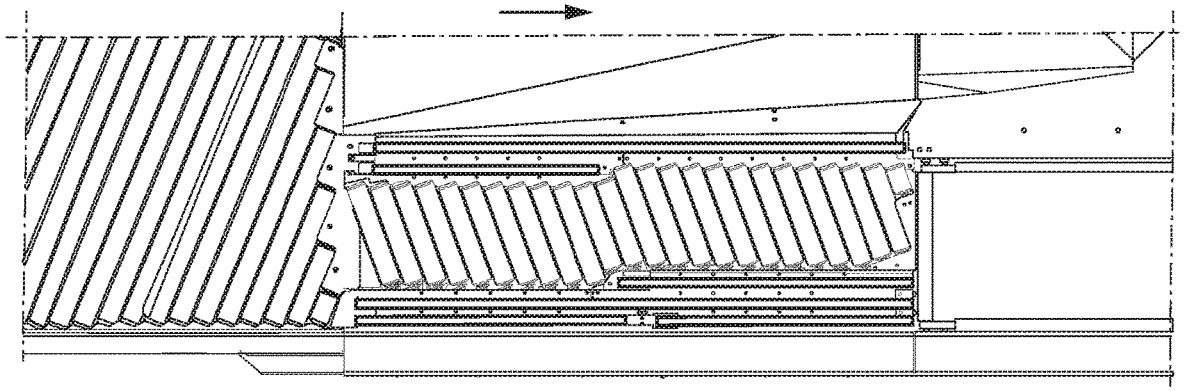
FIG. 46 (a) is a top view of a multistage conveyor.
FIG. 46(d) is a top view of FIG. 46(c)
FIG. 46(e) is a top view of FIG. 46 (d)
FIG. 46(f) is a top view of FIG. 46 (e)
FIG. 46(g) is a top view of FIG. 46 (f)
FIG. 46(h) is a top view of FIG. 46 (b) showing the first box conveyed on the first and second inner narrow belts of the first conveying lane at the end the second stage and the second box adjacent thereto and spaced apart therefrom balanced and supported on the third conveying lane of the end of the second stage.
FIG. 46(i) is a top view of FIG. 46 (h)
FIG. 46(j) is a top view of FIG. 46 (i)
Figure 46B:
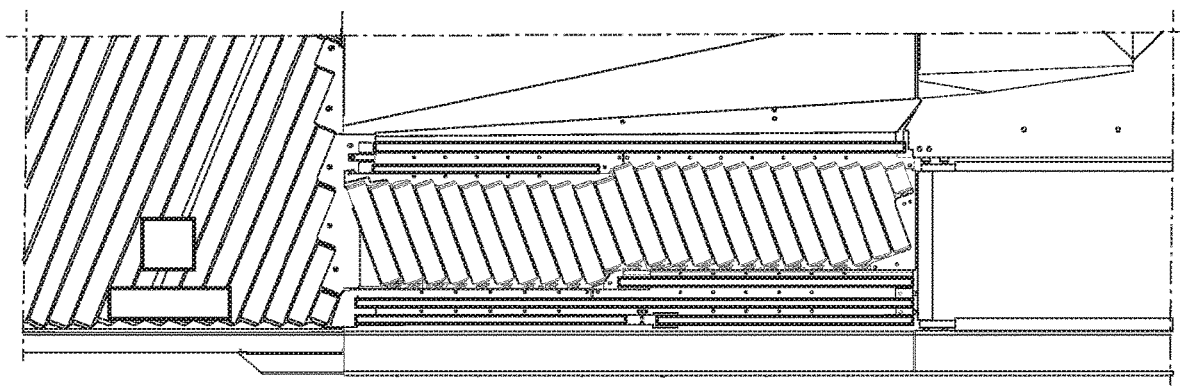
Figure 46C:
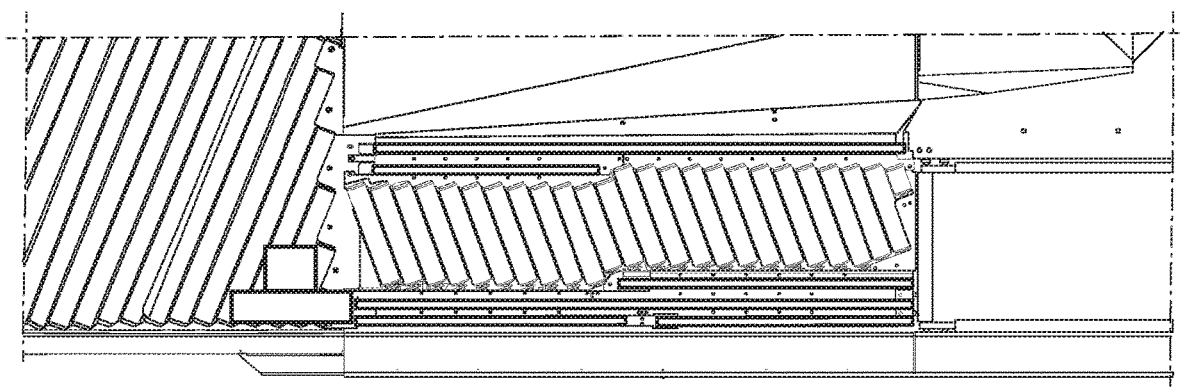
Figure 46D:
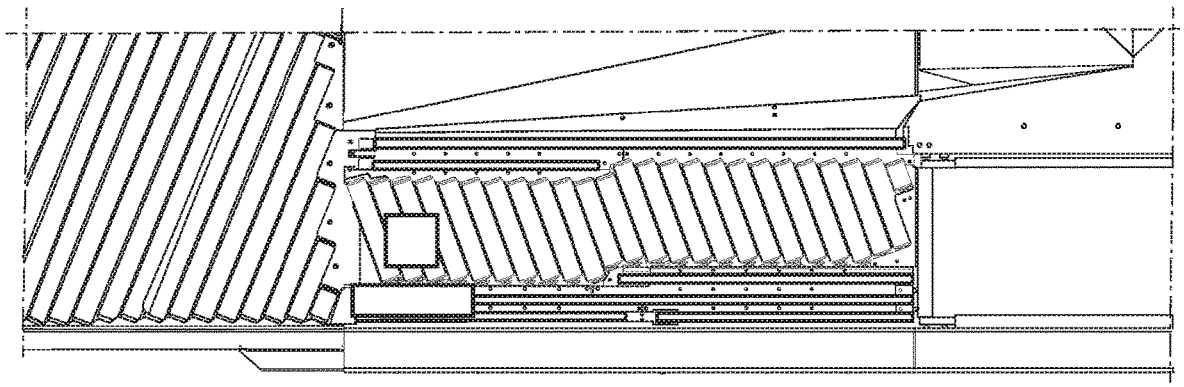
Figure 46E:
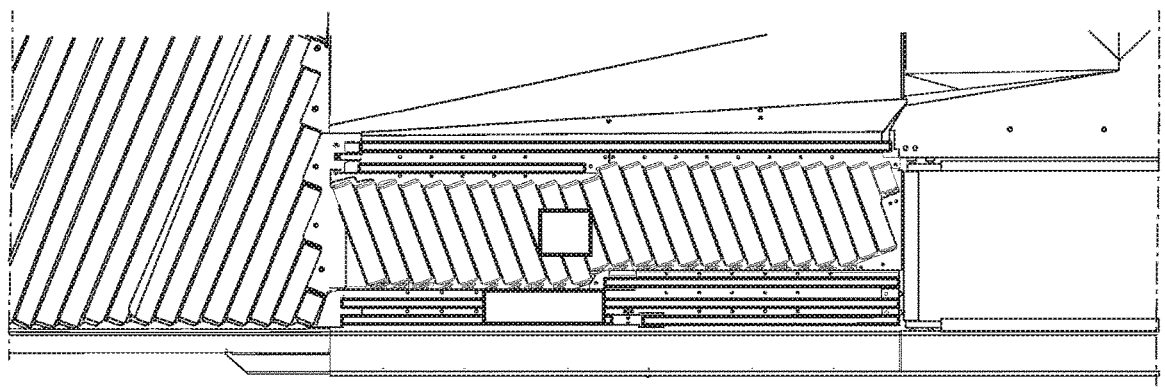
Figure 46F:
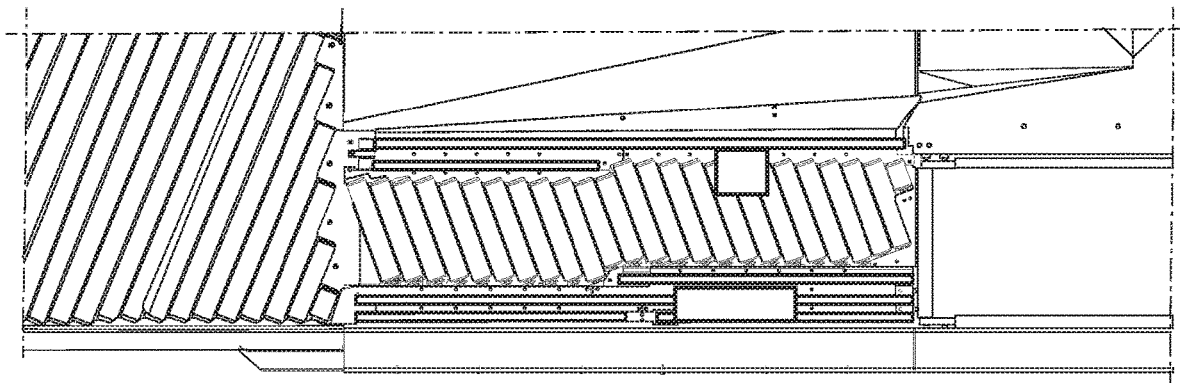
Figure 46G:
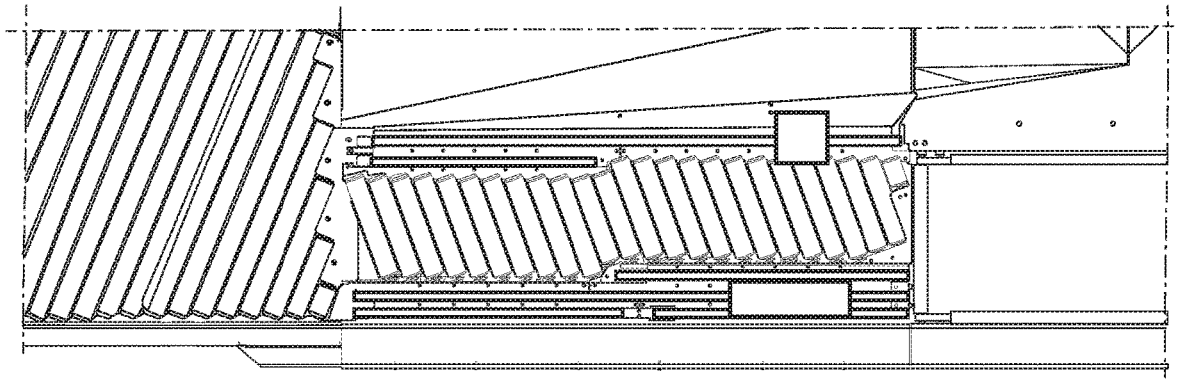
Figure 46H:
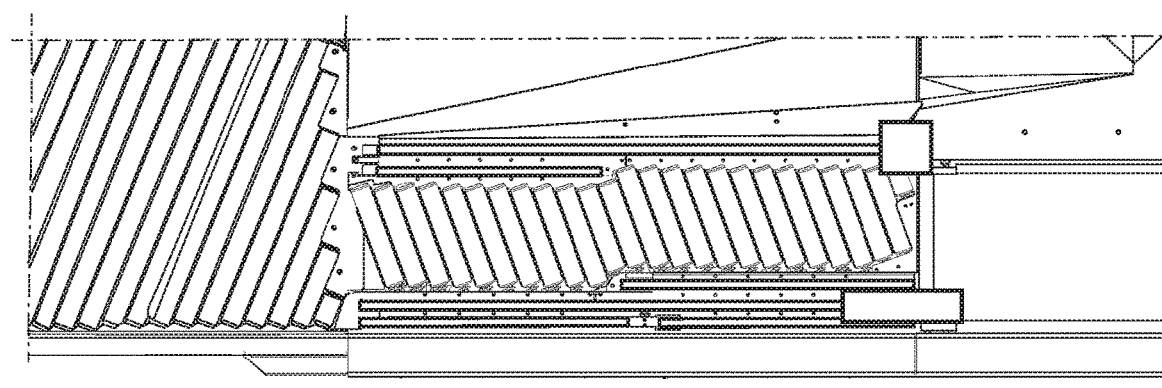
Figure 46I:
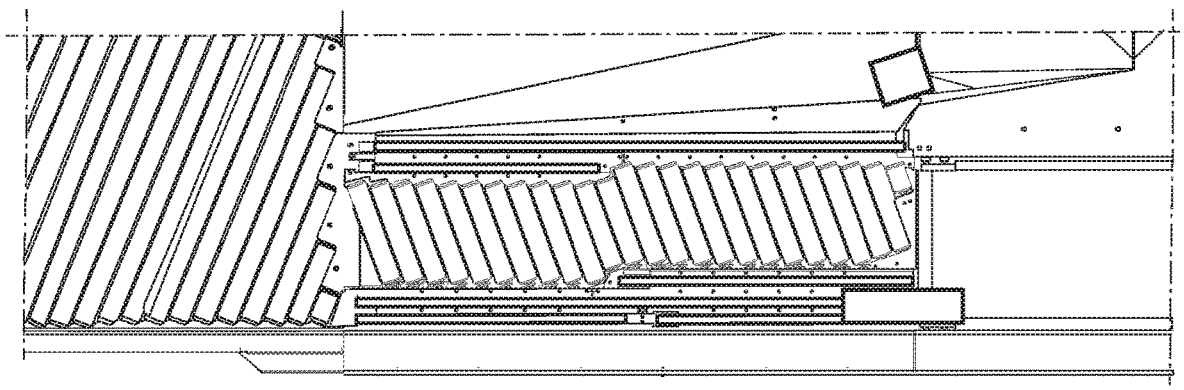
Figure 46J:
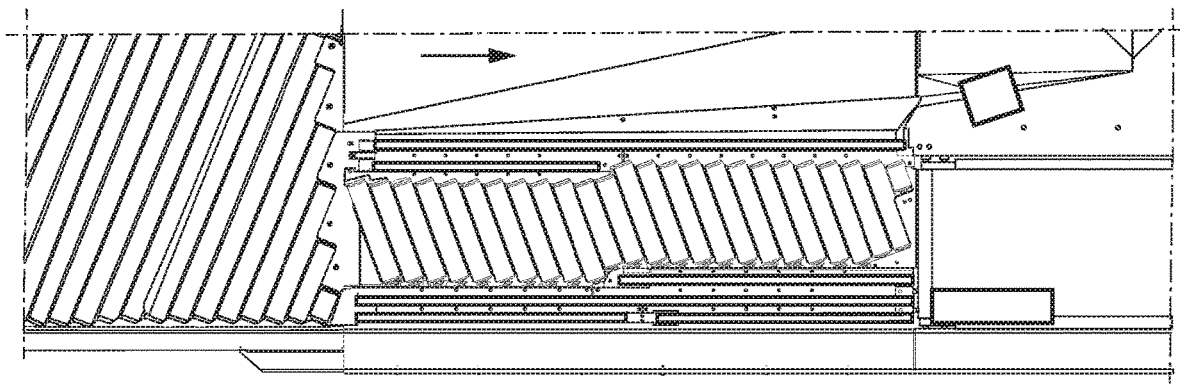

A first inner conveying lane having a high friction surface comprising three spaced apart aligned narrow belts adjacent a vertical wall in flow communication is shown in FIG. 45 having a first box supported thereon and a second middle conveying lane comprising a plurality of skewed rollers positioned having a lateral upward angle of from 1-30 degrees having a second box and a third box thereon laterally adjacent the first box and each other and moving in a forward and lateral upward movement toward a third outer conveying lane having a high friction surface comprising a pair of narrow belts and a fourth box adjacent the first box, second box, and third box, wherein the fourth box is balanced and supported by the third conveying lane and a fifth box adjacent the fourth box wherein the center of gravity of the fifth box has pulled the fifth box over the narrow belts of the third conveying lane and onto a discharge ramp.

FIG. 46 (*a-j*) a multistage conveyor showing an inner vertical side wall extending the length of a conveyor, and a first conveying lane having a high friction surface including a first inner narrow belt of a first stage in flow communication with a second inner narrow belt of a second stage for moving articles in a forward direction, a third inner narrow belt extending along the entire length of the conveyor from the first stage through the second stage spaced apart and adjacent the first and second inner narrow belts, and an adjacent fourth inner narrow belt starting at a selected downstream position defining the second stage near the center of the conveyor extending to the end of the conveyor for moving articles in a forward direction. A second conveying lane having a low friction surface positioned adjacent the outer edge of the second and third inner narrow belts and extending the entire length of the conveyor from the first stage through the second stage comprising a plurality of skewed rollers positioned having a lateral upward angle of up to 30 degrees for moving an article in a forward and lateral direction away from the first conveying lane with the low friction conveying lane positioned having a lateral angle of from 1-30 degrees. A third conveying lane having a high friction surface including a fifth outer narrow belt starting at the upper end of the conveyor first stage and in lateral flow communications with the second conveying lane and ending a selected distance downstream at the end of the first stage near the middle of the conveyor, and a sixth narrow outer belt extending the entire length of the conveyor from the first stage through the second stage adjacent outer edge of the fifth outer narrow belt having a downstream portion in flow communication with the portion of the low friction conveying lane adjacent thereto.

FIG. 46(*b*) includes a narrow first box adjacent the vertical side wall and a wide second box adjacent and spaced apart from the first box both supported by an upstream conveyor feeding the multistage multi-lane conveyor. FIG. 46 (*c*) has a first box adjacent the vertical side wall and the second box adjacent the first box both supported by an upstream conveyor feeding the multistage multi-lane conveyor whereby the first box is conveyed by the first and third inner narrow belts and the second box is aligned with the second conveying lane having a low friction surface. A first box conveyed on the first and second inner narrow belts of the first conveying lane and adjacent the vertical side wall, and the second box adjacent thereto and spaced apart therefrom conveyed forward and laterally on the second conveying lane of the first stage having a low friction surface is shown in FIG. 46(*d*). In FIG. 46(*e*), the first box is conveyed on the first and second inner narrow belts of the first conveying lane adjacent the vertical side wall and the second box adjacent thereto and spaced apart therefrom conveyed forward and laterally on the second conveying lane at the end of the first stage, prior to entering a second stage where the first conveying lane and second conveying lane shift toward the outer edge of the conveyor. The first box conveyed on the first and third inner narrow belts of the first conveying lane of the second stage and the second box spaced apart therefrom conveyed forward and laterally on the second conveying lane of the second stage adjacent the sixth outer narrow third conveying lane as shown in FIG. 46(*f*). The first box shown in FIG. 46(*g*) is conveyed on the first and second inner narrow belts of the first conveying lane of the second stage and the second box adjacent thereto and spaced apart therefrom moved forward and laterally from the second conveyor lane and balanced and supported on the third conveying lane of the second stage. The first box conveyed on the first and second inner narrow belts of the first conveying lane at the end the second stage and the second box adjacent thereto and spaced apart therefrom balanced are supported on the third conveying lane of the end of the second stage in FIG. 46(*h*). The first box is conveyed on the first and second inner narrow belts of the first conveying lane at the end the second stage transferring to a downstream conveyor and the second box adjacent thereto and spaced apart therefrom moved forward and laterally from the end of the second stage toward a take off ramp in FIG. 46(I). The first box is conveyed on the first and second inner narrow belts of the first conveying lane at the end the second stage transferred to a downstream conveyor and the second box adjacent thereto and spaced apart therefrom removed from the third conveying lane at the end of the second stage to a take off ramp as shown in FIG. 46(*j*).

Figure 47A:
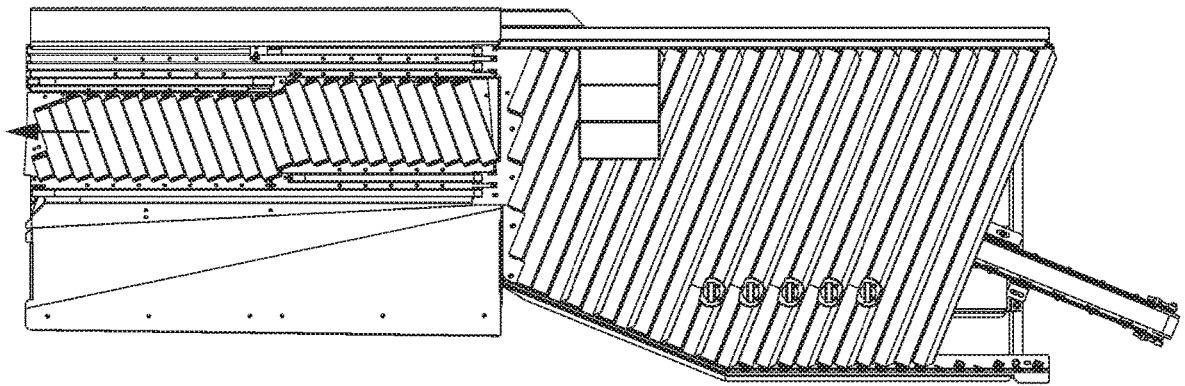
FIG. 47 (a) is a top view showing a inner box adjacent the vertical side wall, a second middle box adjacent the first box, and a third outer box adjacent the second middle box aligned and spaced apart supported by an upstream powered skewed roller conveyor feeding the multistage multi-lane conveyor.
Figure 47B:
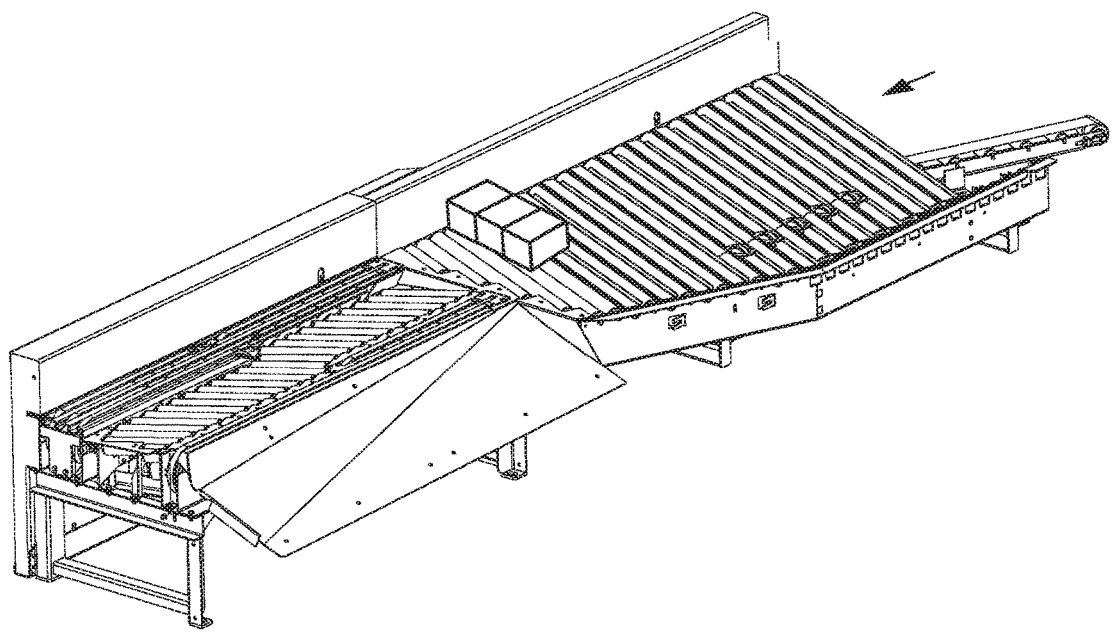
Figure 47C:
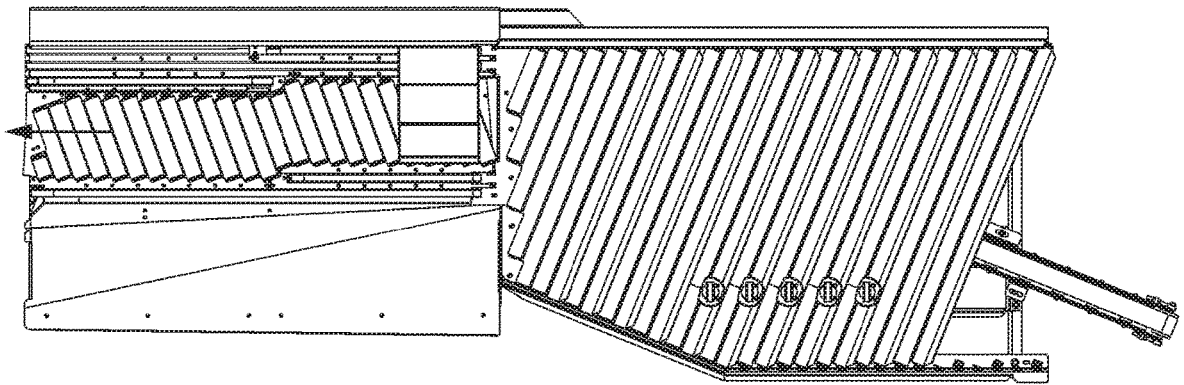
Figure 47D:
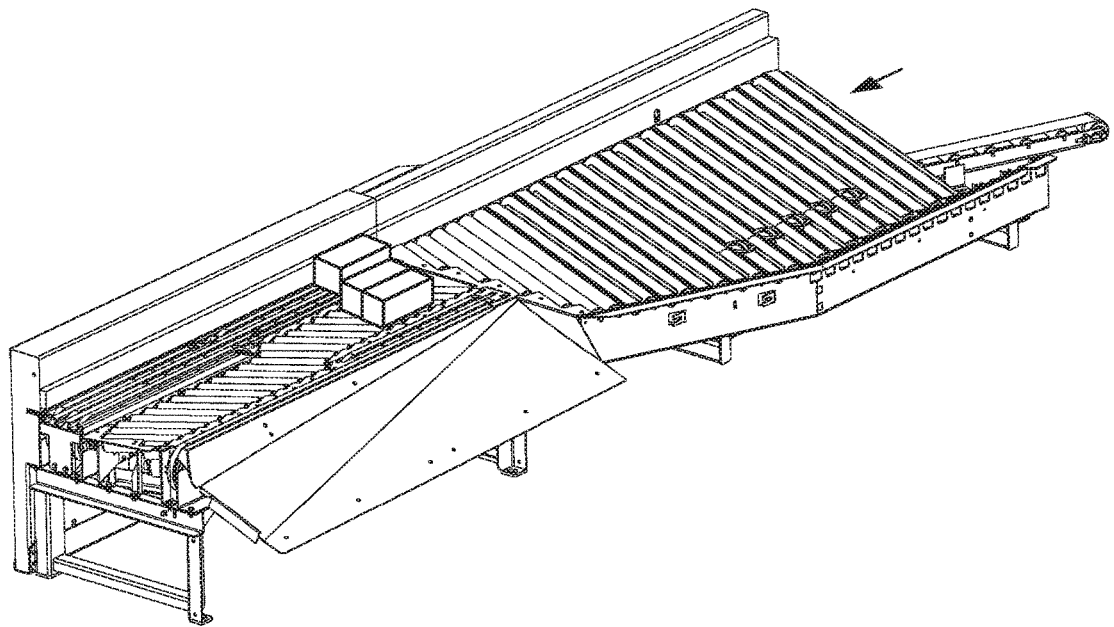
Figure 47I:
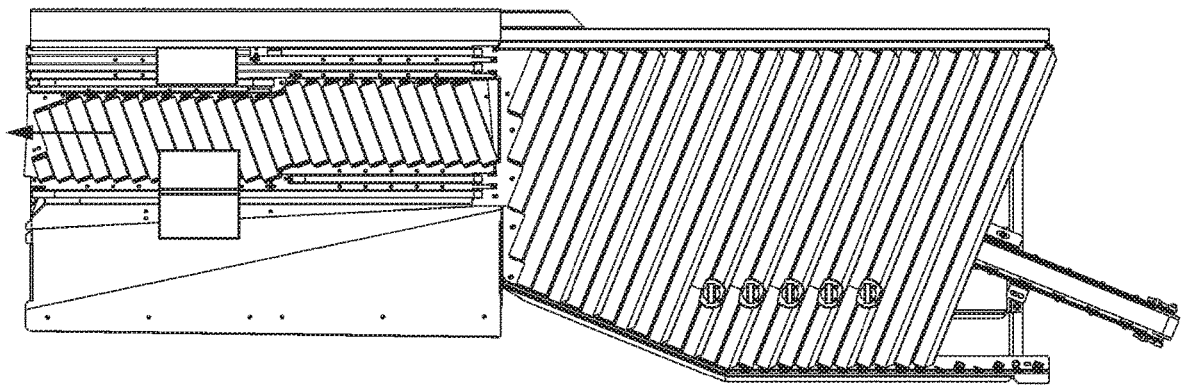
Figure 47J:
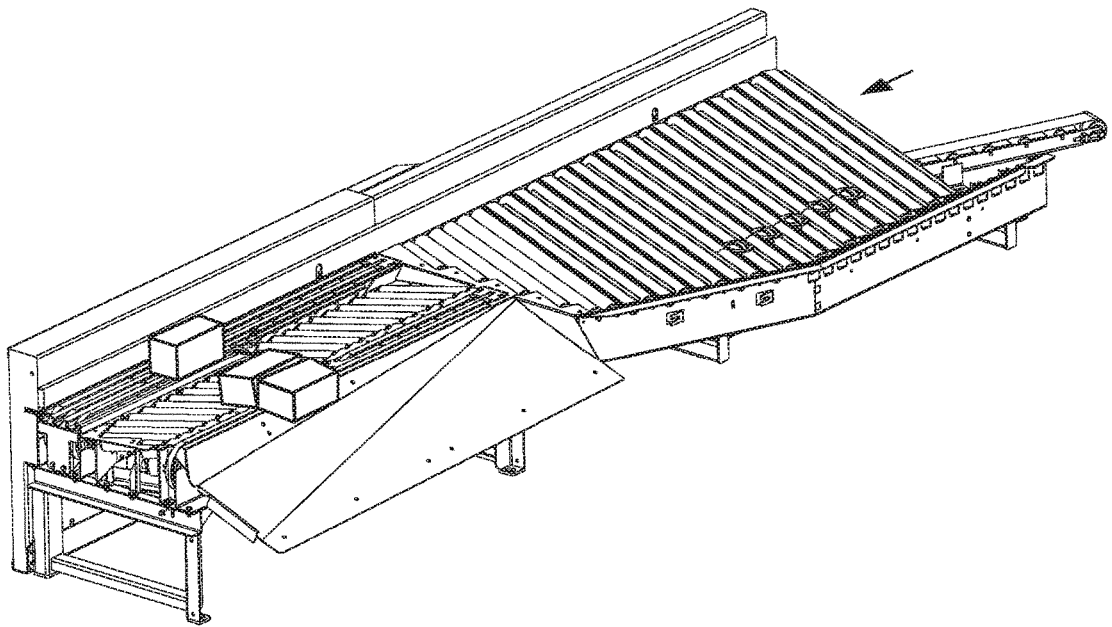
Figure 47E:
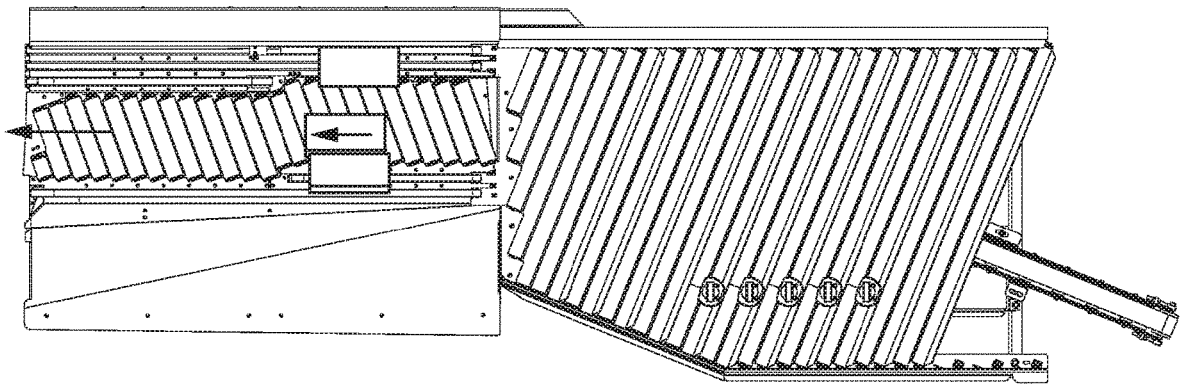
Figure 47F:
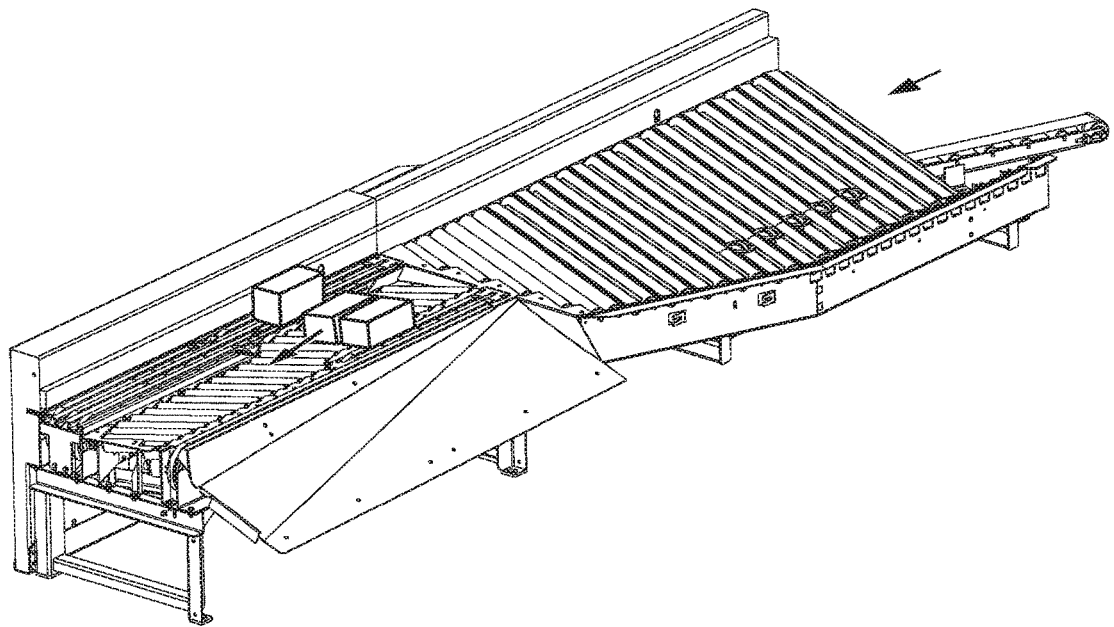
Figure 47G:
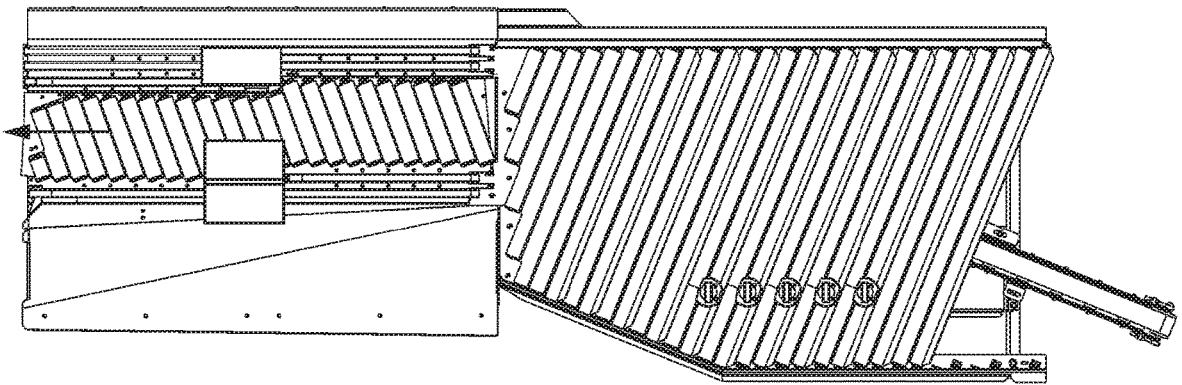
Figure 47H:
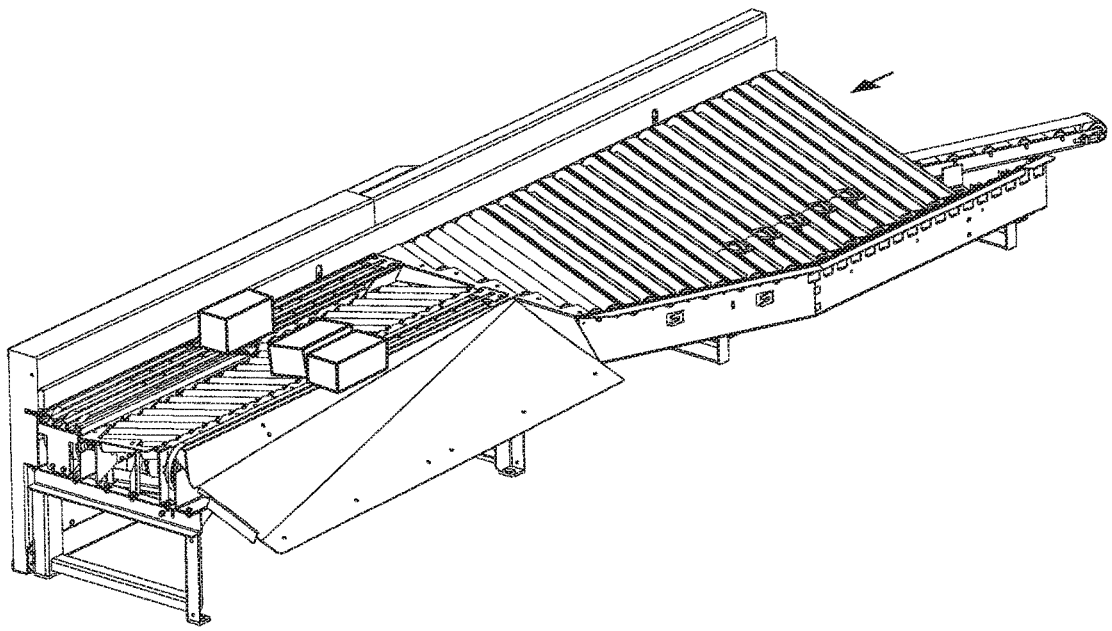
Figure 47K:
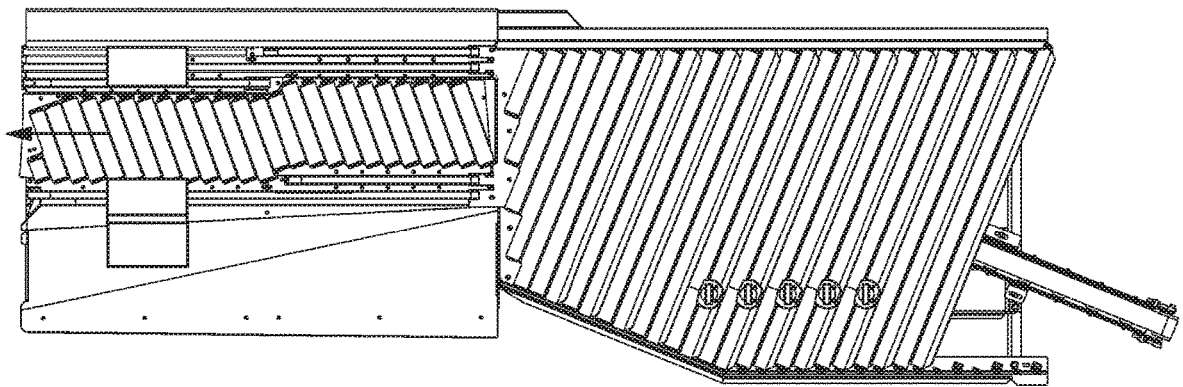
Figure 47:
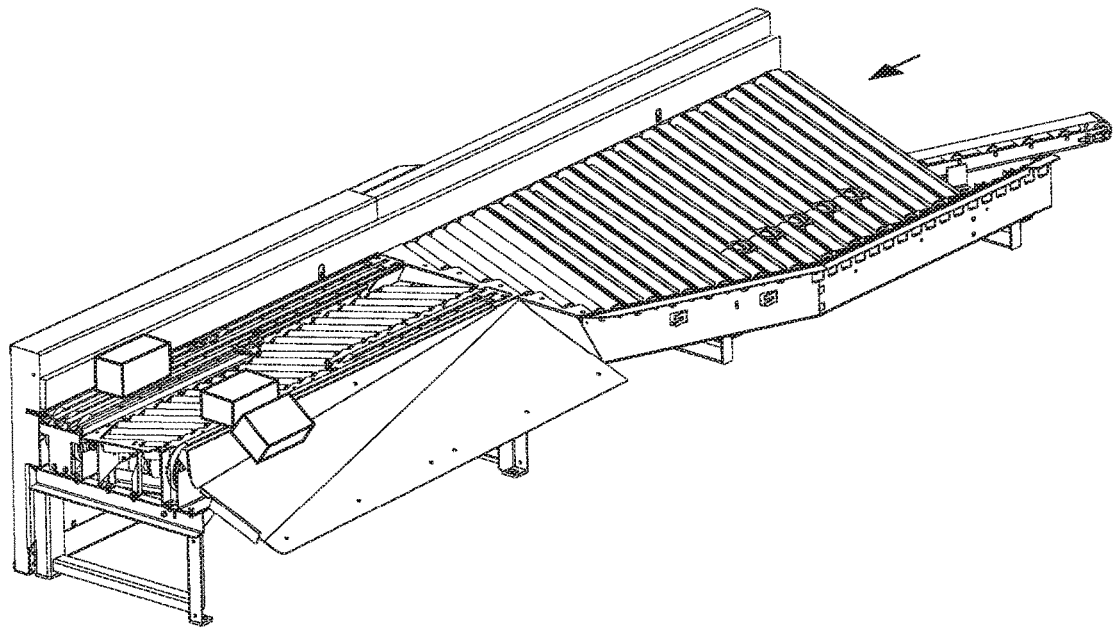
Figure 47M:
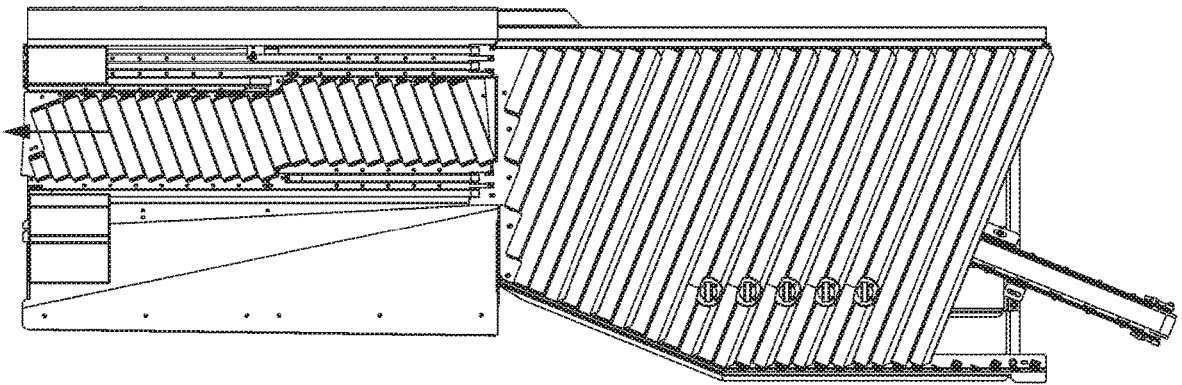
Figure 47N:
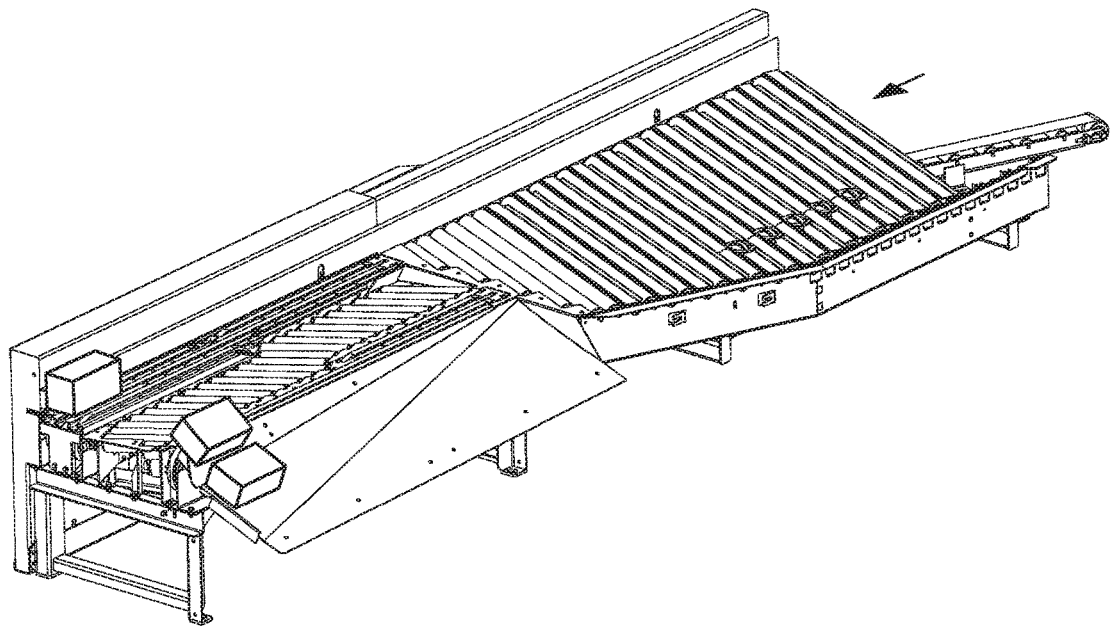

FIG. 47 (*a-n*) include an inner box adjacent the vertical side wall, a second middle box adjacent the first box, and a third outer box adjacent the second middle box aligned and spaced apart supported by an upstream powered skewed roller conveyor feeding the multistage multi-lane conveyor. An inner box is positioned adjacent the vertical side wall, a second middle box is adjacent the first box, and a third outer box is adjacent the second middle box aligned and spaced apart supported by an upstream powered skewed roller conveyor feeding the multistage multi-lane conveyor. The inner box adjacent the vertical side wall is supported by a first conveying lane having two narrow high friction belts, the second middle box and adjacent third outer box supported by a second conveying lane having a plurality of low friction powered skewed conveyor rollers. The inner box adjacent the vertical side wall is supported by a first conveying lane having two narrow high friction belts, the second middle box and adjacent third outer box supported by a second conveying lane having a plurality of low friction powered skewed conveyor rollers as shown in FIG. 47(*d*). FIG. 47 (*e*) shows the inner box adjacent the vertical side wall supported by a first conveying lane having two narrow high friction belts moving forward, the second middle box is supported by a second conveying lane having a plurality of low friction powered skewed conveyor rollers moving the second middle box forward and laterally outward, and the third outer box supported by a third conveying lane having two narrow high friction belts moving the third outer box forward. The inner box adjacent the vertical side wall is supported by a first conveying lane having two narrow high friction belts moving forward, the second middle box supported by a second conveying lane having a plurality of low friction powered skewed conveyor rollers moving the second middle box forward and laterally outward, and the third outer box supported by a third conveying lane having two narrow high friction belts moving the third outer box forward as shown in FIG. 47(f). As shown in FIG. 47 (g) the inner box adjacent the vertical side wall is supported by a first conveying lane having two narrow high friction belts transitioning to three narrow high friction belts moving forward, second middle box is supported by a second conveying lane having a plurality of low friction powered skewed conveyor rollers moving the second middle box forward and laterally outward, and the third outer box is supported by a third conveying lane transitioning from two narrow high friction belts to one narrow high friction belts moving the third outer box forward, whereby the high friction surface of the inner first conveying lane increases in width and the high surface area of the third conveying lane decreases in width on the outer take-off lane side. The inner box adjacent the vertical side wall shown in FIG. 47(g) is supported by a first conveying lane having two narrow high friction belts transitioning to three narrow high friction belts moving the inner box forward, the second middle box is supported by a second conveying lane having a plurality of low friction powered skewed conveyor rollers moving the second middle box forward and laterally outward, and the third outer box is supported by an outer third conveying lane transitioning from two narrow high friction belts to one narrow high friction belt moving the third outer box forward, whereby the high friction surface of the inner first conveying lane increases in width and the high surface area of the third conveying lane decreases in width on the outer take-off lane side. A top view shows the inner box adjacent the vertical side wall supported by a first conveying lane having three narrow high friction belts moving the inner box forward, the second middle box supported by a second conveying lane having a plurality of low friction powered skewed conveyor rollers moving the second middle box forward and laterally outward contacting the third conveying lane high friction belt, and the third outer box moving laterally from the second conveying lane over and onto the third conveying lane having a single high friction narrow belt whereby the third outer box center of gravity causes the outer box to drop over the narrow high friction belt and onto the drop off ramp for removal or recirculation in FIG. 47 (l). The inner box shown in FIG. 47(j) adjacent the vertical side wall is supported by a first conveying lane having three narrow high friction belts moving the inner box forward, the second middle box is supported by a second conveying lane having a plurality of low friction powered skewed conveyor rollers moving the second middle box forward and laterally outward contacting the third conveying lane high friction belt, and the third outer box moving laterally from the second conveying lane over and onto the third conveying lane having a single high friction narrow belt whereby the third outer box center of gravity causes the outer box to drop over the narrow high friction belt and onto the drop off ramp for removal or recirculation. Moreover, as shown in FIG. 47 (k) the inner box adjacent the vertical side wall supported by a first conveying lane having three narrow high friction belts moving the inner box forward, the second middle box has moved laterally over onto the third conveying lane high friction belt, and the third outer box has been discharged. the inner box adjacent the vertical side wall of FIG. 47(1) is supported by a first conveying lane having three narrow high friction belts moving the inner box forward, the second middle box has moved laterally over onto the third conveying lane high friction belt, and the third outer box has been discharged. FIG. 47 (m) shows the inner box adjacent the vertical side wall supported by a first conveying lane having three narrow high friction belts moving the inner box forward, and the second middle box moving laterally from the second conveying lane over the third conveying lane having a single high friction narrow belt whereby the third outer box center of gravity causes the outer box to drop over the narrow high friction belt and onto the drop off ramp for removal or recirculation. The inner box is adjacent the vertical side wall supported by a first conveying lane having three narrow high friction belts moving the inner box forward, and the second middle box moving laterally from the second conveying lane over the third conveying lane having a single high friction narrow belt whereby the third outer box center of gravity causes the outer box to drop over the narrow high friction belt and onto the drop off ramp for removal or recirculation as shown in FIG. 47(n).

FIG. 48 (a-f) provides for a multistage conveyor showing an inner vertical side wall extending the length of a conveyor. A first conveying lane having a high friction surface including a first inner narrow belt extending along the entire length of the conveyor from the first stage through a third stage and a second inner narrow belt extending from a second stage through a third stage in spaced apart alignment with the first inner narrow belt and a third inner narrow belt extending from the end of the second stage in spaced apart alignment with the second inner narrow belt through the third stage for moving articles in a forward direction. A second conveying lane having a low friction surface positioned adjacent the outer edge of the first conveying lane shifting outward along the outer edge of the first inner narrow belt, the second inner narrow belt, and the third inner narrow belt in lateral flow communication therewith, and extending the entire length of the conveyor from the first stage through the third stage comprising a plurality of skewed rollers for moving an article in a forward and lateral direction away from the first conveying lane with the low friction second conveying lane positioned having a lateral angle of up to 30 degrees. A third conveying lane having a high friction surface in lateral flow communication with the second conveying lane including a fourth outer narrow belt extending through the conveyor first stage terminating at the second stage, a fifth outer narrow belt extending through the conveyor first and second stages spaced apart from and aligned with the fourth outer narrow belt, and a sixth outer narrow belt extending form the first stage through the third stage shifting outward along the outer edge of the second conveying lane.

Figure 48A:
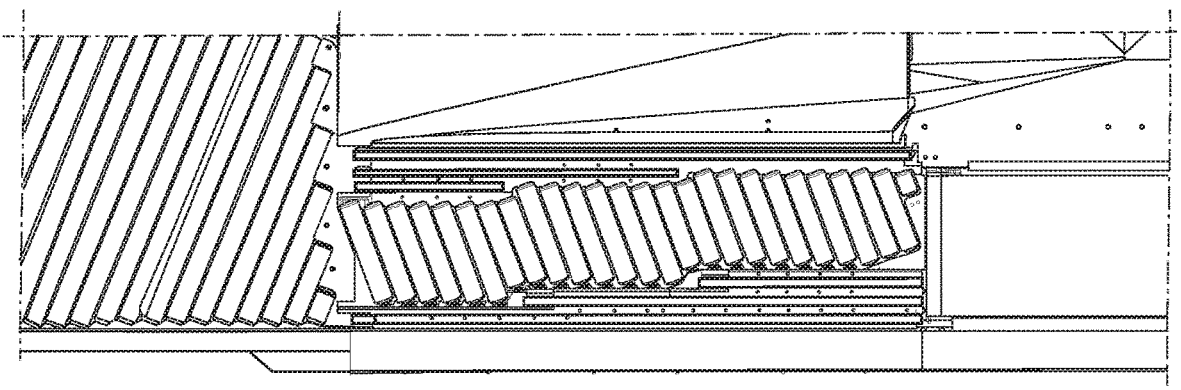
FIG. 48 (a) is a top view of a multistage conveyor.
FIG. 48(b) is a top view of FIG. 48 (a)
FIG. 48(d) is a top view of FIG. 48 (c) showing the first box conveyed on the first inner narrow belt of the first conveying lane adjacent the vertical side wall, the second box conveyed forward and laterally on the second lane has shifted over and balanced on the sixth outer narrow belt of the third stage, and the third box shifted over onto a first discharge ramp.
FIG. 48(e) is a top view of FIG. 48(d)
FIG. 48(f) is a top view of FIG. 48(e)
Figure 48B:
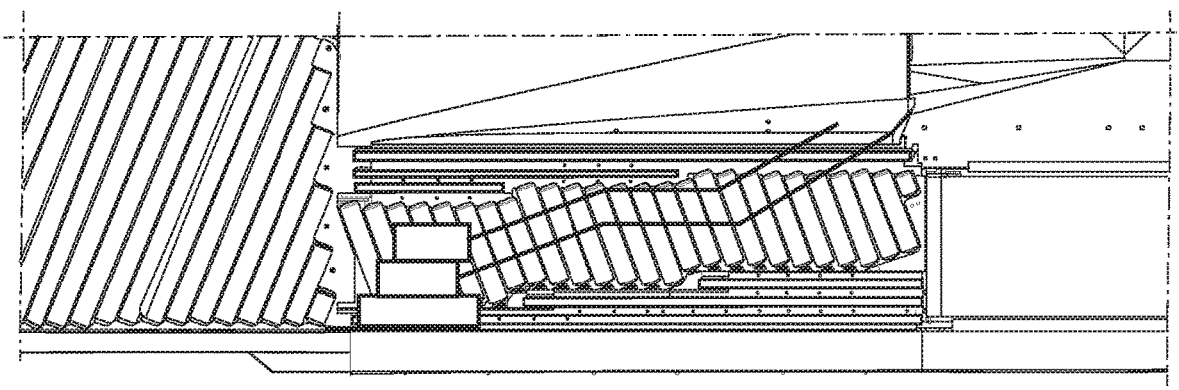
Figure 48C:
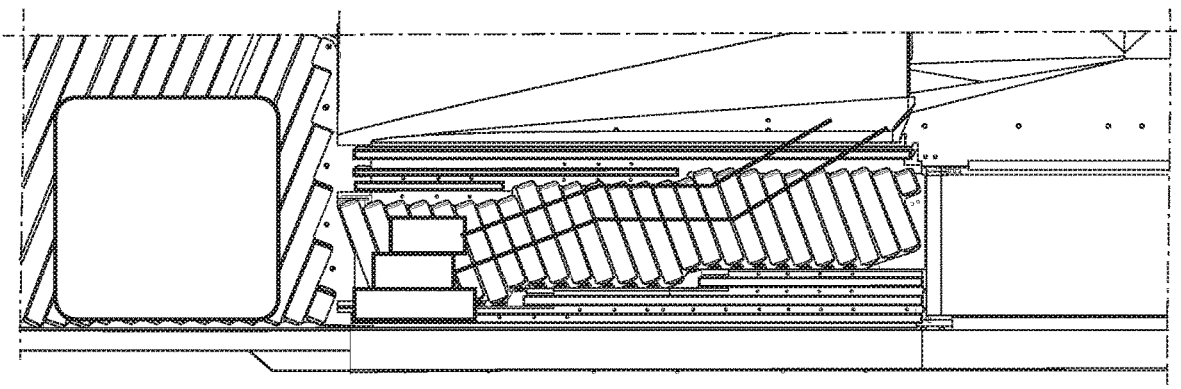
Figure 48D:
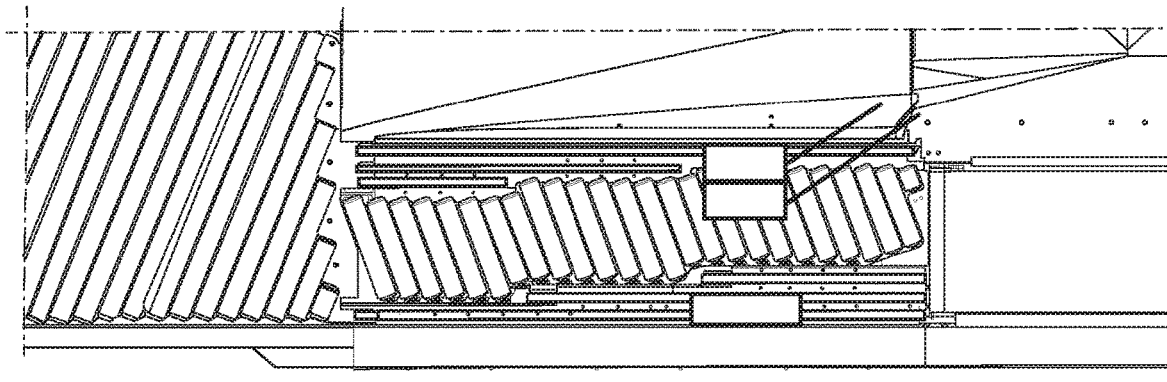
Figure 48E:
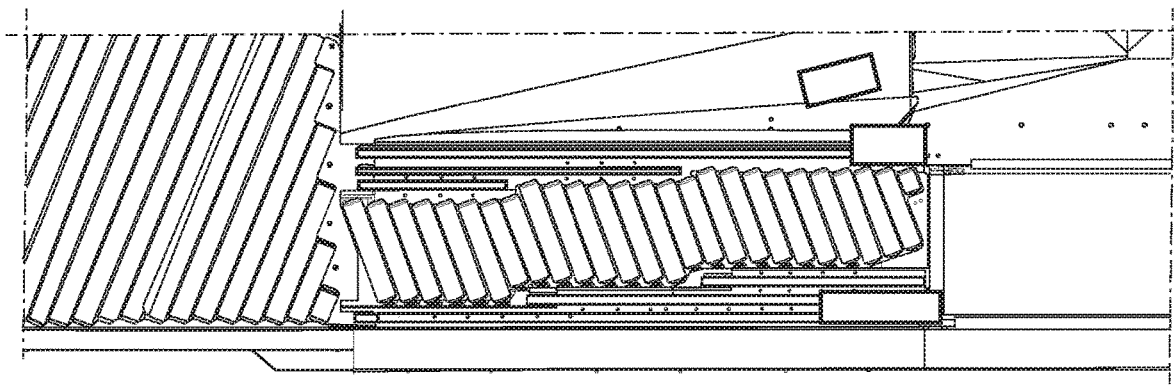
Figure 48F:
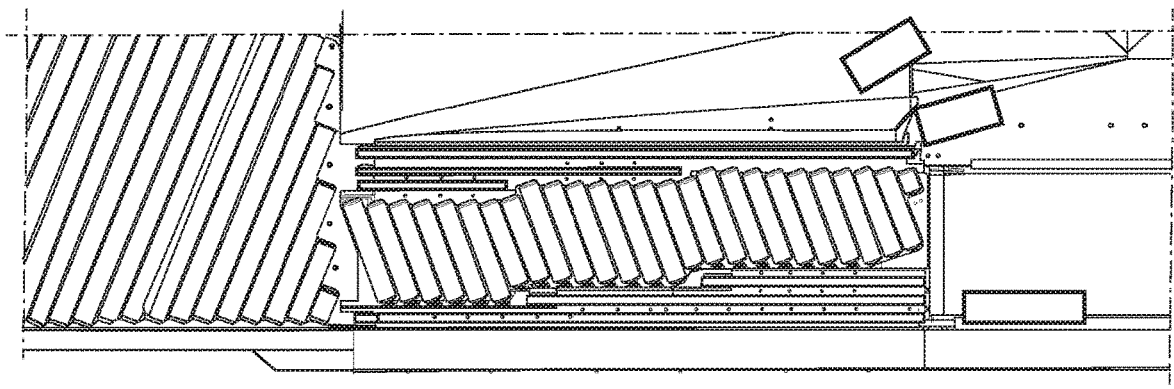

More particularly, FIG. 48(b) shows a first box conveyed on the first inner narrow belt of the first conveying lane adjacent the vertical side wall, a second box adjacent thereto and spaced apart therefrom conveyed forward on the second conveying lane, and a third box adjacent to the second box and spaced apart therefrom conveyed forward on the second conveying lane. A first box conveyed on the first inner narrow belt of the first conveying lane adjacent the vertical side wall, a second box adjacent thereto and spaced apart therefrom conveyed forward on the second conveying lane, and a third box adjacent to the second box and spaced apart therefrom conveyed forward on the second conveying lane and a bag of small parcels conveyed by an upstream feed conveyor in alignment for conveyance over the first, second and third conveying lanes as illustrated in FIG. 48(c). FIG. 48(d) is a top view of FIG. 48 (a) shows the first box conveyed on the first inner narrow belt of the first conveying lane adjacent the vertical side wall, the second box conveyed forward and laterally on the second lane has shifted over and balanced on the sixth outer narrow belt of the third stage, and the third box shifted over onto a first discharge ramp. In FIG. 48(e), the first box conveyed on the first inner narrow belt of the first conveying lane along the vertical sidewall and through the third stage transferred to a downstream conveyor, the second middle box adjacent thereto and spaced apart therefrom moved forward over the sixth outer narrow belt of the third conveying lane toward a ramp, and the third box has fallen over the narrow belt of the third stage onto a ramp. The first box conveyed on the first inner narrow belt of the first conveying lane along the vertical sidewall and through the third stage transferred to a downstream conveyor, the second box adjacent thereto and spaced apart therefrom moved forward over the sixth outer narrow belt of the third conveying lane and diverted to a second ramp positioned at the end of the third conveying lane in FIG. 48(f).

FIGS. 49(a-e) comprise a multistage conveyor showing an inner vertical side wall extending the length of a conveyor. A first conveying lane having a high friction surface including a seven inner narrow belts with the first inner narrow belt extends along the entire length of the conveyor and the second, third, fourth, fifth, sixth, and seventh inner narrow belts having a progressive decreasing length forms a diagonal high friction surface area extending from a front right corner to a rear left corner. A second conveying lane having a low friction surface is positioned adjacent the outer edge of the first conveying lane shifting outward along the outer edge of the inner narrow belts in a diagonal direction comprising a plurality of short skewed rollers for moving an article in a forward and lateral direction away from the first conveying lane. A third conveying lane having a high friction surface in lateral flow communication with the second conveying lane includes an eighth, a ninth, a tenth, and eleventh, a twelfth, a thirteenth, and a fourteenth outer narrow belt of progressing length extending through the conveyor spaced apart from and aligned shifting outward along the outer edge of the second conveying lane.

Figure 49A:
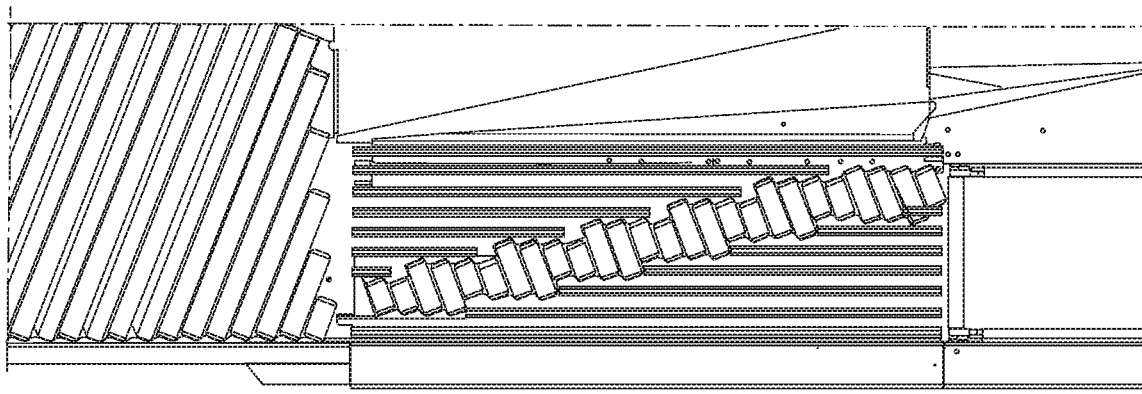
FIG. 49(a) is a top view of a multistage conveyor.
Figure 49B:
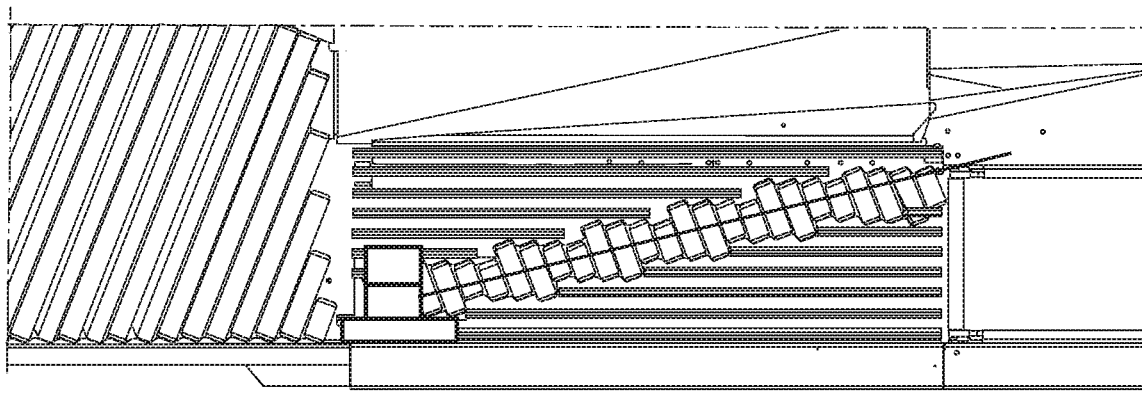
FIG. 49(b) is a top view of FIG. 49(a)
Figure 49C:
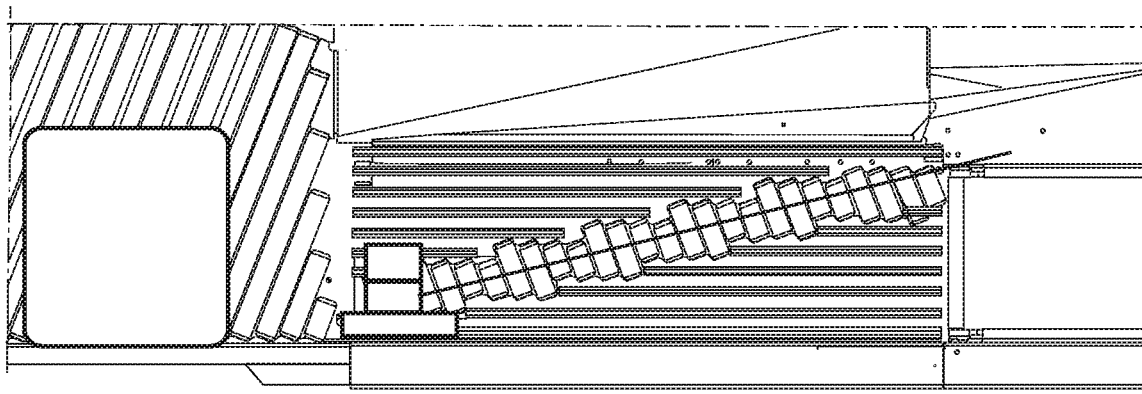
FIG. 49(c) is a top view of FIG. 49 (b)
Figure 49D:
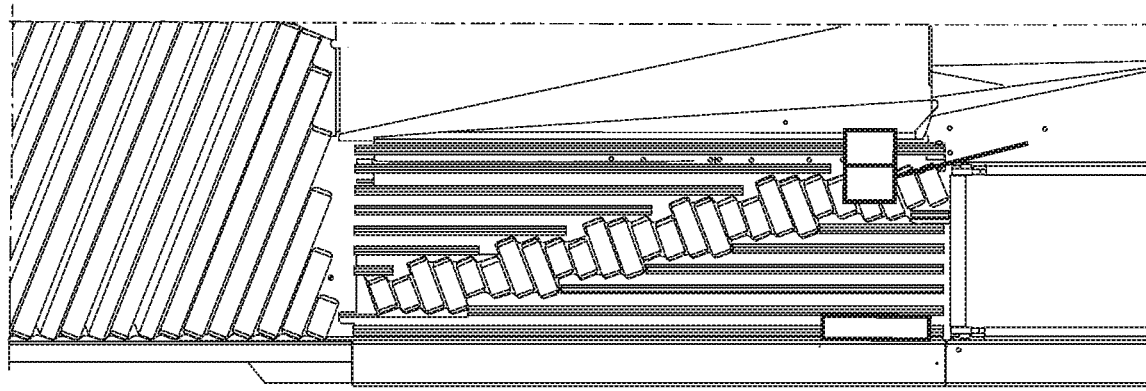
FIG. 49(d) is a top view of FIG. 49 (c)
Figure 49E:
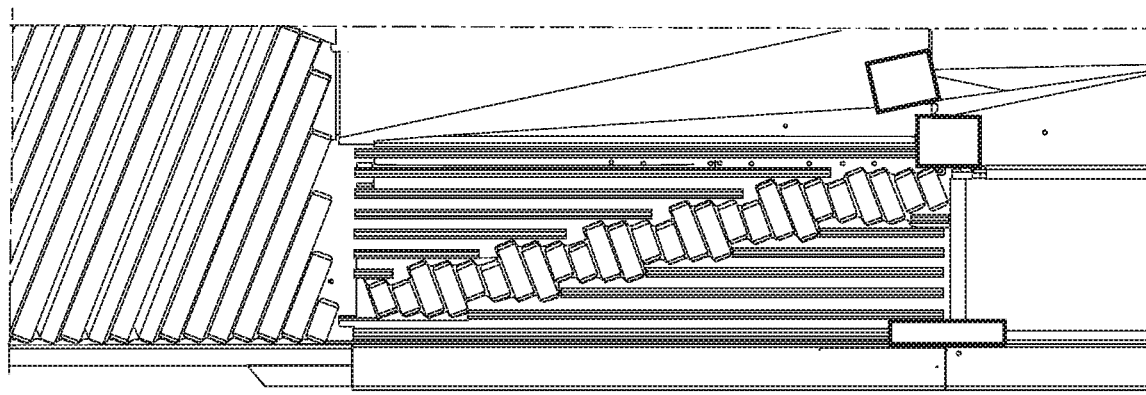
FIG. 49(e) is a top view of FIG. 49(d)

More particularly, FIG. 49(b) includes a first box resting on the first conveying lane adjacent the vertical sidewall through the conveyor, a second box resting on the second conveying lane spaced apart from and adjacent the first box, and a third box having a portion resting on the second conveying lane and a portion resting on the second and third inner narrow belts of the third conveying lane. In FIG. 49(c) a first box resting on the first conveying lane adjacent the vertical sidewall through the conveyor, a second box resting on the second conveying lane spaced apart from and adjacent the first box, and a third box having a portion resting on the second conveying lane and a portion resting on the second and third inner narrow belts of the third conveying lane with a bag of small parcels resting on an upstream feed conveyor aligned with the first, second and third conveying lanes. The first box is conveyed on the first conveying lane adjacent the vertical sidewall through the conveyor in flow communication with a downstream conveyor, the second box is conveyed forward and laterally adjacent the third conveying lane, and the third box moves forward and laterally shifting over and onto the fourteenth outer narrow belt of the third conveying lane as shown in FIG. 49(d). FIG. 49(e) shows a first box conveyed on the first conveying lane adjacent the vertical sidewall through the conveyor in flow communication with a downstream conveyor, the second box is conveyed forward and laterally shifting over and onto the fourteenth outer narrow belt of the third conveying lane and the fourth box shifting laterally onto an off ramp.

FIGS. 50(a-d) comprise or consist of a multistage conveyor showing an inner vertical side wall extending the length of a conveyor. A first conveying lane has a high friction surface including a seven inner narrow belts with the first inner narrow belt extending along the entire length of the conveyor and the second, third, fourth, fifth, sixth, and seventh inner narrow belts have a progressive decreasing length forming a diagonal high friction surface area extending from a front right corner to a rear left corner. A second conveying lane having a low friction surface is positioned adjacent the outer edge of the first conveying lane shifting outward along the outer edge of the inner narrow belts in a diagonal direction comprising a plurality of short skewed rollers for moving an article in a forward and lateral direction away from the first conveying lane. A third conveying lane having a high friction surface in lateral flow communication with the second conveying lane including an eighth, a ninth, a tenth, and eleventh, a twelfth, a thirteenth, and a fourteenth outer narrow belt of progressing length extends through the conveyor spaced apart from and aligned shifting outward along the outer edge of the second conveying lane.

Figure 50A:
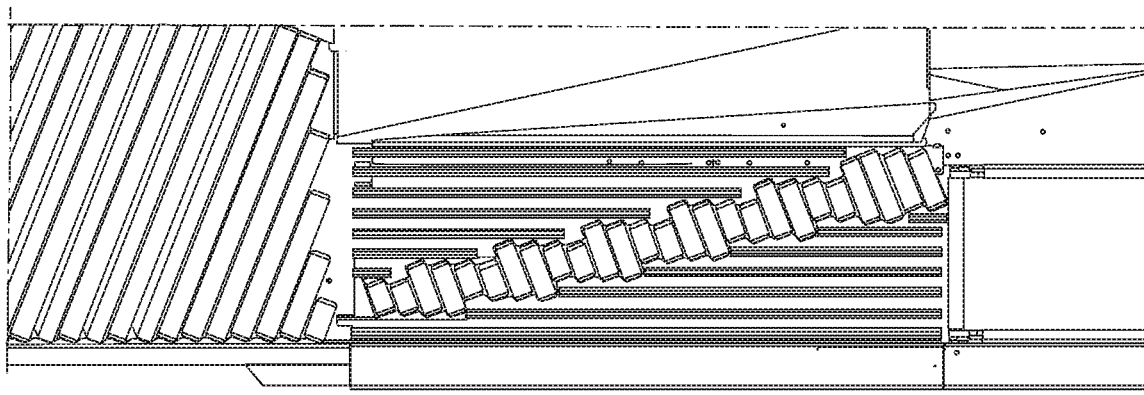
FIG. 50(a) is a top view of a multistage conveyor.
Figure 50B:
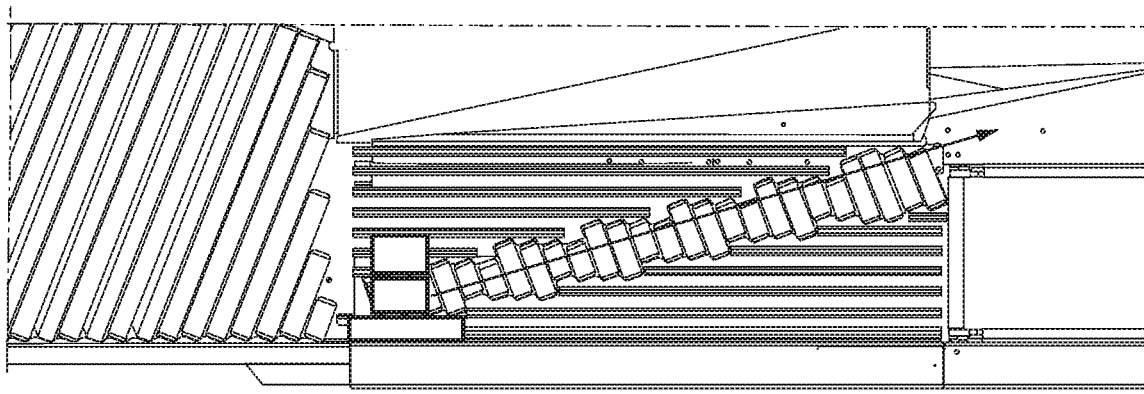
FIG. 50(b) is a top view of FIG. 50(a)
Figure 50C:
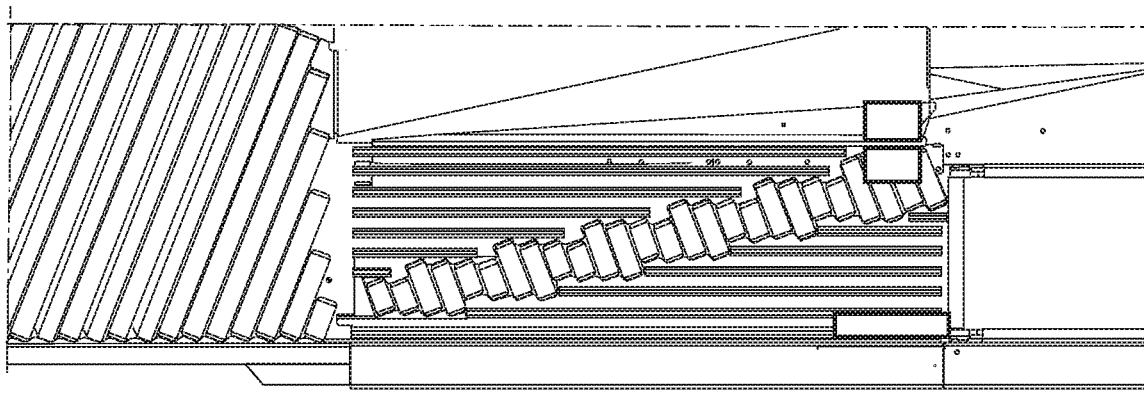
FIG. 50(c) is a top view of FIG. 50(b)
Figure 50D:
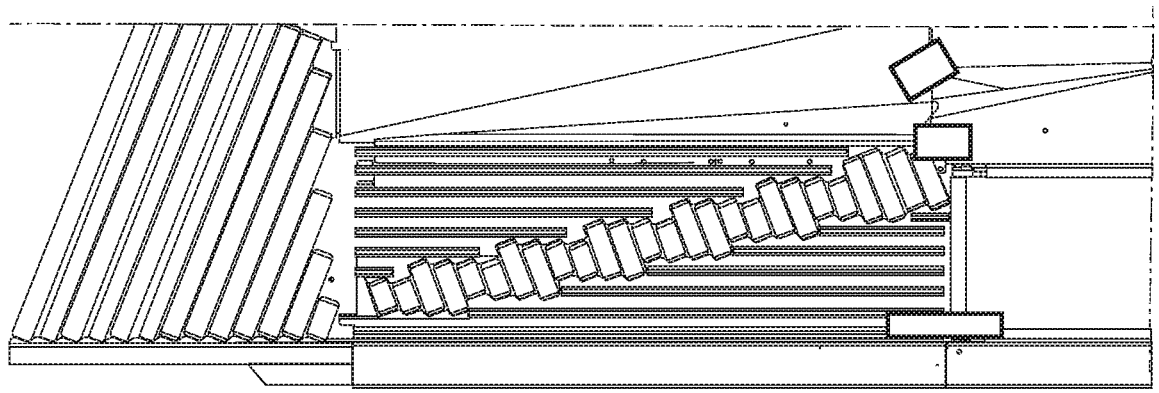
FIG. 50(d) is a top view of FIG. 50 (c)

More particularly, in FIG. 50(b) a first box rests on the first conveying lane adjacent the vertical sidewall through the conveyor, a second box rests on the second conveying lane spaced apart from and adjacent the first box, and a third box having a portion rests on the second conveying lane and a portion resting on the second and third inner narrow belts of the third conveying lane. A first box resting on the first conveying lane adjacent the vertical sidewall through the conveyor in FIG. 50(c), a second box rests on the second conveying lane spaced apart from and adjacent the first box, and a third box is conveyed forward and shifting laterally toward an off ramp at the outer edge of the conveyor. Finally, as shown in FIG. 50(d), a first box is conveyed on the first conveying lane adjacent the vertical sidewall through the conveyor in flow communication with a downstream conveyor, the second box is conveyed forward and laterally shifting over and onto the fourteenth outer narrow belt of the third conveying lane aligned with an end discharge ramp, and the third box discharged from the outer side ramp.

Figure 51A:
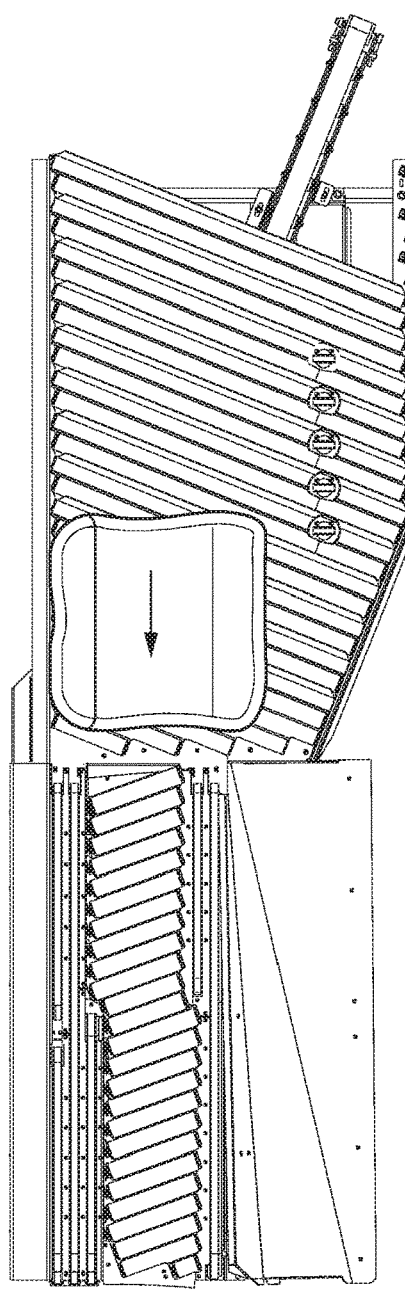
FIG. 51(a) is an upstream top view of a large bag with small parcels on a multistage conveyor.

FIG. 51(a) shows a large bag with small parcels on a multistage conveyor showing a first inner conveying lane comprising two spaced apart adjacent parallel narrow belts having high friction conveying surfaces adjacent a vertical sidewall and in lateral flow communication with a second middle conveying lane comprising a plurality of powered skewed rollers positioned having a lateral upward angle of from 1-30 degrees for moving articles forward and laterally outward, and a third conveying lane having a high friction conveying surface comprising two space apart narrow belts wherein the inner receiving side edge of the third conveying lane is at higher a level than the outer side edge of the second conveying lane which is angled upward forming a conveying plane extending above the outer edge of the third conveying lane, whereby a large bag of small parcels box is moved forward and laterally toward the vertical side wall by a powered skewed roller upstream feed conveyor.

Figure 51B:
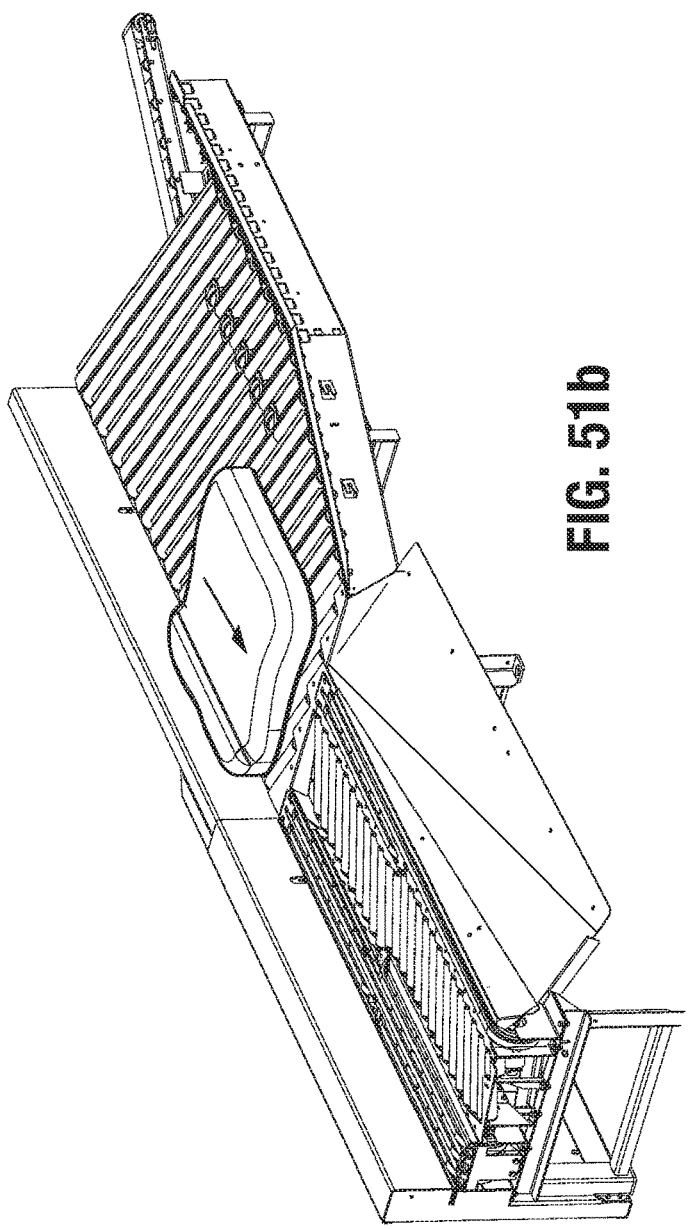
Figure 51C:
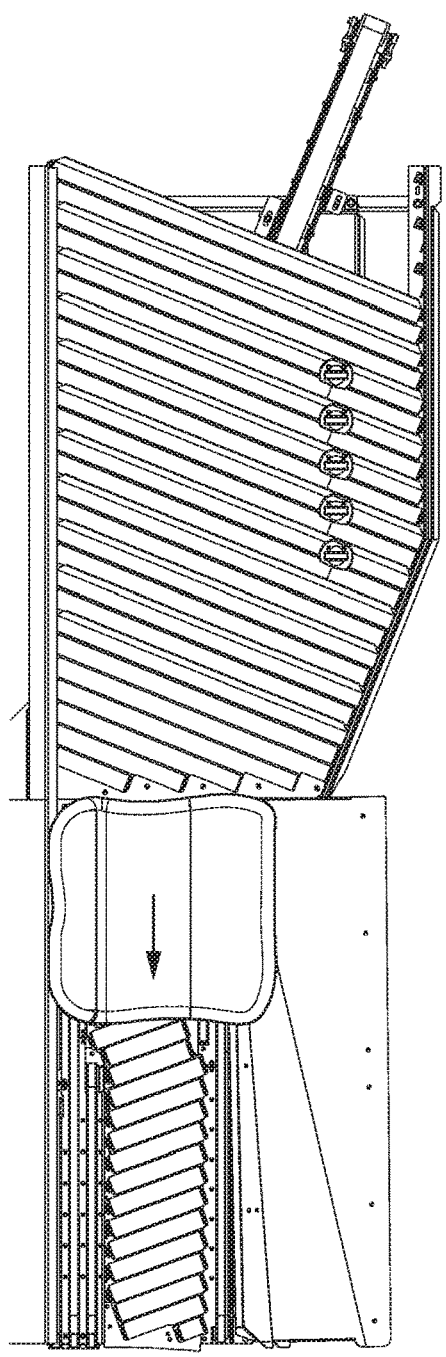

FIG. 51(b) shows a first inner conveying lane comprising two spaced apart adjacent parallel narrow belts having high friction conveying surfaces adjacent a vertical sidewall and in lateral flow communication with a second middle conveying lane comprising a plurality of powered skewed rollers positioned having a lateral upward angle of from 1-30 degrees for moving articles forward and laterally outward, and a third conveying lane having a high friction conveying surface comprising two space apart narrow belts wherein the inner receiving side edge of the third conveying lane is at a higher a level than the outer side edge of the second conveying lane which is angled upward forming a conveying plane extending above the outer edge of the third conveying lane, whereby a large bag of small parcels box is moved forward and laterally toward the vertical side wall by a powered skewed roller upstream feed conveyor. Furthermore, FIG. 51(c) includes a first inner conveying lanes comprising two high friction surface conveying surfaces comprising two spaced apart aligned narrow belts adjacent a vertical wall in flow communication with a second middle conveying lane comprising a plurality of skewed rollers positioned having a lateral upward angle of from 1-30 degrees and a third conveying lane having a high friction surface comprising two space apart narrow belts wherein the first conveying lane and the third conveying lanes are at higher a level than the outer edge of the second conveying lane and a large bag of small parcels box is supported by the two narrow belts of the first conveying lane adjacent the vertical sidewall and the two narrow belts of the third conveying lane whereby the high friction surface of the inner conveying lane and outer conveying lane are greater than the lateral force of the low friction conveying surface of the skewed rollers therebetween.

Figure 51D:
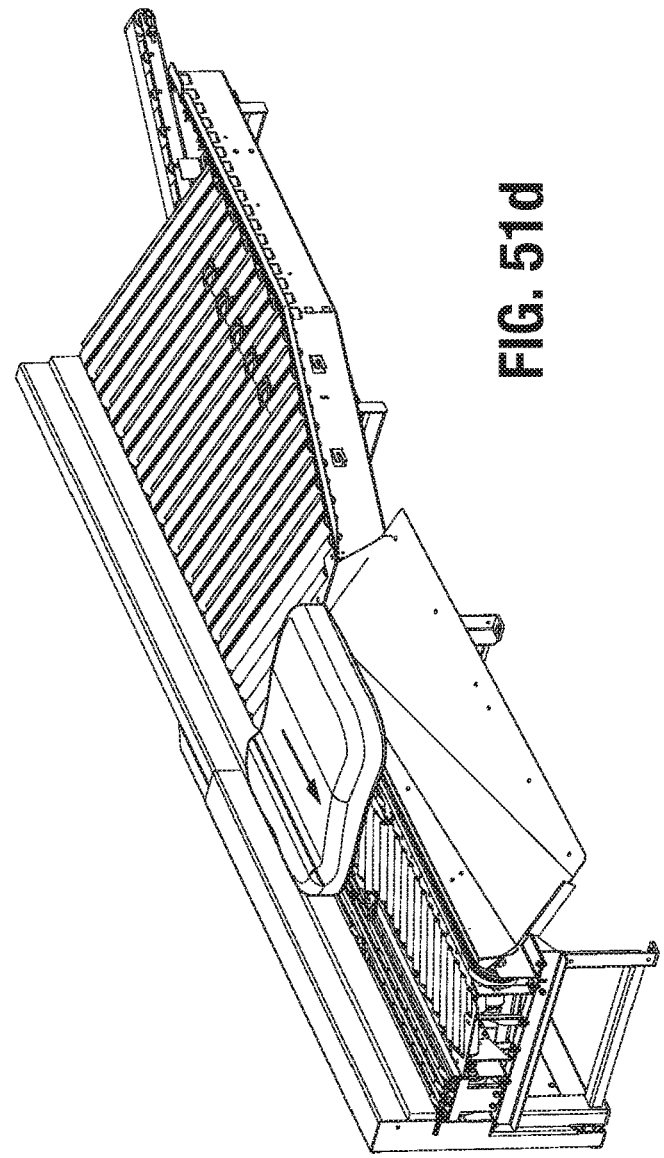

FIG. 51(d) shows a first inner conveying lanes comprising two high friction surface conveying surfaces comprising two spaced apart aligned narrow belts adjacent a vertical wall in flow communication with a second middle conveying lane comprising a plurality of skewed rollers positioned having a lateral upward angle of from 1-30 degrees and a third conveying lane having a high friction surface comprising two space apart narrow belts wherein the first conveying lane and the two narrow belts of the third conveying lane are at higher a level than the outer edge of the second conveying lane and a large bag of small parcels box is supported by the two narrow belts of the first conveying lane adjacent the vertical sidewall and the two narrow belts of the third conveying lane whereby the high friction surface of the inner conveying lane and outer conveying lane are greater than the lateral force of the low friction conveying surface of the skewed rollers therebetween.

A first inner conveying lane comprising a high friction surface conveying lane comprises three spaced apart aligned narrow belts adjacent a vertical wall in flow communication with a middle conveying lane comprising a plurality of skewed rollers positioned having a lateral upward angle of from 1-30 degrees and a third outer conveying lane having a high friction surface comprising one spaced narrow belt, wherein the first conveying lane and the third conveying lanes are at higher a level than the outer edge of the second conveying lane and a large bag of small parcels box is supported by the three narrow belts of the first conveying lane and the one narrow belt of the third conveying lane have a higher friction force than the lateral force of the low friction conveying surface of the skewed rollers therebetween as illustrated in FIG. 52(e).

Finally, FIG. 51(f) shows the multistage conveyor including a first inner conveying lanes comprising a high friction surface conveying lane comprising three spaced apart aligned narrow belts adjacent a vertical wall in flow communication with a middle conveying lane comprising a plurality of skewed rollers positioned having a lateral upward angle of from 1-30 degrees and a third outer conveying lane having a high friction surface comprising one spaced narrow belt, wherein the first conveying lane and the third conveying lanes are at higher a level than the outer edge of the second conveying lane and a large bag of small parcels box is supported by the three narrow belts of the first conveying lane and the one narrow belt of the third conveying lane have a higher friction force than the lateral force of the low friction conveying surface of the skewed rollers therebetween.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

We claim:

1. A multistage multi-lane singulator conveyor including at least two singulator conveyors arranged in an end to end arrangement in flow communication defining a first stage and a second stage, each stage comprising:
    a singulator conveying lane apparatus comprising at least three driven conveying lanes arranged in an adjacent parallel configuration;
    a first conveying lane comprising at least two spaced apart aligned narrow belts having a high friction surface for conveying articles forward along a vertical side wall where incoming articles are positioned there along;
    a second conveying lane having a lower friction conveying surface disposed beside said first conveying lane having an inner receiving edge at a lower elevation, said second conveying lane comprising a series of driven rollers having rotary axes skewed relative to a forward direction of travel so that said articles are conveyed simultaneously forward and laterally outwardly away from said first conveying lane and said vertical side wall, said second conveying lane being transversely inclined and angled upward at a selected angle forming an elevated outer side edge;
    said second conveying lane having a low friction conveying surface forming an inclined plane extending at a selected angle above a receiving side edge of an adjacent third conveying lane; and
    said adjacent third conveying lane having a different width than said first conveying lane, said third conveying lane comprising at least two narrow high friction belts, said third conveying lane having an inner receiving side edge at an elevation higher or even with said elevated outer side edge of said second conveying lane; and
    said second conveying lane angling upward in a range of from 1 to 30 degrees relative to a horizontal plane.

2. The singulator conveyor apparatus of claim 1, further including a feed conveyor having a lower friction conveying surface and a series of driven rollers whose rotary axes are skewed relative to a lateral forward direction of travel for conveying said articles simultaneously laterally forward and laterally inwardly toward said first conveying lane.

3. The singulator conveyor apparatus of claim 1, wherein said first high friction conveying surface comprises a plurality of spaced apart aligned narrow belts, said second conveying lane lower friction conveying surface comprises skewed rollers, and said third conveying lane high friction conveying surface comprises at least one narrow belt.

4. The singulator conveyor apparatus of claim 1, wherein said first, second, and third, conveying lanes are selected from the group consisting of endless belt conveying lanes, endless roller conveying lanes, and combinations thereof.

5. The singulator conveyor apparatus of claim 1, wherein said high friction conveying surface comprises a plastic, an elastomer, a rubber, a coating, and combinations thereof.

6. The singulator conveyor apparatus of claim 1 wherein said lower friction conveying surface comprises a metal, a plastic, a graphite material or a tetrafluoroethylene material.

7. The singulator conveyor apparatus of claim 1, wherein said first conveying lane high friction conveying surface comprises a plurality of narrow belts, said second conveying lane lower friction conveying surface comprises skewed rollers, and said third conveying lane high friction conveying surface comprises a plurality of narrow belts.

8. The singulator conveyor apparatus of claim 1, said first conveying lane and said third conveying lane are the same height.

9. The singulator conveyor apparatus of claim 1, wherein said article on both said first conveying lane high friction surface and said third conveying lane high friction surface will by conveyed straight through along a primary flow.

10. The singulator conveyor apparatus of claim 1, wherein said first conveying lane and said third conveying lane travel at the same rate of speed in order for large parcels resting on said first conveying lane and said third conveying lane to be conveyed through said singulator conveyor apparatus.

11. The singulator conveyor apparatus of claim 1, wherein said second conveying lane is inclined at an obtuse angle with respect to the longitudinal direction and the speed of said second conveying lane is set so that it has a forward longitudinal component equal to the forward speed of said first conveying lane so that a parcel resting on both of said first conveying lane and said second conveying lane will travel forward without being rotated.

12. The singulator conveyor apparatus of claim 1, wherein said high friction surface of said first conveying lane increases in width and said high surface area of said third conveying lane decreases in width on the take-off lane side.

13. The singulator conveyor apparatus of claim 12, wherein a width of said low friction second conveying lane disposed between said first conveying lane and said third conveying lane changes in width in accordance with the change in width of the first conveying lane and second conveying lane.

14. The singulator conveyor apparatus of claim 12, wherein the change in width of said high friction first conveying lane and said high friction third conveying lane changes correspondingly so that the width of the first conveying surface, second conveying surface, and third conveying surface are the same from the feed end of the conveyor to the discharge end of the conveyor.

15. A multistage multi-lane singulator conveyor, comprising:
at least two singulator conveyors arranged in an end to end arrangement in flow communication defining an upstream first stage interconnecting with a downstream second stage, each stage comprising:
a singulator conveying apparatus comprising at least three driven conveying lanes arranged in an adjacent parallel configuration;
a first conveying lane comprising at least one belt having a high friction surface for conveying articles forward along a vertical side wall where incoming articles are positioned there along;
a second conveying lane having a lower friction conveying surface disposed beside said first conveying lane having an inner receiving edge at a lower elevation, said second conveying lane comprising a series of driven rollers having rotary axes skewed relative to a forward direction of travel so that said articles are conveyed simultaneously forward and laterally outwardly away from said first conveying lane and said vertical side wall, said second conveying lane being transversely inclined and angled upward at a selected angle forming an elevated outer side edge;
said second conveying lane forming an inclined plane extending at a selected angle above a receiving side edge of an adjacent third conveying lane;
said adjacent third conveying lane having a high friction surface and having a different width than said first conveying lane; and
said third conveying lane having an inner receiving side edge in lateral flow communication with said elevated outer side edge of said second conveying lane.

16. The singulator conveyor apparatus of claim 15, whereby
said high friction surface of said first conveying lane of said second stage increases in width and said high surface area of said third conveying lane of said second stage decreases in width compared to said first stage; and
said low friction surface of said second conveying lane disposed between said high friction surface of said first conveying lane and said high friction surface of said third conveying lane of said first stage increases or decreases in width shifting inwardly or outwardly at a transition of said first stage and said second stage remains adjacent to, in between, and in lateral flow communication with said high friction surface of said first conveying lane and said high friction surface of said third conveying lane of said second stage.

17. The singulator conveyor apparatus of claim 15, wherein said high friction surface of said first conveying lane comprises a plurality of spaced apart aligned narrow belts, said low friction surface of said second conveying lane comprises skewed rollers, and said high friction surface of said third conveying lane comprises at least one narrow belt.

18. The singulator conveyor apparatus of claim 15, wherein said first, second, and third, conveying lanes are selected from the group consisting of endless belt conveying lanes, endless roller conveying lanes, and combinations thereof.

19. The singulator conveyor apparatus of claim 15, wherein said high friction conveying surface comprises a plastic, an elastomer, a rubber, a coating, and combinations thereof.

20. The singulator conveyor apparatus of claim 15 wherein said lower friction conveying surface comprises a metal, a plastic, a graphite material or a tetrafluoroethylene material.

21. The singulator conveyor apparatus of claim 15, wherein said first conveying lane high friction conveying surface comprises a plurality of narrow belts, said second conveying lane lower friction conveying surface comprises skewed rollers, and said third conveying lane high friction conveying surface comprises a plurality of narrow belts, and said first conveying lane of said upstream stage increases in width at said interconnecting downstream stage, and said third conveying lane decreases in width at said interconnecting downstream stage.

22. The singulator conveyor apparatus of claim 15, said first conveying lane and said third conveying lane are the same height.

23. The singulator conveyor apparatus of claim 15, wherein said second conveying lane having a low friction conveying surface forming an inclined plane extending at a selected angle below a receiving side edge of said adjacent third conveying lane whereby said articles supported by both said first conveying lane high friction surface and said third conveying lane high friction surface are conveyed straight through along a primary flow over said second conveying lane.

24. The singulator conveyor apparatus of claim 23, wherein said first conveying lane and said third conveying lane travel at the same rate of speed in order for large parcels resting on said first conveying lane and said third conveying lane to be conveyed through said singulator conveyor apparatus.

25. The singulator conveyor apparatus of claim 15, wherein said second conveying lane is inclined at an obtuse angle with respect to the longitudinal direction and the speed of said second conveying lane is set so that it has a forward longitudinal component equal to the forward speed of said first conveying lane so that said articles resting on said first conveying lane and said second conveying lane will travel forward without being rotated.

26. The singulator conveyor apparatus of claim 15, wherein said high friction surface of said first conveying lane of said second stage increases in width and said high surface area of said third conveying lane of said second stage decreases in width on a take-off lane side.

27. The singulator conveyor apparatus of claim 15, wherein said high friction surface of said third conveying lane of said second stage decreases in width and said high surface area of said first conveying lane of said second stage increases in width.

28. The singulator conveyor apparatus of claim 15, wherein said low friction surface of said second conveying lane of said first stage disposed between said high friction surface of said first conveying lane and said third conveying lane of said first stage changes in width in accordance with the change in width of said first conveying lane and said third conveying lane of said second stage, said second conveying lane shifting inwardly or outwardly at said second stage whereby said second conveying lane remains adjacent to, in between, and in lateral flow communication with said first conveying lane and said third conveying lane of said second stage.

29. The singulator conveyor apparatus of claim 15, wherein said second conveying lane is angled upward in a range of from 5 to 25 degrees relative to a horizontal plane.

30. The singulator conveyor apparatus of claim 15, wherein said first conveying lane and said second conveying lane extend continuously from said upstream first stage thorough said downstream second stage.

31. The singulator conveyor apparatus of claim 15, wherein said first conveying lane and said third conveying lane each comprise a plurality of narrow belts having a high friction surface, and said width of said first conveying lane and said width of said third conveying lane is adjusted by increasing or decreasing the number of high friction surface narrow belts.

32. A multistage multi-lane singulator conveyor, comprising:

an upstream stage interconnecting with a downstream stage, each stage comprising:

a singulator conveying apparatus comprising at least three driven conveying lanes arranged in an adjacent parallel configuration;

a first conveying lane comprising at least one belt having a high friction surface for conveying articles forward along a vertical side wall where incoming articles are positioned there along;

a second conveying lane having a lower friction conveying surface disposed beside said first conveying lane having an inner receiving edge at a lower elevation, said second conveying lane comprising a series of driven rollers having rotary axes skewed relative to a forward direction of travel so that said articles are conveyed simultaneously forward and laterally outwardly away from said first conveying lane and said vertical side wall, said second conveying lane being transversely inclined and angled upward at a selected angle forming an elevated outer side edge;

said second conveying lane forming an inclined plane extending at a selected angle above a receiving side edge of an adjacent third conveying lane;

said adjacent third conveying lane having a high friction surface and having a different width than said first conveying lane; and said third conveying lane having an inner receiving side edge in lateral flow communication with said elevated outer side edge of said second conveying lane.

33. The singulator conveyor apparatus of claim 32, whereby said high friction surface of said first conveying lane of said downstage stage increases in width and said high surface area of said third conveying lane of said downstream stage decreases in width compared to said upstream stage; and said low friction surface of said second conveying lane disposed between said high friction surface of said first conveying lane and said high friction surface of said third conveying lane of said upstream stage increases or decreases in width shifting inwardly or outwardly at a transition of said upstream stage and said downstream stage remains adjacent to, in between, and in lateral flow communication with said high friction surface of said first conveying lane and said high friction surface of said third conveying lane of said downstream stage.

34. The singulator conveyor apparatus of claim 32, wherein said high friction surface of said first conveying surface comprises at least one belt, said low friction conveying surface of said second conveying lane comprises a plurality of skewed rollers, and said high friction conveying surface of said third conveying lane comprises at least one belt.

35. The singulator conveyor apparatus of claim 32, wherein said first, second, and third, conveying lanes are selected from the group consisting of endless belt conveying lanes, endless roller conveying lanes, and combinations thereof.

36. The singulator conveyor apparatus of claim 32, wherein said high friction conveying surface comprises a plastic, an elastomer, a rubber, a coating, and combinations thereof.

37. The singulator conveyor apparatus of claim 32 wherein said lower friction conveying surface comprises a metal, a plastic, a graphite material or a tetrafluoroethylene material.

38. The singulator conveyor apparatus of claim 32, wherein said first conveying lane high friction conveying surface comprises a plurality of narrow belts, said second conveying lane lower friction conveying surface comprises skewed rollers, and said third conveying lane high friction conveying surface comprises a plurality of narrow belts, and said first conveying lane of said upstream stage increases in width at said interconnecting downstream stage, and said third conveying lane decreases in width at said interconnecting downstream stage.

39. The singulator conveyor apparatus of claim 32, said first conveying lane and said third conveying lane are the same height.

40. The singulator conveyor apparatus of claim 32, wherein said second conveying lane having a low friction conveying surface forming an inclined plane extending at a selected angle below a receiving side edge of said adjacent third conveying lane whereby said articles supported by both said first conveying lane high friction surface and said third conveying lane high friction surface are conveyed straight through along a primary flow over said second conveying lane.

41. The singulator conveyor apparatus of claim 40, wherein said first conveying lane and said third conveying lane travel at the same rate of speed in order for large parcels resting on said first conveying lane and said third conveying lane to be conveyed through said singulator conveyor apparatus.

42. The singulator conveyor apparatus of claim 32, wherein said second conveying lane is inclined at an obtuse angle with respect to the longitudinal direction and the speed of said second conveying lane is set so that it has a forward longitudinal component equal to the forward speed of said first conveying lane so that said articles resting on said first conveying lane and said second conveying lane will travel forward without being rotated.

43. The singulator conveyor apparatus of claim 32, wherein said high friction surface of said first conveying lane of said downstream stage increases in width and said high surface area of said third conveying lane of said downstream stage decreases in width on a take-off lane side.

44. The singulator conveyor apparatus of claim 32, wherein said high friction surface of said third conveying lane of said downstream stage decreases in width and said high surface area of said first conveying lane of said downstream stage increases in width.

45. The singulator conveyor apparatus of claim 32, wherein said low friction surface of said second conveying lane of said upstream stage disposed between said high friction surface of said first conveying lane and said third conveying lane of said upstream stage changes in width in accordance with the change in width of said first conveying lane and said third conveying lane of said downstream stage, said second conveying lane shifting inwardly or outwardly at said downstream stage whereby said second conveying lane remains adjacent to, in between, and in lateral flow communication with said first conveying lane and said third conveying lane of said downstream stage.

46. The singulator conveyor apparatus of claim 32, wherein said second conveying lane is angled upward in a range of from 5 to 25 degrees relative to a horizontal plane.

47. The singulator conveyor apparatus of claim 15, wherein said first conveying lane and said second conveying lane extend continuously from said upstream stage thorough said downstream stage.

48. The singulator conveyor apparatus of claim 15, wherein said first conveying lane and said third conveying lane each comprise a plurality of narrow belts having a high friction surface, and said width of said first conveying lane and said width of said third conveying lane is adjusted by increasing or decreasing the number of high friction surface narrow belts.

49. A multistage multi-lane singulator conveyor, comprising:
an upstream stage interconnecting with a downstream stage, each stage comprising:
a singulator conveying apparatus comprising at least three driven conveying lanes arranged in an adjacent parallel configuration;
a first conveying lane comprising at least one belt having a high friction surface for conveying articles forward along a vertical side wall where incoming articles are positioned there along;
a second conveying lane having a lower friction conveying surface disposed beside said first conveying lane having an inner receiving edge at a lower elevation, said second conveying lane comprising a series of driven rollers having rotary axes skewed relative to a forward direction of travel so that said articles are conveyed simultaneously forward and laterally outwardly away from said first conveying lane and said vertical side wall, said second conveying lane being transversely inclined and angled upward at a selected angle forming an elevated outer side edge;
said second conveying lane forming an inclined plane extending at a selected angle above a receiving side edge of an adjacent third conveying lane;
said adjacent third conveying lane having a high friction surface and having a different width than said first conveying lane;
said third conveying lane having an inner receiving side edge in lateral flow communication with said elevated outer side edge of said second conveying lane;
said high friction surface of said first conveying lane of said downstream stage increases in width and said high surface area of said third conveying lane of said downstream stage decreases in width compared to said first stage; and
said low friction surface of said second conveying lane disposed between said high friction surface of said first conveying lane and said high friction surface of said third conveying lane changes in width shifting inwardly or outwardly at the a transition of said upstream stage and said downstream stage, said second conveying lane remaining adjacent to, in between, and in lateral flow communication with said high friction surface of said first conveying lane and said high friction surface of said third conveying lane.

* * * * *